United States Patent
Choki et al.

(10) Patent No.: US 8,420,293 B2
(45) Date of Patent: Apr. 16, 2013

(54) OPTICAL WAVEGUIDES AND METHODS THEREOF

(75) Inventors: Koji Choki, Tokyo (JP); Tetsuya Mori, Kawasaki (JP); Ramakrishna Ravikiran, Northfield, IL (US); Makoto Fujiwara, Yokohama (JP); Keizo Takahama, Chigasaki (JP); Kei Watanabe, Kawasaki (JP); Hirotaka Nonaka, Kawasaki (JP); Yumiko Otake, Yokohama (JP); Andrew Bell, Lakewood, OH (US); Larry Rhodes, Silver Lake, OH (US); Dino Amoroso, Medina, OH (US); Mutsuhiro Matsuyama, Kawasaki (JP)

(73) Assignees: Sumitomo Bakelite Co., Ltd., Tokyo (JP); Promerus, LLC, Brecksville, OH (US)

( * ) Notice: Subject to any disclaimer, the term of this patent is extended or adjusted under 35 U.S.C. 154(b) by 0 days.

(21) Appl. No.: 13/206,611

(22) Filed: Aug. 10, 2011

(65) Prior Publication Data
US 2012/0064458 A1   Mar. 15, 2012

Related U.S. Application Data

(60) Continuation of application No. 12/553,124, filed on Sep. 3, 2009, now Pat. No. 8,053,166, which is a division of application No. 10/579,763, filed as application No. PCT/US2004/037188 on Nov. 22, 2004, now Pat. No. 7,820, 356.

(60) Provisional application No. 60/523,978, filed on Nov. 21, 2003, provisional application No. 60/585,235, filed on Jul. 2, 2004.

(51) Int. Cl.
*G03F 7/00* (2006.01)
*G03F 7/004* (2006.01)

(52) U.S. Cl.
USPC ............... 430/270.1; 430/281.1; 430/905; 430/913

(58) Field of Classification Search .............. 430/270.1, 430/281.1, 905, 913
See application file for complete search history.

(56) References Cited

U.S. PATENT DOCUMENTS

| | | |
|---|---|---|
| 6,538,087 B2 | 3/2003 | Zhao et al. |
| 6,677,175 B2 | 1/2004 | Zhao et al. |

(Continued)

FOREIGN PATENT DOCUMENTS

| | | |
|---|---|---|
| EP | 1 223 211 A1 | 7/2002 |
| EP | 1 229 352 A2 | 8/2002 |

(Continued)

OTHER PUBLICATIONS

Office Action issued Nov. 29, 2011, in Korean Patent Application No. 10-2011-7010542 (English translation only).

(Continued)

*Primary Examiner* — Amanda C. Walke
(74) *Attorney, Agent, or Firm* — Oblon, Spivak, McClelland, Maier & Neustadt, L.L.P.

(57) ABSTRACT

Embodiments in accordance with the present invention provide waveguide structures and methods of forming such structures where core and laterally adjacent cladding regions are defined. Some embodiments of the present invention provide waveguide structures where core regions are collectively surrounded by laterally adjacent cladding regions and cladding layers and methods of forming such structures.

9 Claims, 7 Drawing Sheets

U.S. PATENT DOCUMENTS

| | | |
|---|---|---|
| 6,944,385 B2 | 9/2005 | Uchida |
| 7,041,758 B2 | 5/2006 | Goodall et al. |
| 7,101,654 B2 | 9/2006 | Wu et al. |
| 7,314,818 B2 | 1/2008 | Takahashi et al. |
| 7,702,206 B2 | 4/2010 | Shimizu et al. |
| 7,820,356 B2 | 10/2010 | Choki et al. |

FOREIGN PATENT DOCUMENTS

| | | |
|---|---|---|
| JP | 2005-164650 | 6/2005 |
| KR | 2001-0066843 | 7/2001 |
| KR | 2003-0036654 | 5/2003 |
| WO | WO 02/10231 A2 | 2/2002 |

OTHER PUBLICATIONS

Office Action issued Nov. 1, 2011 in China Application No. 200810091916.7 (English Translation).

Office Action issued Nov. 8, 2011 in China Application No. 200810091918.6 (English Translation).

Office Action issued Nov. 21, 2011 in Korea Application No. 10-20067011613 (English Translation).

Office Action issued Nov. 29, 2011 in Korea Application No. 10-2011-7010541 (English Translation).

U.S. Appl. No. 13/148,191, filed Aug. 5, 2011, Mori, et al.

Office Action issued Jun. 9, 2011, in Korean Patent Applcation No. 10-2011-7010542 (with English-language translation).

Office Action issued Jun. 9, 2011, in Korean Patent Application No. 10-2011-7010541 (with English-language translation).

Search Report isued May 19, 2011, in European Patent Application No. 04819517.6 (in English language).

English Translation of Korean Office Action issued Mar. 11, 2011, in Patent Appication No. 10-2006-7011613.

Office Action issued Jul. 9, 2012, in Chinese Patent Application No. 200810091918.6, filed Nov. 22, 2004.

Office Action issued Aug. 3, 2012, in Chinese Patent Application No. 200810091916.7, filed Nov. 22, 2004.

Office Action issued Nov. 15, 2012, in Chinese Patent Application No. 200810091918.6, filed Nov. 22, 2004.

Mapping results of elements distribution within a waveguide sample using EPMA (Electron Probe Micro Analysis) technique Element: Si Mapping results of elements distribution within a waveguide sample using EPMA (Electron Probe Micro Analysis) technique Area Analysis
x 50                                    PRELIMINARY TEST Element: C

OPTICAL WAVEGUIDES AND METHODS THEREOF

CROSS-REFERENCE TO RELATED APPLICATIONS

This application is a continuation of and claims the benefit of priority under 35 U.S.C. §120 from U.S. Ser. No. 12/553,124, filed Sep. 3, 2009, now U.S. Pat. No. 8,053,166 which is a divisional of U.S. Ser. No. 10/579,763, filed Jan. 26, 2007, now U.S. Pat. No. 7,820,356 which is a national stage of PCT/US04/37188, filed Nov. 22, 2004, which claims the benefit of U.S. Provisional Applications No. 60/523,978, filed Nov. 21, 2003, and No. 60/585,235, filed Jul. 2, 2004. The contents of these applications are incorporated herein by reference in their entirety.

TECHNICAL FIELD

The present invention relates generally optical waveguides and methods of forming them.

BACKGROUND

Data transfer using optical frequency carrier waves generated by sources such as lasers or light-emitting diodes is becoming increasingly important. One means for conducting or guiding such optical frequency carrier waves from one point to another is an optical waveguide. Optical waveguides encompass a first medium which is essentially transparent to the light of the optical frequency carrier waves and a second medium having a lower refractive index than that of the first medium. The first medium is surrounded by, or otherwise enclosed within, the second medium. Light introduced into an end of the first medium undergoes total internal reflection at the boundary with the second medium and thus is guided along an axis of the first medium Perhaps the most frequently used optical transport medium is glass formed into an elongated fiber.

However, while glass optical fibers are convenient for data transfer over long distances, they are inconvenient for complex high-density circuitry because the high density of such circuitry makes their use problematic and expensive. Polymeric materials, on the other hand, hold great promise for constructing cost effective, reliable, passive and active integrated components capable of performing the required functions for integrated optics.

Therefore, considerable effort has been directed to forming optical coupling devices and more recently to optical waveguides that can be formed of polymeric materials using photohardenable techniques. For example, in U.S. Pat. No. 5,292,620, to Booth et al., waveguide structures having a predetermined geometry and a process for forming these structures using photohardenable techniques are disclosed. The structures of the '620 patent encompass at least one buried channel waveguide in a laminated matrix where the waveguide and any connecting structures are first formed in a photohardenable film detachably disposed on a supporting substrate. After such first forming, the photohardenable film is detached from the supporting substrate and laminated between first and second photohardenable layers. In this manner, regions of the photohardenable layer adjacent the waveguide channel region and any connecting structures serve as cladding regions in the plane of the layer and the first and second photohardenable layers serve as cladding layers above and below that plane.

On the other hand, JP laid-open patent publications Nos. 2004-35838 H10-48443 and 2001-296438 disclose a method of exposing a polymer film to an actinic radiation, to change the chemical structure of the polymer so as to obtain a waveguide structure.

BRIEF DESCRIPTION OF THE DRAWINGS

Embodiments of the invention are described below with reference to the following accompanying drawings.

DETAILED DESCRIPTION

Embodiments according to the present invention are described hereinafter. Various modifications, adaptations or variations of such exemplary embodiments described herein may become apparent to those skilled in the art as such are disclosed. It will be understood that all such modifications, adaptations or variations that rely upon the teachings of the present invention, and through which these teachings have advanced the art, are considered to be within the scope and spirit of the present invention.

The term "norbornene-type monomer" is used herein to mean a monomer material that contains at least one norbornene moiety in accordance with, for example, Structure A shown below, and the term "norbornene-type polymer" is used herein to mean a polymeric material that was formed from such monomers and that has at least one repeat unit in accordance with, for example, Structure B, also shown below:

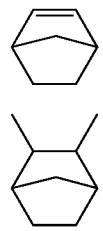

The use of the term "norbornene-type monomer" herein further encompasses polycyclic olefins which can be polymerized via cationic palladium initiators that would lead to a propagating species in which there is no possibility of beta-hydride elimination or equivalent termination process, and the use of the term "norbornene-type polymer" herein further encompasses polymeric materials that were formed from such monomers.

The terms "crosslinker" and "crosslinking monomer" are used interchangeably herein to mean a monomer that contains at least two norbornene-type moieties such as shown above by 'A', each being polymerizable. Such crosslinkers include both fused multicyclic ring systems and linked multicyclic ring systems, as will be described more fully below.

The terms "waveguide channel" or "core" refer to a portion of a polymeric film having a square or rectangular cross-sectional profile with the dimensions of the square or rectangular cross-sectional profile ranging from about 1 μm to about 200 μm in some embodiments, from about 5 μm to about 100 μm in other embodiments and from about 10 μm to about 60 μm in still other embodiments. Such waveguide channel or core regions are further characterized as having a refractive index that is higher than the refractive index of laterally adjacent regions which are referred to as cladding regions. Optical waveguides according to the embodiments of the present invention can be used, for example, in data communication using a range of wavelengths, generally, but not limited to, 600 nm to 1550 nm. Usually, the wavelengths of operation depend on materials and their optical characteristics.

Figure 1:
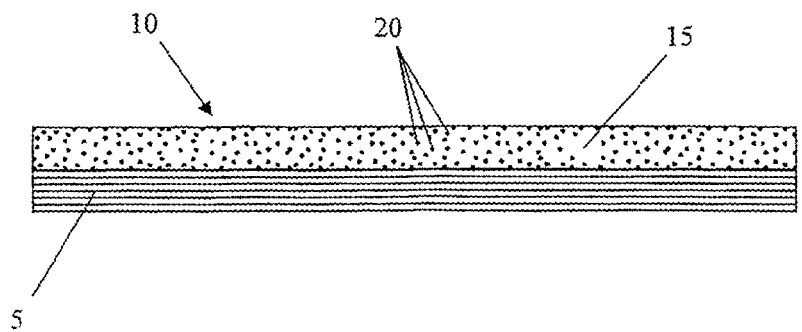
FIGS. 1, 2 and 3 are schematic drawings that illustrate in a simplified manner a sequence of forming waveguide regions in a waveguide patternable film in accordance with an exemplary embodiment of the present invention.

Referring first to FIG. 1, a portion of a waveguide patternable film 10 of a photo-induced thermally developable material (PITDM), in accordance with embodiments of the present invention, is depicted as disposed on a support substrate 5. Generally, substrate 5 is a silicon, silicon dioxide, glass or quartz substrate, or a polyethylene terephthalate (PET) film.

The PITDM encompasses, for example, a norbornene-type polymeric material matrix 15 having a plurality of norbornene-type repeat units and materials 20 dispersed therein. Materials 20 may include, for example, a photoinitiator material, a procatalyst material and a norbornene-type monomer material. The term "photoinitiator material" will be understood herein to include both cationic and anion photoinitiator materials which are also referred to as "photo acid generators" and "photo base generators," respectively. Generally, the PITDM of film 10 also encompasses one or more antioxidant materials to prevent undesirable free radical generation and auto-oxidation of the norbornene-type materials, although the inclusion of such antioxidants can be optional where the PITDM is not subjected to oxidative conditions or where the period of such exposure is limited. Each of the materials 20 is essentially uniformly and randomly distributed within matrix 15. Thus when film 10 is formed, such materials 20 are essentially uniformly and randomly distributed therein.

The PITDM is applied to substrate 5 to form film or layer 10 using any one of several appropriate application methods. Such methods include, but are not limited to, spin coating, spray coating, dip coating and spreading with a doctor blade. In one exemplary embodiment of the present invention, a solution of the PITDM, also referred to herein as a "varnish" or a "varnish solution," is poured onto a glass substrate and spread to an essentially uniform thickness using a doctor blade. In some embodiments of the present invention, the essentially uniform thickness of the layer is from about 5 μm to about 200 μm, while in other embodiments, layer 10 has a thickness of from about 10 μm to about 100 μm and in still other embodiments, layer 10 has a thickness of from about 15 μm to about 65 μm. After spreading, the coated glass substrate is allowed to sit on a vented leveling table to allow for the leveling of surface irregularities resulting from the method of application as well as to allow for solvent evaporation and the forming of a solid film, such as PITDM film 10 depicted in FIG. 1. It will be noted that PITDM film 10 is created by spreading the varnish solution to an essentially uniform thickness, and that the materials 20 and matrix 15 encompassed within such varnish solution are essentially uniformly and randomly distributed within film 10.

Matrix 15 generally encompasses a polymer, for example, a norbornene-type polymer having two or more distinct norbornene-type repeat units (hereinafter, the terms "first repeat units" and "second repeat units" herein are used to mean two distinct repeat units). In some embodiments in accordance with the present invention, a polymer resulting from the polymerization of essentially equal amounts of hexylnorbornene (HxNB) and diphenylmethyl norbornenemethoxysilane (diPhNB) results in a copolymer that is useful for matrix 15. However, while matrix 15 can encompass two or more distinct norbornene-type repeat units, for some embodiments in accordance with the present invention, matrix 15 can be an appropriate norbornene-type homopolymer. It will be realized that the exemplary norbornene-type polymers and monomers as described in the embodiments in accordance with the present invention can provide optical waveguides having excellent heat resistant characteristics. It will be further realized that the exemplary norbornene-type polymers as described in the embodiments in accordance with the present invention improve hydrophobicity, thus providing a film which is less susceptible to water damage such as a size variation due to water absorption. While the embodiments of the present invention are described about the PITDM including norbornene-type polymers, the present invention does not limit to such polymers. For example, polymers for the PITDM include ones which are sufficiently transparent or colorless for the purposes of optical waveguide and which are compatible with monomers. The term "compatible" herein means that monomers are at least miscible and create no phase separation in a polymer matrix. For example, other norbornene-type polymers such as those synthesized by various polymerization processes of the norbornene-type monomers, e.g., Ring-Opening Metathesis Polymerization (ROMP), a combination of ROMP and hydrogenation, polymerization via radical or cation, and ethylene-norbornene co-polymerization may be useful. Furthermore, other norbornene-type polymers such as those synthesized by using initiators or catalysts other than cationic palladium initiators, for example, nickel and other transition metal initiators may be useful. Polymers other than the norbornene-type polymers include ones which are sufficiently transparent or colorless for the purposes of optical waveguide and which are compatible with monomers and which can function as a matrix in which a monomer can be polymerized or crosslinked, and/or, in which a cleavable pendant group is included. Polymers as the matrix should be transparent when polymerizing the monomers in the matrix. Exemplary polymers are polyesters, polyacrylates, polymethacrylates, epoxides and polystyrenes, etc.

Matrix 15 may also include repeat units having a cleavable pendant group. The term "cleavable pendant group" means a pendant group that includes a moiety or site where the pendant group or at least a part thereof, is cleaved upon exposure to energy from an energy source, for example, actinic radiation and/or thermal energy. Usually, a proton, anion or free radical interacts with the moiety, or at the site, to initiate or cause the cleaving of the pendant group or at least its part from the matrix. Thus, embodiments in accordance with the present invention may have a "cleavable pendant group" that is an "acid (proton) cleavable pendant group," a "base (anion) cleavable pendant group" or a "free radical cleavable pendant group."

After being cleaved, the cleavable pendant group may be removed from the matrix, so as to change the refractive index.

On the other hand, the cleavable pendant group may remain in the matrix, if it serves to provide distinctive refractive indices between the exposed and unexposed regions. For example, the cleavable pendant group or at least a part thereof may be at least partially cleaved and cause rearrangement or crosslinkage within the polymer matrix, thereby resulting in change in the refractive index. The term "photo bleaching" is therefore used to mean any changes, whether increase or decrease, in the refractive index of the polymer matrix when the cleavable pendent group is partly or partially cleaved from the polymer matrix and is removed, rearranges or crosslinks upon exposure to actinic radiation and/or thermal energy. It will be understood that the term "actinic radiation" is meant to include any radiation capable of causing a photochemical type of reaction, and further includes, herein, electron beam radiation, x-rays and the like.

In some embodiments of the present invention, matrix 15 has a pendant group having a moiety of —O—, —Si-phenyl, or —OSi—. In other embodiments of the present invention, matrix 15 has a pendant group having a moiety of —Si-diphenyl or —OSi-diphenyl. In other embodiments of the present invention, matrix 15 is a homopolymer or copolymer of a diPhNB monomer.

Materials 20 according to some embodiments of the present invention include one or more distinct monomers where at least one of such monomers is a crosslinking monomer. An exemplary crosslinker found useful is bis-(norbornenemethoxy) dimethylsilane (SiX).

A cocatalyst, also referred to as an activator, activates the procatalyst, also referred to as an initiator. For example, such activation can encompass a cocatalyst providing a weakly coordinating anion (hereinafter also referred to as "WCA") where such WCA replaces a leaving group on the procatalyst. Some exemplary WCAs are tetrakis(pentafluorophenyl)borate (FABA), $SbF_6^-$, tetrakis(pentafluorophenyl)gallate, aluminates, antimonates, other borates, gallates, carboranes and halocarboranes. According to some embodiments of the present invention, the cocatalyst decomposes upon exposure to actinic radiation of an appropriate wavelength to form, in pertinent part, a cation such as a proton, and the WCA for activating the procatalyst. Where the cleavable pendant group is provided, it can be advantageous to select cationic or anionic photoinitiators having such weakly coordinating anion of $FABA^-$ or $SbF_6^-$.

Exemplary materials useful in embodiments of the present invention are RHODORSIL® PHOTOINITIATOR 2074, CAS 178233-72-2, available from Rhodia USA Inc., Cranbury, N.J. and TAG-372R photo acid generator, CAS 193957-54-9, available from Toyo Ink Mfg. Co., Ltd., Tokyo, Japan. Additionally, MPI-103, CAS 87709-41-9, available from Midori Kagaku Co., Ltd., Tokyo, Japan, TAG-371, CAS 193957-53-8, available from Toyo Ink Mfg. Co., Ltd., Tokyo, Japan, and tris(4-tertbutylphenyl)sulphonium tetrakis(pentafluorophenyl)borate (also referred to as "TTBPS-TPFPB"), available from Toyo Gosei Co., Ltd., Tokyo, Japan.

While the embodiments of the present invention are described about the PITDM including specific photoinitiators (photo acid generators) for cocatalysts, the present invention does not limit to such photoinitiators. So long as the activating temperature for the procatalyst (catalyst) is changed (e.g., raised or decreased) due to actinic radiation, or so long as the specific moiety in the pendant group of a matrix is cleaved due to actinic radiation, any cocatalysts or photoinitiators can be used.

When PITDM includes a procatalyst, generally such may be selected from moieties represented by Formulae Ia and Ib:

$$(E(R)_3)_2Pd(Q)_2 \qquad \text{Ia; and}$$

$$[(E(R)_3)_aPd(Q)(LB)_b]_p[WCA]_r \qquad \text{Ib.}$$

In Formulae Ia and Ib, $E(R)_3$ represents a Group 15 neutral electron donor ligand, where E is an element selected from Group 15 of the Periodic Table of the Elements, R independently represents hydrogen (or one of its isotopes) or an anionic hydrocarbyl containing moiety, and Q is an anionic ligand selected from a carboxylate, thiocarboxylate, and dithiocarboxylate group. In Formula Ib, LB is a Lewis base, WCA represents a weakly coordinating anion, a represents an integer of 1, 2, or 3, b represents an integer of 0, 1, or 2, where the sum of a+b is 1, 2, or 3, and p and r are integers that represent the number of times the palladium cation and the weakly coordinating anion are taken to balance the electronic charge on the structure of Formula Ib. In an exemplary embodiment, p and r are independently selected from an integer of 1 and 2. One such exemplary procatalyst is $Pd(PCy_3)_2(OAc)_2$ (hereinafter referred to as "Pd785"), where Cy is an abbreviation representing a cyclohexyl moiety and Ac is an abbreviation representing an acetate moiety. It will be realized that the exemplary procatalysts described above and in some embodiments in accordance with the present invention can polymerize norbornene-type monomers via addition polymerization, whereby producing polymers or polymeric materials having excellent heat resistant characteristics.

While the embodiments of the present invention are described about the PITDM including specific procatalysts, the present invention is not limited to such procatalysts. So long as the activating temperature is changed (e.g., raised or decreased) due to actinic radiation, any procatalysts can be used.

Where antioxidants are included in materials 20, Ciba® IRGANOX® 1076 and Ciba® IRGAFOS® 168, available from Ciba Specialty Chemicals Corporation, Tarrytown, N.Y., have been found useful, although other appropriate antioxidants can also be used. Other exemplary antioxidants include Ciba® Irganox® 129, Ciba® Irganox® 1330, Ciba Irganox® 1010, Ciba® Cyanox® 1790, Ciba® Irganox®3114 and Ciba® Irganox® 3125.

Figure 2:
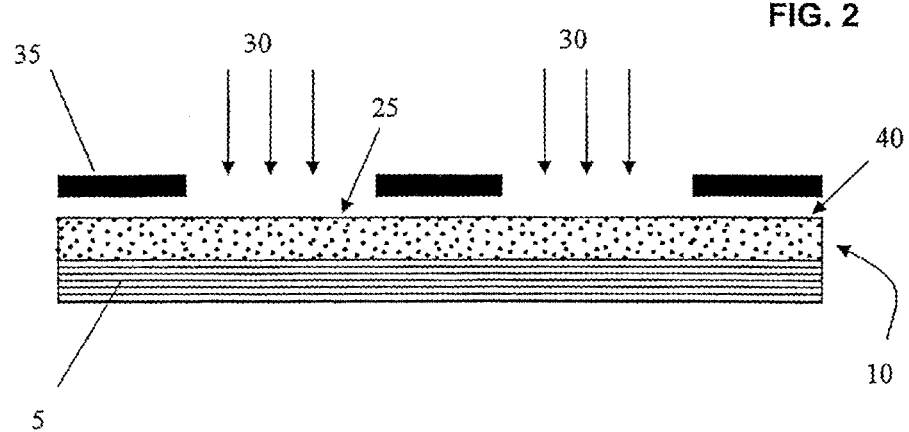

Turning now to FIG. 2, a portion of a spread film 10 is shown. After being sufficiently dried, that is to say that essentially any solvent(s) used in a solution containing the PITDM have been evaporated, the spread film 10 becomes essentially a dried solid film. The dried film 10 of the PITDM has a first Refractive Index (RI) where such first RI is a function of the materials 20 uniformly dispersed in the matrix 15.

As depicted, regions 25 of the film 10 are exposed to actinic radiation 30 through a masking element 35, where a source of the actinic radiation 30 is selected based on the sensitivity of the cocatalyst, e.g., a cationic photoinitiator, in materials 20 to such radiation. Where appropriate, any suitable sensitizer may be included in the vanish solutions of the present invention. The term "sensitizer" refers to a species that enhances the sensitivity of a photoinitiator to actinic radiation and decrease amount of time and/or energy required for its reaction or decomposition and/or that changes a wavelength of actinic radiation to which the photoinitiator is most sensitive. Such suitable sensitizers include, but are not limited to, anthracenes (e.g., DBA (9,10-Dibutoxyanthracene; CAS 76275-14-4), xanthones and anthraquinones. In addition, depending upon a peak wavelength of absorption, other classes of sensitizers such as phenanthrenes, chrysenes, benzpyrenes, fluoranthenes, rubrenes, pyrenes, indanthrenes, thioxanthen-9-ones, and mixtures thereof may be suitably used. In some exemplary embodiments, suitable sensitizers include 2-isopropyl-9H-thioxanthen-9-one, 4-isopropyl-9H- thioxanthen-9-one, 1-chloro-4-propoxythioxanthone, phenothiazine, and mixtures thereof. A typical amount of sensitizer is at least 0.01 percent by weight, in some cases at least 0.5 percent by weight, and in other cases at least 1 percent by weight of the composition of a varnish solution. The amount of a sensitizer present in varnish solutions according to the embodiments of the present invention varies between any of the values recited above. Where RHODORSIL® 2074 is employed in the film 10, a mercury vapor lamp is used as an ultraviolet (UV) radiation source to provide sufficient energy below 300 nanometers (nm) to cause the decomposition of the Rhodorsil and provide the cation and WCA as mentioned above. Laterally adjacent to the exposed regions 25 are unexposed regions 40 which are protected from the radiation 30 by opaque portions of the masking element 35 as depicted.

It will also be understood that while the masking element 35 is depicted as only having two openings for allowing the radiation 30 to pass through to the regions 25 of the film 10, such a depiction is simplified, and the masking element 35 can be provided having a variety of more complex patterns to define one or more optical waveguide elements and/or coupling devices. It should be noted that the region 25 can also be exposed by using a laser radiation or other collimated radiation sources, and in such case, it may be unnecessary to use any masking element. Waveguides in accordance with the embodiments of the present invention can be used, for example, for data communication applications such as "On board Chip to Chip Interconnects;" Optical Switches; and a variety of optical backplane applications such as Optical Add Drop Multiplexers (OADM); Multiplexers and Demultiplexers; Arrayed Waveguide Gratings (AWG); Microelectro-mechanical Systems (MEMS), and Microoptoelectro-mechanical Systems (MOEMS). In addition, fabrication methods in accordance with the present invention are useful to form diffraction gratings, holographic films, lenses, microlens arrays and lens cap structures. Thus, it will be realized that the types of waveguide structures that can be made using the methods of the present invention are generally limited only by the availability of a photomask having the pattern required by the application. However, regardless of the complexity of any pattern used to define optical waveguide elements, each exposed region 25 defined by such pattern will have one or more unexposed regions 40 laterally adjacent thereto.

Upon exposure to the radiation 30, the cocatalyst in exposed regions 25 reacts or decomposes, in response to the exposure, to release a proton, or other cation, and a weakly coordinating anion (WCA). The proton and WCA serve to cause the conversion of the procatalyst to an active but latent catalyst in situ, that is to say within the exposed regions 25 of the film 10. It will be understood that referring to the procatalyst or catalyst as "active but latent" or "latently active" means that absent any additional changes/reactions, for example, increase in temperature, such latent procatalyst or catalyst will not cause the polymerization of the norbornene-type monomers sufficient to form a functional or useful optical waveguide within the regions 25 at room temperature. Therefore, if storage is desired, the latent procatalyst will not cause the polymerization of the norbornene-type monomers at a temperature of, for example, about −40° C.

In some embodiments of the present invention, for the purpose of obtaining the active but latent catalyst, a PITDM film is exposed to actinic radiation at an exposure energy of 0.1 J/cm$^2$ to 9 J/cm$^2$, or 0.5 J/cm$^2$ to 5 J/cm$^2$. Typically, the PITDM film is exposed to such actinic radiation having a peak wavelength of between 200 nm to 450 nm, although other wavelengths can be useful, the other wavelength being a function of the cocatalyst and/or sensitizer employed.

The active but latent catalyst has an activating temperature lower than an activating temperature of the procatalyst. In some embodiments of the present invention, the active but latent catalyst has an activating temperature 10° C. to 80° C. lower than an activating temperature of the procatalyst.

Figure 3:
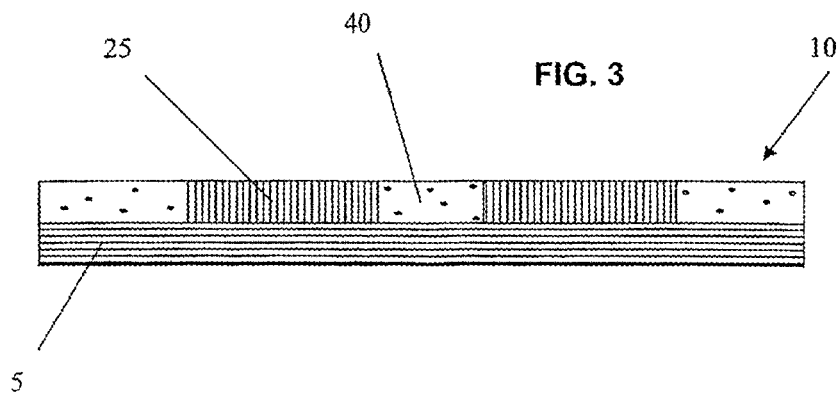

Turning to FIG. 3, the structure of FIG. 2 is shown after thermal curing. That is to say, the structure of FIG. 2 is heated to a first temperature for a first period of time and then to a second temperature, higher than the first, for a second period of time. The first temperature is sufficient to cause the active but latent catalyst to become an active catalyst and cause polymerization of the norbornene-type monomers within the regions 25. The second temperature is sufficiently higher such that the cocatalyst is thermally decomposed or reacted and thus the procatalyst is activated within the unexposed region.

In some embodiments of the present invention, monomers are polymerized in the matrix to form another polymer distinct from the matrix polymer. In other embodiments of the present invention, monomers (crosslinkers) serve to crosslink the polymer matrix. In some other embodiments of the present invention, monomers are polymerized and form a branched polymer from a main chain or a pedant group of the matrix polymer.

Before any exposure to the actinic radiation 30, the PITDM film 10 has a first refractive Index (RI). After such exposure and subsequent heating, exposed regions 25 have a second RI and the laterally adjacent unexposed regions 40 have a third RI, where the second RI and the third RI are different from each other. As mentioned above, the norbornene-type monomers employed in some embodiments of the present invention can be selected such that when they are polymerized within exposed regions 25, thus changing the RI of such exposed regions 25 from the first RI to the second RI. The term "selective polymerization" is therefore used to mean polymerization of monomers within a polymer matrix in a selected region upon exposure of that region to actinic radiation and thermal energy. Without wishing to be bound by theory, it is believed that norbornene-type monomers from unexposed regions 40 diffuse into exposed regions 25 and are polymerized therein, and that such diffusion of monomers from unexposed regions 40 to exposed regions 25 results in the changing of the RI in regions 40 from the first RI to the third RI. Advantageously, this diffusion process is also believed to provide additional monomer to exposed regions 25 for polymerization thus aiding in the RI change of such exposed regions as mentioned above.

In order to provide for a difference between the second RI and the third RI, matrix 15 generally has a refractive index that is different from that of the monomer. In some embodiments of the present invention, matrix 15 has a refractive index higher than that of the monomer.

It is believed that as a result of the diffusion, exposed regions 25 have a concentration of the repeating units or units of the monomer or crosslinker higher than that of unexposed regions 40.

Where the second RI of exposed regions 25 is lower than the third RI of the unexposed regions 40, such unexposed regions 40 serve as optical waveguide cores or channels and exposed regions 25 serve as laterally adjacent cladding regions. Alternatively, where the second RI is higher than the third RI, exposed regions 25 serve as optical waveguide cores or channels and the unexposed regions 40 serve as laterally adjacent cladding regions.

It should be noted that thermal step described above is particularly advantageous when the first period of time is sufficient for polymerization within regions 25 to be substantially complete. In addition, it is advantageous for the second temperature to be sufficiently high to cause any remaining cocatalyst such as a cationic photoinitiator to thermally decompose and form the same species as previously described being caused by the radiation 30. It is believed, again without wishing to be bound by theory of invention, that this second heating results not only in the polymerization of any residual, not yet polymerized, norbornene-type monomers within exposed regions 25, but also to cause the polymerization of any of such monomers remaining in unexposed regions 40. In this manner, heating to the second temperature serves to stabilize the resulting structure of optical waveguide channel (or core) having laterally adjacent cladding regions. If necessary, additional heating can be applied for further stabilization, and in such case, generally the additional heating is carried out at a temperature 20° C. higher than the second heating.

In addition to this at least two step curing cycle, it is also advantageous in some embodiments of the present invention to wait for a period of time of about 30 minutes to about 60 minutes before beginning the first step of the thermal cure cycle of an exposed structure. While it is uncertain why this waiting period is advantageous, delaying the thermal cure may allow a more complete or uniform conversion of a procatalyst to a latent catalyst, thus providing more uniform polymerization within exposed region.

In some of the embodiments of the present invention, the proton generated from the photoinitiator interacts with the moiety, or site, of the cleavable pendant group, such that cleaving of at least a portion of such pendant group occurs. Without wishing to be bound by theory, it is believed that some or all of the pendant group are partly or entirely cleaved at the time of receiving appropriate exposure energy and/or at the time of heating at an appropriate temperature.

Referring to some exemplary embodiments V21-25 and V51 in accordance with the present invention, film 10 can include matrix 15 which encompasses a homopolymer or a copolymer of diphenylmethyl norbornenemethoxysilane (diPhNB) and a photo acid generator, e.g., RHODORSIL® PHOTOINITIATOR 2074. When this film is exposed to an actinic radiation through a photomask, a change or a reaction in the matrix 15 is initiated in the region 25.

In the embodiments using matrix 15 of a norbornene-type polymer, for the purpose of cleaving the cleavable pendant group, region 25 is exposed at an exposure energy of 1 J/cm$^2$ to 9 J/cm$^2$, and in particular, of 3 J/cm$^2$ to 6 J/cm$^2$. For example, region 25 can be exposed to an actinic radiation having a peak wavelength of between 200 nm to 450 nm.

After the exposure, the film is heated, and as a result, the refractive index changes in the exposed region 25. Without being bound by theory, it is believed that the cleaved pendant group is removed from the matrix when the film is heated. In view of forming a waveguide structure having distinct refractive index regions, in some embodiments the film is heated to a temperature of 70° C. or more, in other embodiments to a temperature of 85° C. or more. The upper limit of the temperature is a function of the heat resistance of the film. In case of the norbornene-type polymer, the upper limit is generally about 200° C. Therefore, for such films encompassing norbornene-type polymers, the range for the heating is generally from 70° C. to 195° C., and typically, from 85° C. to 150° C.

Thus, in some embodiments in accordance with the present invention, unexposed regions 40 have a concentration of the pendant group higher than that of exposed regions 25.

In the embodiments in accordance with the present invention, distinct refractive indices within exposed regions 25 and unexposed regions 40 can be obtained by either the effect of the selective polymerization or the effect of the photo bleaching, or by the combined effect of selective polymerization and photo bleaching. To obtain the effect of the selective polymerization according to some embodiments of the present invention, the PITDM includes a polymer matrix, a monomer, a cocatalyst and a procatalyst, as discussed above. To obtain the effect of the photo bleaching, the PITDM includes a polymer matrix including a cleavable pendant group and a photoinitiator, as discussed above. To obtain both of these effects, the PITDM includes a monomer, and a procatalyst, a polymer matrix including a cleavable pendant group and a suitable photoinitiator, as discussed above.

To obtain the effect of the selective polymerization, more than one heating step is generally employed while for the effect of photo bleaching, it is sufficient to apply only one heating step. It should be noted that even after the heating(s), the procatalyst, cocatalyst and/or residue(s) thereof may remain in the resultant waveguide structure. By the effect of the selective polymerization, the effect of the photo bleaching, or their combination as described in the embodiments of the present invention, optical waveguides can be provided by more simplified processing and in less time, for example, compared to glass optical waveguides.

Figure 4A:
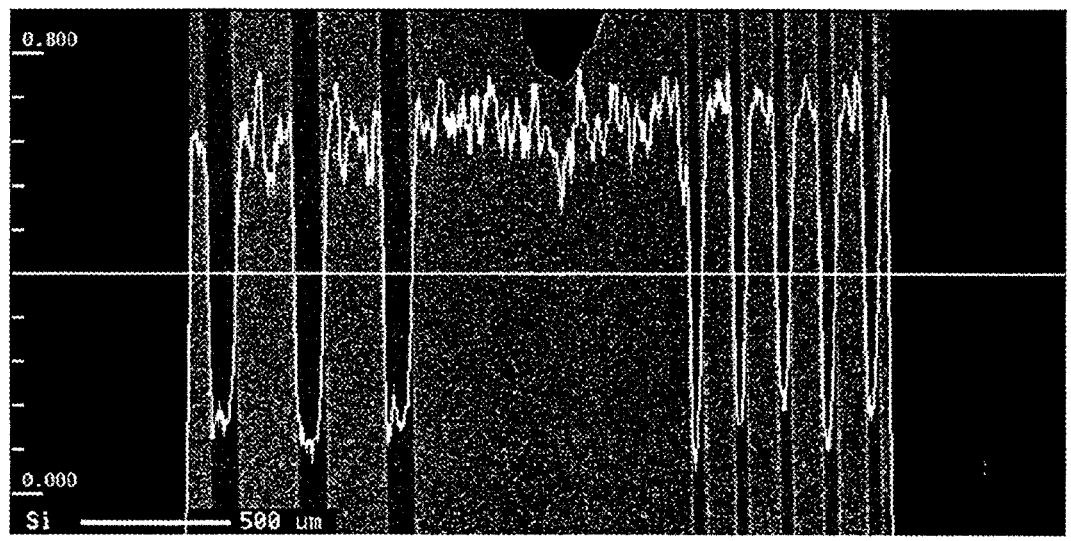
FIGS. 4(A) and 4(B) are Electron Probe Microanalyses (EPMA) of a structure formed in the manner of the sequence depicted in FIGS. 1, 2 and 3.
Figure 4B:
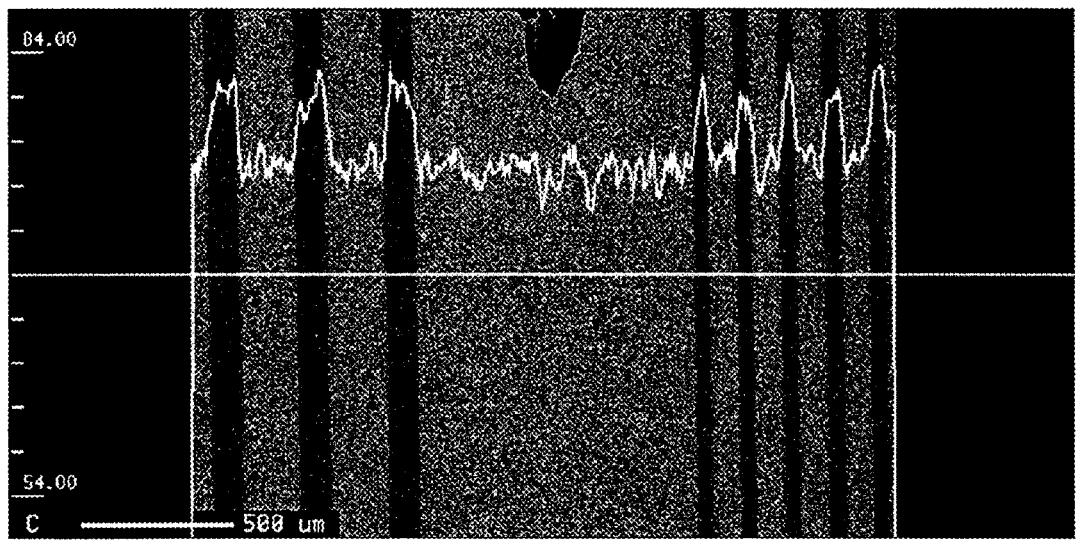

Referring to FIGS. 4(A) and 4(B), Electron Probe Microanalyses (EPMA) of a waveguide pattern formed in an exemplary film in accordance with the present invention is shown. For the purpose of enhancing the sensitivity of the EPMA, a crosslinker monomer SiX is used in the exemplary film, thus increasing silicon available for detection. On the upper portion of the EPMA, silicon concentration is mapped, and in each of the vertically extending areas corresponding to unexposed regions, the silicon concentration is reduced relative to the adjacent areas corresponding to exposed regions. It is possible and believed that such an EPMA is one indication that some of the SiX monomer diffuse from unexposed regions to exposed regions where the SiX monomer are polymerized.

In some embodiments according to the present invention, film 10 can be removed from substrate 5 after formation of an optical waveguide, that is to say, formation of core regions and laterally adjacent cladding regions, and film 10 can be laminated to or disposed on one or more layers which serve as a cladding layer. Such a cladding layer can be selected or formed such that they have a refractive index (RI) similar to the RI of the laterally adjacent cladding regions of film 10.

FIGS. 5-9 sequentially show processes of forming a multilayered optical waveguide structure according to some embodiments of the present invention.

Figure 5:
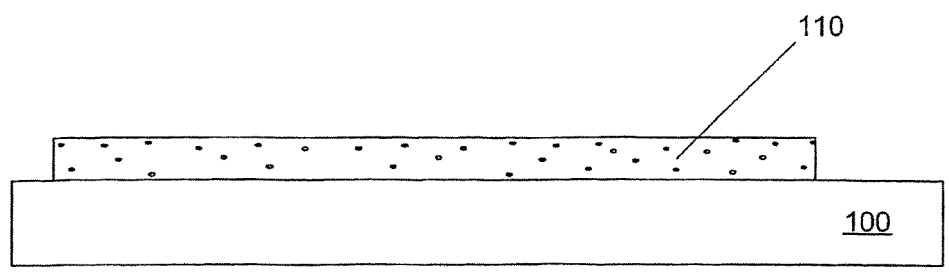
FIGS. 5, 6, 7, 8 and 9 are schematic drawings that illustrate in a simplified manner a sequence of forming waveguide regions in a waveguide patternable film in accordance with another exemplary embodiment of the present invention.

In FIG. 5, a first layer 110 of a first varnish solution is formed in an essentially uniform thickness on substrate 100. Generally, substrate 100 is a film of glass, quartz, or polyethylene terephthalate (PET).

In some embodiments of the present invention, the first layer 110 has an essentially uniform thickness of about 5 μm to about 200 μm, about 10 μm to about 100 μm, or about 15 μm to about 65 μm. To spread a varnish solution evenly on substrate, any appropriate coating methods including the ones discussed in the embodiments of FIGS. 1-3 above.

Figure 6:
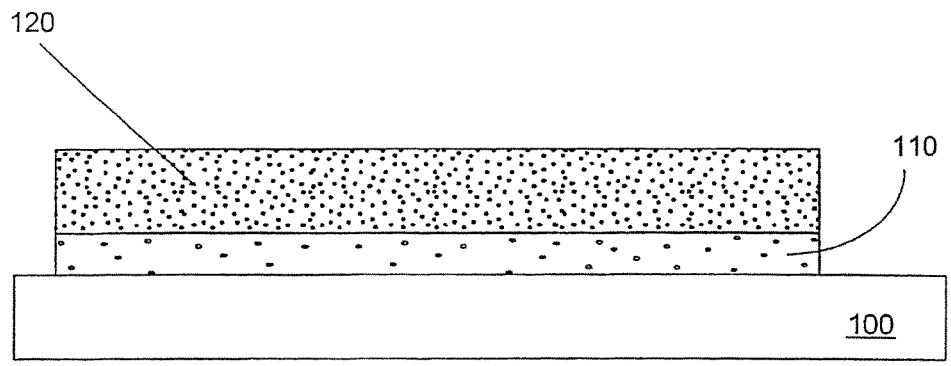

In FIG. 6, second layer 120 of a photo-induced thermally developable material (PITDM) is shown as disposed over first layer 110. Second layer 120 can be formed over first layer 110 by spreading a second varnish solution encompassing the PITDM using an appropriate spreading method even before substantially drying first layer 110.

It is believed that while layers 110 and 120 remain essentially distinct from one another, some intermixing of the varnish solutions of layers 110 and 120 can occur at their interface in some embodiments according to the present invention. While not wishing to be bound by theory, it is believed that such intermixing of two varnish solutions can be beneficial in enhancing adhesion between layers 110 and 120 when a multilayered optical waveguide structure is completed. To control such intermixing as well as to maintain uniform spreading of first and second varnish solutions in a desired thickness, varnish solutions can have certain viscosities. For example, in some embodiments of the present invention, first and second varnish solutions can have a viscosity of about 100 centipoise to about 10000 centipoise, a viscosity of about 150 centipoise to about 5000 centipoise, or a viscosity of about 200 centipoise to about 3500 centipoise. In some embodiments in accordance with the present invention, second varnish solution can have a viscosity higher than that of first varnish solution. In some embodiments of the present invention, layer 120 has an as-spread thickness of about 5 µm to 200 µm, about 15 µm to 125 µm, or about 25 µm to about 100 µm.

Figure 7:
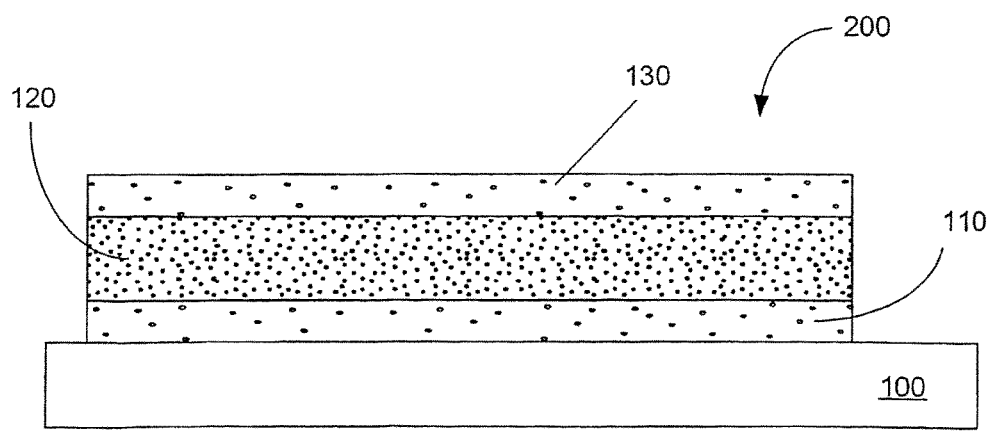

Turning to FIG. 7, third layer 130 of a third varnish solution is shown as disposed over second layer 120, forming a three-layer waveguide structure 200. Layer 130 is applied over layer 120 in a manner analogous to that of layer 120.

In some embodiments of the present invention, layer 130 has an as-spread thickness of about 5 µm to 200 µm, about 10 µm to 100 µm, or about 15 µm to 65 µm. The three-layer structure is then heated to a temperature of about 25° C. to 40° C. for about 15 minutes to 60 minutes to allow at least some of the solvent(s) in varnish solutions to evaporate.

In the three-layer structure 200 in FIG. 7, waveguides, that is to say, core regions and laterally adjacent cladding regions, are formed in layer 120, in a manner analogous to regions 40 and regions 25 of layer 10 above. However, in FIGS. 5-9, first and third layers 110 and 130 form cladding regions distinct from laterally adjacent cladding regions in layer 120. Thus, in some embodiments as described in FIGS. 5-9 according to the present invention, cladding layers are not laminated to core or waveguide layer. That is, while layers 110, 120 and 130 can be spread without substantially drying, in some embodiments of the present invention, layers 110, 120 and 130 can be spread with some drying.

As previously described, layers 110, 120 and 130 can intermix at their interfaces to allow adhesion in a completed three-layer waveguide structure. In some embodiments in accordance with the present invention, layers 110 and 130 can employ varnish solutions analogous to that of layer 120. Thus, polymerization of monomers can take place in layers 110 and 130, at their interfaces of layer 120, and/or across such interfaces.

Figure 8:
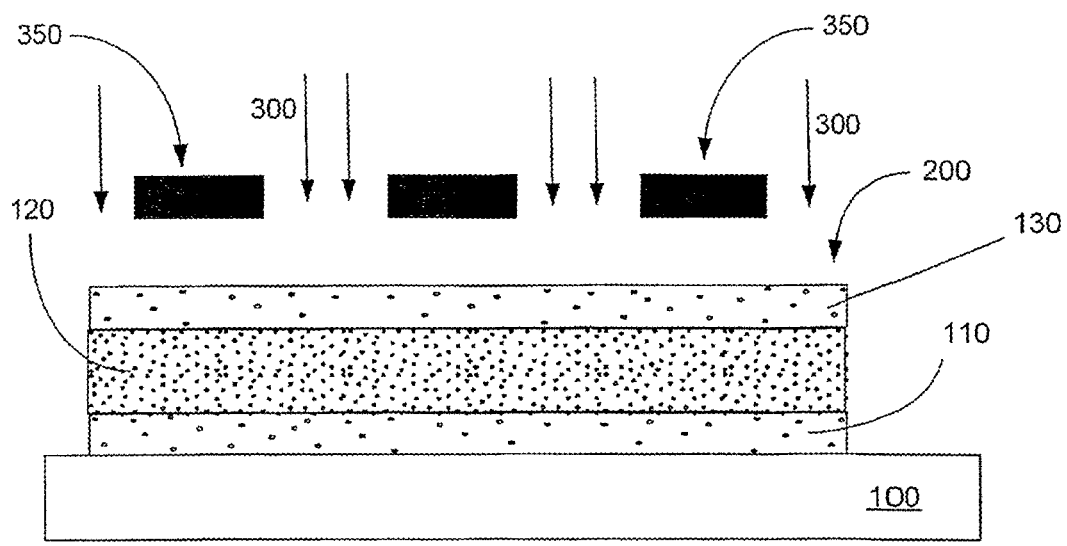

Turning to FIG. 8, three-layer structure 200 is shown as being exposed to actinic radiation 300 through masking elements 350. Regions 150 are exposed to actinic radiation 300 through masking elements 350; but regions 140 are protected from such exposure by opaque portions of masking elements 350. Source of actinic radiation 300 is selected based on the sensitivity of a cocatalyst, e.g., a cationic photoinitiator. Thus, where RHODORSIL® 2074 is employed in layer 120, a mercury vapor lamp is used as an ultraviolet (UV) radiation source to provide sufficient energy below 300 nanometers (nm) to cause the decomposition of Rhodorsil and provide cation and WCA within exposed regions 150.

While masking element 350 shown in FIG. 8 has two openings through which radiation 300 passes, masking element 350 can be have any patterns to define one or more optical waveguide elements and/or coupling devices.

Figure 9:
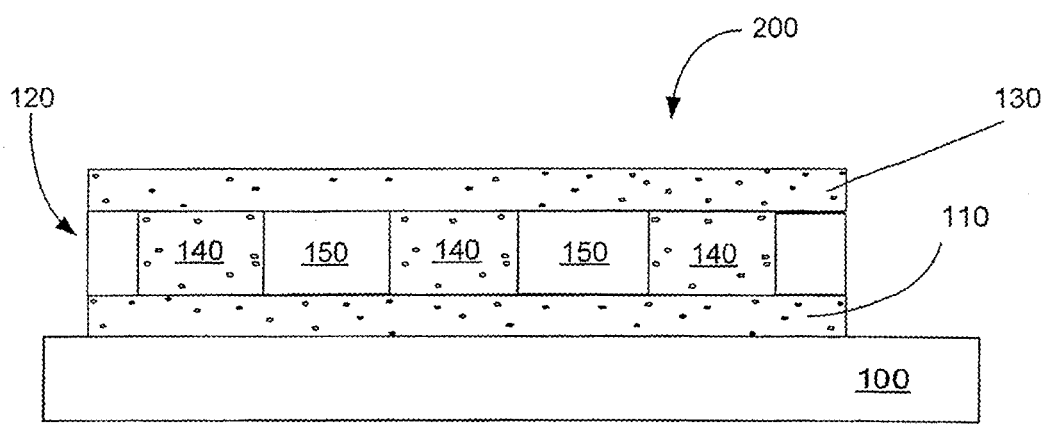
Figure 10:
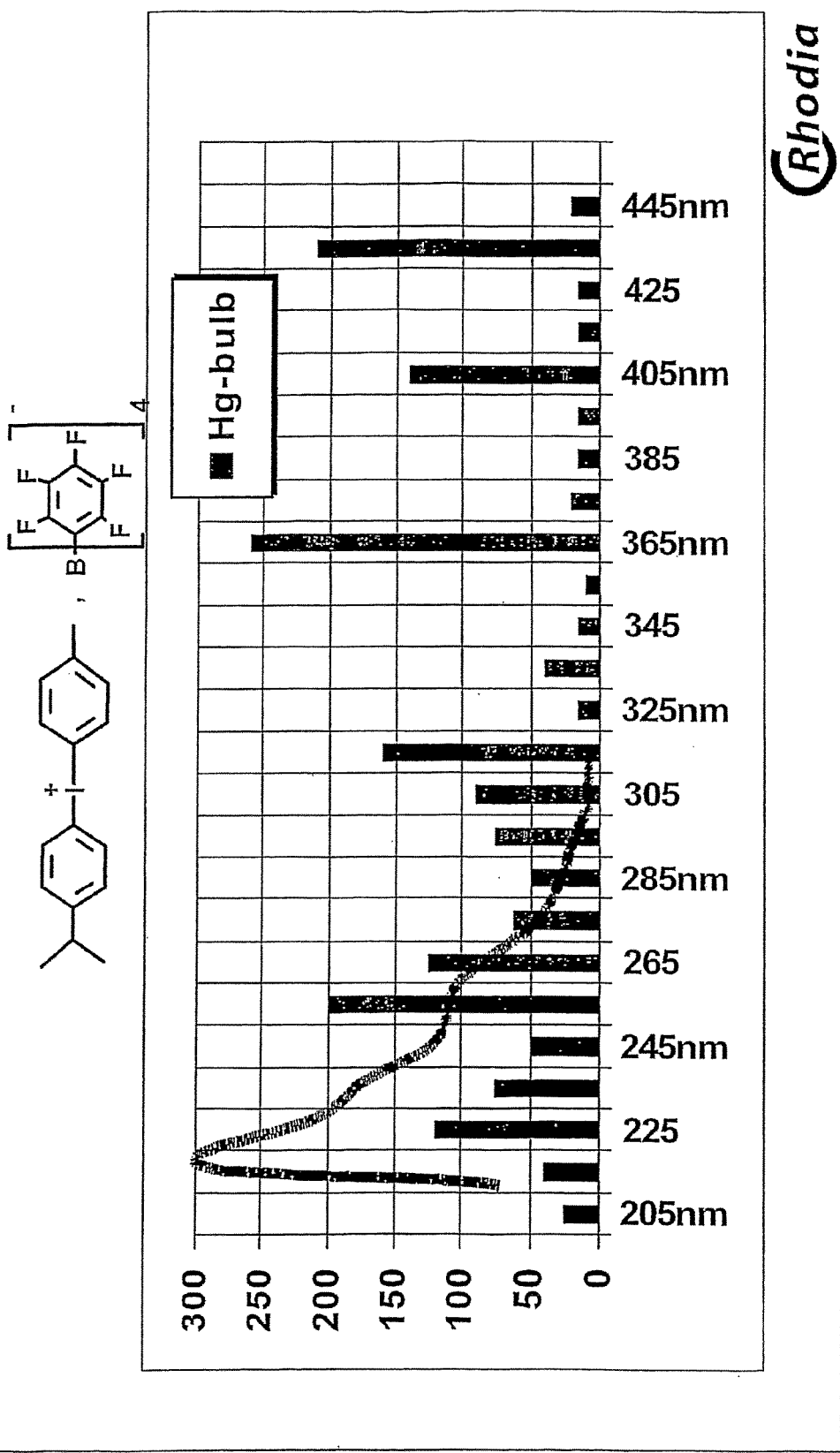
FIG. 10 is a bar chart depicting the amount of energy output by a typical mercury vapor lamp at selected wavelengths within the UV spectrum and an overlaid absorption spectra of RHODORSIL® PHOTOINITIATOR2074 (available from Rhodia USA Inc., Cranbury, N.J.)

Referring to FIG. 9, the structure of FIG. 8 after thermal curing is shown. That is to say, the structure shown in FIG. 9 is first heated to a first temperature for a first period of time to allow removal of any residual solvents in structure 200, then second heated to a second temperature higher than the first temperature for a second period of time, and finally third heated to a third temperature higher than the second temperature for a third period of time. The second temperature is sufficient to cause an active but latent catalyst to become an active catalyst and cause polymerization of norbornene-type monomers within exposed regions 150. Without wishing to be bound by theory, it is believed that in addition to polymerization of norbornene-type monomer in regions 150 upon exposure to actinic radiation 300, norbornene-type monomer diffuses into exposed regions 150 from unexposed regions 140 in layer 120 and is polymerized therein. The exposure and thermal curing of layers in structure 200 are analogous to those described in the embodiments of FIGS. 1-3. Thus, after the second heating, a waveguide pattern can be visible within structure 200 where one of the exposed and unexposed regions 150 and 140 is a core region and the other is a laterally adjacent cladding region.

While the second temperature can be sufficient for substantially complete polymerization within regions 150, the third temperature can be sufficiently high such that any remaining cocatalyst is thermally decomposed and form the same species as the ones caused by radiation 300. It is believed, again without wishing to be bound by theory, that the third heating results in polymerization of any residual, not yet polymerized, monomers within exposed regions 150, and also causes polymerization of monomers remaining in unexposed regions 140. It will be realized that the third temperature serves to stabilize a resulting optical waveguide structure.

In some embodiments according to the present invention, layers 110 and 130 can include a procatalyst, a polymer matrix, monomers and a cocatalyst. Materials for layers 110 and 130 can be selected based on the effects of the selective polymerization and photo bleaching. When layers 110 and 130 are to serve as cladding layers, polymer matrices of layers 110 and 130 can be different from polymer matrix employed for layer 120. For example, where polymer matrix of layer 120 has a relatively high refractive index (RI), polymer matrices of layers 110 and 130 can have a relatively low RI. Thus, layers 110 and 130 do not develop distinct core and cladding regions. In addition, monomer for such layers 110 and 130 can be the same monomer as that of layer 120 and catalyst to monomer ratio in layers 110 and 130 can be adjusted to be lower than that of layer 120. As such, polymer matrices of layers 110 and 130 can have a refractive index which is the same as or similar to that of monomers included therein, and still avoid formation of distinct core and clad regions in layers 110 and 130. Also, in some embodiments according to the present invention, layers 110 and 130 include a polymer matrix having repeat units without a cleavable pendant group, and/or include no photo acid generator, thereby avoiding the effect of the photo-bleaching in layers 110 and 130. Without wishing to be bound by theory, it is believed that monomer from layers 110 and 130 diffuses into layer 120 and polymerizes to polymer chains in an adjacent layer. Adhesion between such adjacent layers can be enhanced. Other varnish solutions for layers 110 and 130 are contemplated and/or have been evaluated. For example, in some embodiments of the present invention, varnish solutions for layers 110 and 130 incorporate norbornene-type polymers where at least one of norbornene-type repeat units encompasses a pendant group having an epoxide moiety, and an acid generating material, providing for opening of the epoxide moiety. Such varnish solutions also improve adhesion between layers 110 and 130.

In some embodiments of the present invention, varnish solutions can include a norbornene-type polymer where at least one of its repeat units encompasses a pendant group having an epoxy moiety or TMSE (trimethoxysilylethyl) moiety group. An exemplary norbornene-type polymer is a copolymer of Hexyl Norbornene (HxNB) and norbornenemethylglycidylether (AGENB) and an exemplary varnish solution includes such a HxNB/AGENB copolymer and an acid generator material suitable for causing its epoxy moiety to open. Such a varnish solution provides excellent adhesion to a waveguide layer with core and laterally adjacent cladding regions. In some embodiments, acid generator material can be a photoinitiator such as RHODORSIL 2074 or TAG-372R which is suitable for opening an epoxy moiety during formation of an adjacent waveguide layer. In some embodiments according to the present invention, acid generator material can be selected such that an epoxy moiety can be opened independently from formation of an adjacent waveguide layer. For example, an acid generator can be selected such that it does not absorb actinic radiation appropriate for a cocatalyst in a waveguide layer or it is thermally activated rather than photonically activated. In some embodiments according to the present invention, a non-absorbing photo-base generator (PBG) or a thermal-base generator (TBG) can be used in a varnish solution. Such generators can also provide opening of an epoxy moiety.

As described above, a three-layer waveguide structures can be formed in some embodiments of the present invention using varnish solutions encompassing norbornene-type repeat units with an epoxy moiety.

Monomers

As discussed above, a monomer can be included in the PITMD. In some embodiments in accordance with the present invention, the monomer can include norbornene-type monomers. For example, the norbornene-type monomers in accordance with the present invention may be represented by Structure C below:

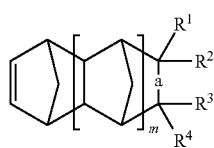

C wherein "a" represents a single or double bond, $R^1$ to $R^4$ independently represent a hydrogen, hydrocarbyl or functional substituent, m is an integer from 0 to 5, and when "a" is a double bond, one of $R^1$, $R^2$ and one of $R^3$, $R^4$ are not present.

When the substituent is a hydrocarbyl group, $R^1$ to $R^4$ can be a halohydrocarbyl, or perhalohydrocarbyl group, or even a perhalocarbyl group (e.g., a trifluoromethyl group). In one embodiment, $R^1$ to $R^4$ independently represent hydrocarbyl, halogenated hydrocarbyl and perhalogenated hydrocarbyl groups selected from hydrogen, linear or branched $C_1$-$C_{10}$ alkyl, linear or branched $C_2$-$C_{10}$ alkenyl, linear or branched $C_2$-$C_{10}$ alkynyl, $C_4$-$C_{12}$ cycloalkyl, $C_4$-$C_{12}$ cycloalkenyl, $C_6$-$C_{12}$ aryl, and $C_7$-$C_{24}$ aralkyl, $R_1$ and $R_2$ or $R_3$ and $R_4$ can be taken together to represent a $C_1$-$C_{10}$ alkylidenyl group. Representative alkyl groups include but are not limited to methyl, ethyl, propyl, isopropyl, butyl, isobutyl, sec-butyl, tert butyl, pentyl, neopentyl, hexyl, heptyl, octyl, nonyl, and decyl. Representative alkenyl groups include but are not limited to vinyl, allyl, butenyl, and cyclohexenyl. Representative alkynyl groups include but are not limited to ethynyl, 1-propynyl, 2-propynyl, 1-butynyl, and 2-butynyl. Representative cycloalkyl groups include but are not limited to cyclopentyl, cyclohexyl, and cyclooctyl substituents. Representative aryl groups include but are not limited to phenyl, naphthyl, and anthracenyl. Representative aralkyl groups include but are not limited to benzyl, and phenethyl. Representative alkylidenyl groups include methylidenyl, and ethylidenyl groups.

In one embodiment, the perhalohydrocarbyl groups include perhalogenated phenyl and alkyl groups. The halogenated alkyl groups useful in the embodiment of invention are partially or fully halogenated and are linear or branched, and have the formula $C_zX''_{2z+1}$ wherein X" is independently a halogen or a hydrogen and z is selected from an integer of 1 to 20. In another embodiment, each X" is independently selected from hydrogen, chlorine, fluorine and/or bromine. In yet another embodiment, each X" is independently either a hydrogen or a fluorine.

In another embodiment, the perfluorinated substituents include perfluorophenyl, perfluoromethyl, perfluoroethyl, perfluoropropyl, perfluorobutyl, and perfluorohexyl. In addition to the halogen substituents, the cycloalkyl, aryl, and aralkyl groups of the invention can be further substituted with linear or branched $C_1$-$C_5$ alkyl and haloalkyl groups, aryl groups and cycloalkyl groups.

When the pendant group(s) is(are) a functional substituent, $R^1$ to $R^4$ independently represent a radical selected from $(CH_2)_n$—$CH(CF_3)_2$—O—$Si(Me)_3$, —$(CH_2)_n$—$CH(CF_3)_2$—O—$CH_2$—O—$CH_3$, $(CH_2)_n$—$CH(CF_3)_2$—O—C(O)—O—$C(CH_3)_3$, —$(CH_2)_n$—$C(CF_3)_2$—OH, $(CH_2)_nC(O)NH_2$, $(CH_2)_nC(O)Cl$, $(CH_2)_nC(O)OR^5$, $(CH_2)_n$—$OR^5$, —$(CH_2)_n$—$OC(O)R^5$, $(CH_2)_nC(O)R^5$, $(CH_2)_n$—$OC(O)OR^5$, $(CH_2)_nSi(R^5)_3$, —$(CH_2)_nSi(OR^5)_3$, —$(CH_2)_n$—O—$Si(R^5)_3$, and $(CH_2)_nC(O)OR^6$ wherein n independently represents an integer from 0 to 10 and $R^5$ independently represents hydrogen, linear or branched $C_1$-$C_{20}$ alkyl, linear or branched $C_1$-$C_{20}$ halogenated or perhalogenated alkyl, linear or branched $C_2$-$C_{10}$ alkenyl, linear or branched $C_2$-$C_{10}$ alkynyl, $C_5$-$C_{12}$ cycloalkyl, $C_6$-$C_{14}$ aryl, $C_6$-$C_{14}$ halogenated or perhalogenated aryl, and $C_7$-$C_{24}$ aralkyl. Representative hydrocarbyl groups set forth under the definition of $R^5$ are the same as those identified above under the definition of $R^1$ to $R^4$. As set forth above under $R^1$ to $R^4$ the hydrocarbyl groups defined under $R^5$ can be halogenated and perhalogenated. For example, when $R^5$ is $C_1$-$C_{20}$ halogenated or perhalogenated alkyl, $R^5$ can be represented by the formula $C_zX''_{2z+1}$, wherein z and X" are defined as above, and at least one X" on the alkyl group must be a halogen (e.g., Br, Cl, or F). It is to be recognized that when the alkyl group is perhalogenated, all X" substituents are halogenated. Examples of perhalogenated alkyl groups include, but are not limited to, trifluoromethyl, trichloromethyl, —$C_7F_{15}$, and —$C_{11}F_{23}$. Examples of perhalogenated aryl groups include, but are not limited to, pentachlorophenyl and pentafluorophenyl. The $R^6$ radical represents an acid labile moiety selected from —$C(CH_3)_3$, —$Si(CH_3)_3$, $CH(R^7)OCH_2CH_3$, —$CH(R^7)OC(CH_3)_3$ or the following cyclic groups:

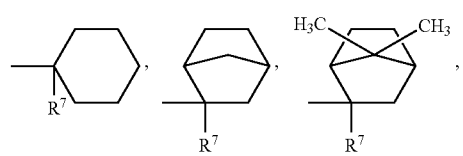

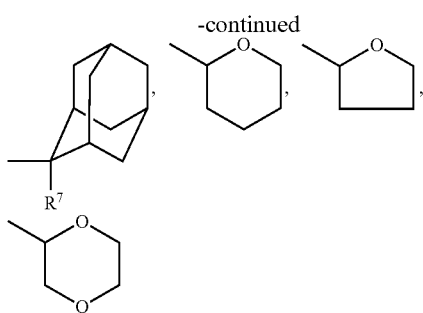

wherein $R^7$ represents hydrogen or a linear or branched ($C_1$-$C_5$) alkyl group. The alkyl groups include methyl, ethyl, propyl, i-propyl, butyl, i butyl, t butyl, pentyl, t-pentyl and neopentyl. In the above structures, the single bond line projecting from the cyclic groups indicates the position where the cyclic protecting group is bonded to the acid substituent. Examples of R6 radicals include 1-methyl-1-cyclohexyl, isobornyl, 2-methyl-2-isobornyl, 2-methyl-2-adamantyl, tetrahydrofuranyl, tetrahydropyranoyl, 3-oxocyclohexanonyl, mevalonic lactonyl, 1-ethoxyethyl, and 1-t-butoxy ethyl.

The $R^6$ radical can also represent dicyclopropylmethyl (Dcpm), and dimethylcyclopropylmethyl (Dmcp) groups which are represented by the following structures:

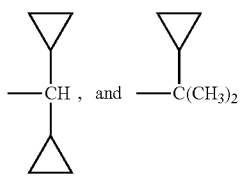

In some embodiments of the present invention, the monomers discussed above can be polymerized and employed as polymer matrix for photo-induced thermally developable materials (PITDM). To obtain polymer matrix with a relatively high RI, monomers having aromatic, nitrogen, Br or Cl moieties can be generally selected and polymerized. On the other hand, to obtain polymer matrix with a relatively low RI, monomers having alkyl, F and/or ether moieties can be generally selected and polymerized. In addition, the monomers discussed above can be employed for norbornene-type monomers in preparing varnish solutions in some embodiments according to the present invention.

While the embodiments of the present invention are described about the PITDM including norbornene-type monomers, the present invention is not limited to such monomers. Hence, monomers other than the norbornene-type monomers are also within the scope and spirit of the present invention. Such monomers include those which can be polymerized or crosslinked using polymerization methods exemplified herein, or by means of any appropriate addition polymerization method and/or ring-opening polymerization method. Exemplary monomers include acrylates, methacrylates, epoxides, styrenes, etc.

Crosslinking Monomers

In addition to the norbornene-type monomers represented by Structure C, a "crosslinking monomer" can be also employed. In some embodiments, such crosslinking monomers can be norbornene-type monomers. For example, crosslinked polymers can be prepared by copolymerizing the norbornene-type monomer(s) set forth under Structure C above with a multifunctional norbornene-type crosslinking monomer. By multifunctional norbornene-type crosslinking monomer is meant that the crosslinking monomer contains at least two norbornene-type moieties (norbornene-type double bonds), each functionality being polymerizable in the presence of the catalyst system of the present invention. The crosslinkable monomers include fused multicyclic ring systems and linked multicyclic ring systems. Examples of fused crosslinking agents are illustrated in structures below. For brevity, norbornadiene is included as a fused multicyclic crosslinking agent and is considered to contain two polymerizable norbornene-type double bonds. Crosslinking monomers provide at least one of the following benefits: crosslinking monomers polymerize faster, thus shortening process; they are less susceptible to evaporation during heating steps, thereby suppressing vapor-pressure; and they improve heat-resistance of optical waveguides.

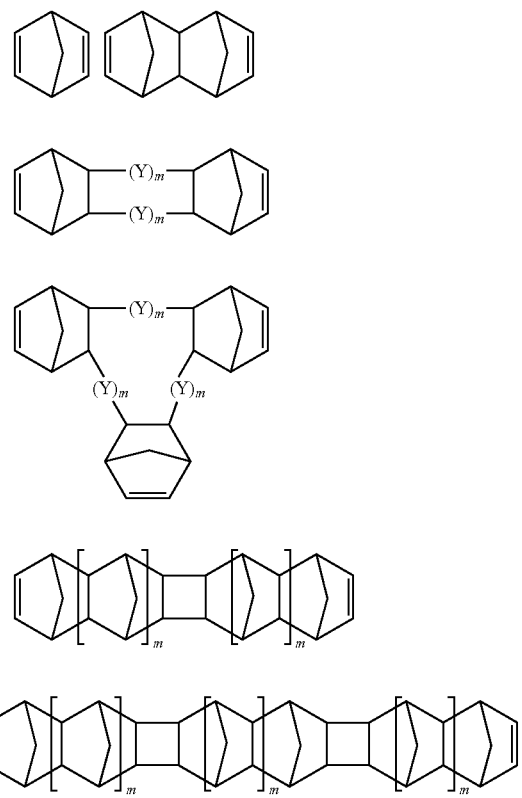

wherein Y represents a methylene (—$CH_2$—) group and m independently represents an integer from 0 to 5, and when m is 0, Y represents a single bond. Representative monomers under the forgoing formulae are set forth below.

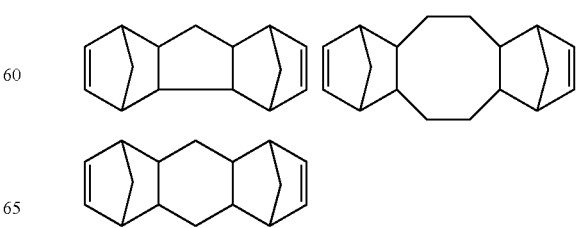

-continued

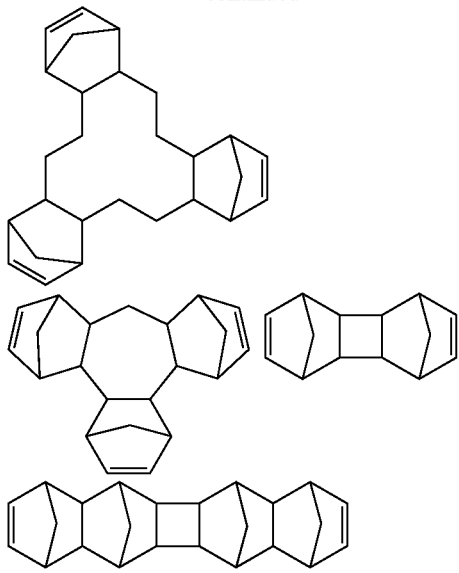

A linked multicyclic crosslinking agent is illustrated generically by the following structure:

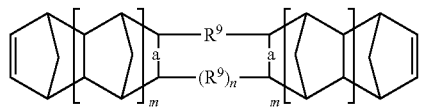

wherein "a" independently represents a single or double bond, m independently is an integer from 0 to 5, $R^9$ is a divalent radical selected from divalent hydrocarbyl radicals, divalent ether radicals and divalent silyl radicals, and n is equal to 0 or 1. By divalent is meant that a free valence at each terminal end of the radical is attached to a norbornene-type moiety. In one embodiment, the divalent hydrocarbyl radicals are alkylene radicals and divalent aromatic radicals. The alkylene radicals are represented by the formula —$(C_dH_{2d})$— where d represents the number of carbon atoms in the alkylene chain and is an integer from 1 to 10. The alkylene radicals are, in one embodiment, selected from linear or branched ($C_1$ to $C_{10}$) alkylene such as methylene, ethylene, propylene, butylene, pentylene, hexylene, heptylene, octylene, nonylene, and decylene. When branched alkylene radicals are contemplated, it is to be understood that a hydrogen atom in the alkylene backbone is replaced with a linear or branched ($C_1$ to $C_5$) alkyl group.

The divalent aromatic radicals are selected from divalent phenyl, and divalent naphthyl radicals. The divalent ether radicals are represented by the group

—$R_{10}$—O—$R_{10}$—, wherein $R^{10}$ independently is the same as $R^9$. Examples of specific linked multicyclic crosslinking agents are represented as the following structures:

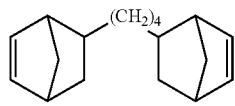

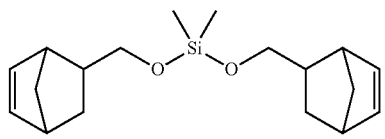 [SMILES: C[Si](C)(OCC1CC2C=CC1C2)OCC1CC2C=CC1C2]

In one embodiment, the crosslinking agent is selected from those shown below:

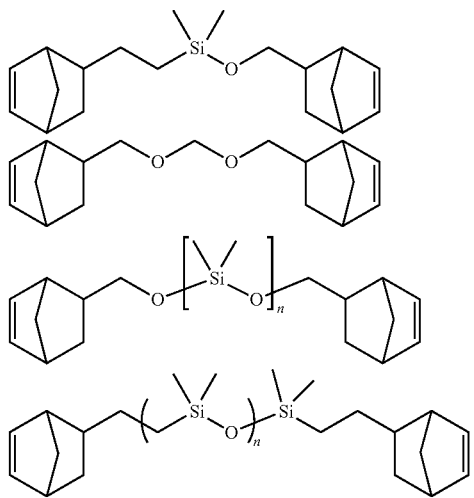

which is dimethyl bis[bicyclo[2.2.1]hept-2-ene-5-methoxy] silane (also referred to herein as dimethyl bis(norbornene methoxy) silane or SiX),

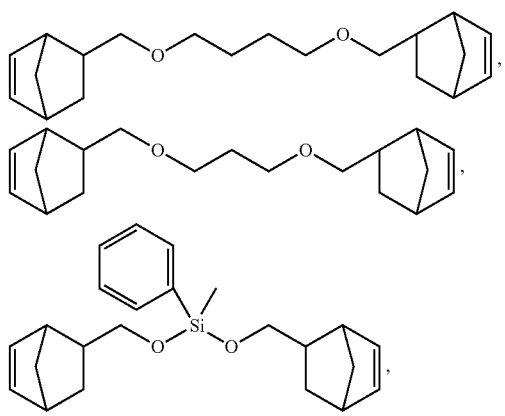

where n is 0 to 4,

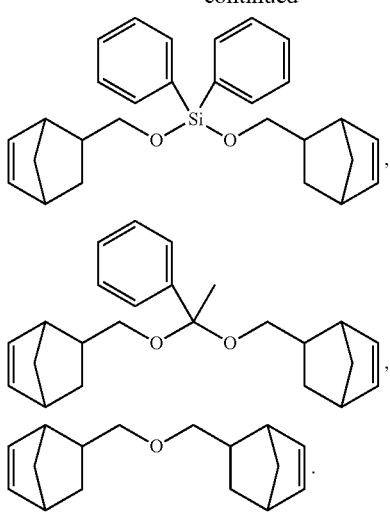
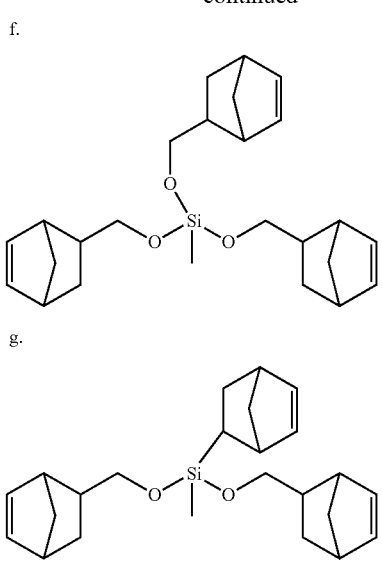
Some other types of norbornene-based crosslinking agents include, but are not limited to, those represented in the formulae below.
a.
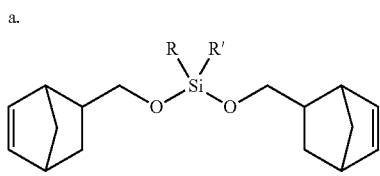
R and R' = alkyl or aryl
b.
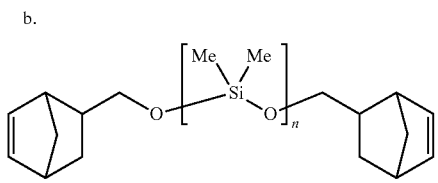
c.
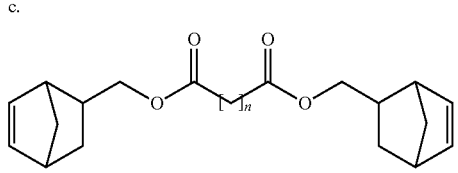
d.
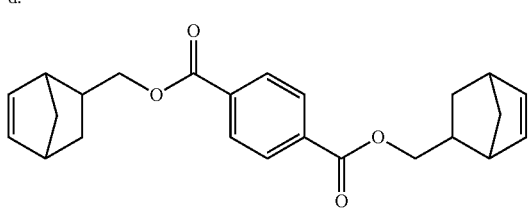
e.
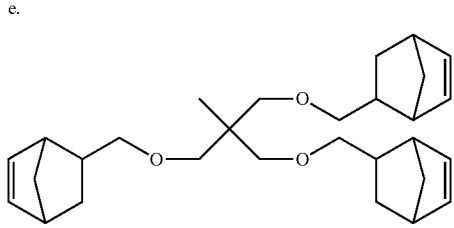
f.
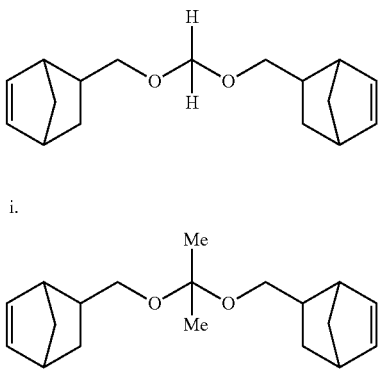
g.
h.
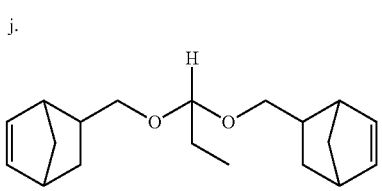
i.
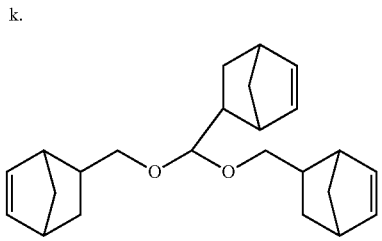
j.
k.
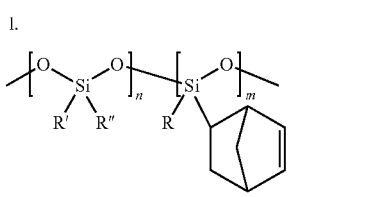
l.
R, R', R" = alkyl or aryl m.

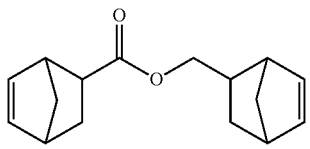

where m and n, if present in the formulae above, are independently an integer from 1 to 4.

In another embodiment, fluorine-containing norbornene-based crosslinkers are used. For example, in one embodiment one or more of the following fluorinated norbornene crosslinking agents can be utilized:

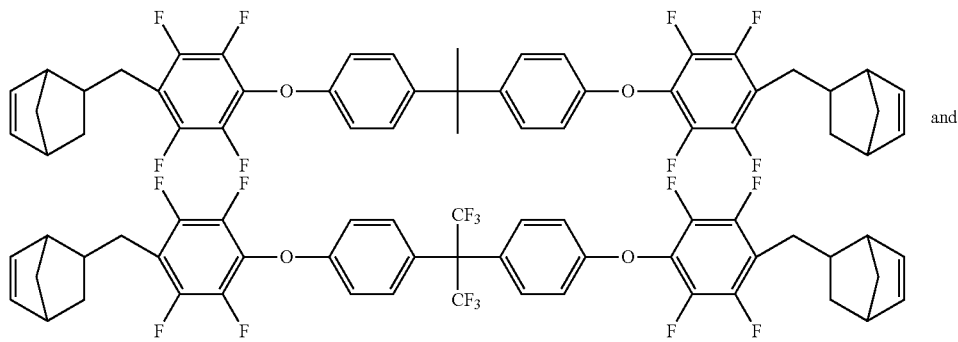

and

It should be realized that monomers useful for embodiments in accordance with the present invention are not limited to the above. Also, exemplary monomers, as listed above, may be used alone or in combination.

After forming the polymer matrix having the desired RI, a solution of such matrix polymer and other materials is prepared. As mentioned above, the other materials include, but are not limited to, one or more distinct monomers, procatalyst and cocatalyst, for example, norbornene-type monomers where at least one of such monomers is a crosslinking norbornene-type monomer, a cationic photoinitiator and, where desired, an antioxidant as described above. The RI of such solution is either higher or lower than that of polymer matrix. Monomers selected for a varnish solution are a function of a relative RI of regions to be exposed. Thus in some embodiments of the present invention, where a relatively high RI is desired for an exposed region, a polymer matrix with a relatively low RI can be employed together with monomers which give rise to a relatively high RI when polymerized. However, in forming one or more waveguide cores and laterally adjacent cladding regions, any other combinations of polymer matrix and at least one monomer can be employed to obtain different refractive indices in exposed and unexposed regions.

The terms "high," "relatively high," "low," "relatively low" do not refer to absolute values of RI. Rather such terms are merely indicative of refractive indices of regions, polymers or materials relative to one another. That is to say, a material or polymer is said to have a "high" or "relatively high" RI when compared to another material, polymer or region having a lower RI.

Procatalysts

As mentioned above, some embodiments in accordance with the present invention use procatalyst moieties represented by Formulae Ia and Ib:

$(E(R)_3)_2Pd(Q)_2$  Ia; and $[(E(R)_3)_aPd(Q)(LB)_b]_p[WCA]_r$  Ib.

In Formulae Ia and Ib, R, E, Q and LB are as previously defined. Exemplary procatalysts in accordance with formula Ia include, but are not limited to $Pd(P-i-Pr_3)_2(OAc)_2$, $Pd(PCy_3)_2(OAc)_2$, $Pd(PCy_3)_2(O_2CCMe_3)_2$, $Pd(PCp_3)_2(OAc)_2$, $Pd(PCy_3)_2(O_2CCF_3)_2$ and $Pd(PCy_3)_2(O_2CC_6H_5)_3$, where Cp is cyclopentyl and Cy is cyclohexyl.

The following procatalyst synthesis examples $C_1$ to $C_4$ demonstrate the preparation of several exemplary procatalysts useful in embodiments of the present invention.

EXAMPLE C1

Preparation of $Pd(OAc)_2(P(i-Pr)_3)_2$

In a $N_2$ filled flask equipped with an addition funnel, a $CH_2Cl_2$ solution (20 mL) of $P(i-Pr)_3$ (8.51 mL, 44.6 mmol) was added drop-wise to a -78° C. stirring reddish brown suspension of $Pd(OAc)_2$ (5.00 g, 22.3 mmol) in $CH_2Cl_2$ (30 mL). The suspension gradually cleared to a yellow green solution which was allowed to warm to room temperature, stirred for two hours and then filtered through a 0.45 μm filter. Concentration of the filtrate to approximately 10 mL followed by addition of hexanes (20 mL) afforded yellow solids which were filtered off (in air), washed with hexanes (5×5 mL) and dried in vacuo. Yield 10.937 g (89%). NMR data: $^1$H NMR (δ, $CD_2Cl_2$): 1.37 (dd, 36H, $CHCH_3$), 1.77 (s, 6H, $CCH_3$), 2.12 (m, 6H, CH). $^{31}$P NMR (δ, $CD_2Cl_2$): 32.9 (s).

EXAMPLE C2

Preparation of $Pd(OAc)_2(P(Cy)_3)_2$

In a two-neck round bottom flask equipped with an addition funnel, a reddish brown suspension of $Pd(OAc)_2$ (5.00 g, 22.3 mmol) in $CH_2Cl_2$ (50 mL) was set to stir at -78° C. The addition funnel was charged with a $CH_2Cl_2$ solution (30 mL) of $P(Cy)_3$ (13.12 g, 44.6 mmol) which was then added drop-wise to the stirring suspension over the course of 15 minutes resulting in a gradual change from reddish brown to yellow. After 1 hour of stirring at -78° C. the suspension was allowed to warm to room temperature, stirred for an additional two hours and then diluted with hexanes (20 mL). The yellow solids were then filtered off in air, washed with pentane (5×10 mL) and dried in vacuo. A second crop was isolated by cooling the filtrate to 0° C. and filtering, washing and drying as previously described. Yield 15.42 g (88%). NMR data: 1H NMR (δ, CD$_2$Cl$_2$): 1.18-1.32 (br m, 18H, Cy), 1.69 (br m, 18H, Cy), 1.80 (br m, 18H, Cy) 1.84 (s, 6H, CH$_3$), 2.00 (br d, 12H, Cy). 31P NMR (δ, CD$_2$Cl$_2$): 21.2 (s).

EXAMPLE C3

Preparation of Trans-Pd(O$_2$C-t-Bu)$_2$(P(C$_y$)$_3$)$_2$

Pd(O$_2$C-t-Bu)$_2$ (1.3088 g, 4.2404 mmol) was dispersed in CH$_2$Cl$_2$ (10 mL) in a 100 mL Schlenk flask, the contents of the flask was cooled to −78° C. and stirred. To the above solution was slowly added the CH$_2$Cl$_2$ (15 mL) solution of P(Cy)$_3$ (2.6749 g, 9.5382 mmol) via a syringe, stirred for an hour at −78° C. and at room temperature for 2 hours. Hexane (20 mL) was added to the above reaction mixture to give the title complex as a yellow solid (1.391 g). The solid was filtered, washed with hexane (10 mL) and dried under reduced pressure. Solvent was removed from the filtrate to give an orange solid which was then dissolved in CHCl$_3$/hexane mixture (1/1: v/v) and the resulting solution was evaporated inside a fume hood to give more of the title complex (648 mg). Total yield=2.039 g (2.345 mmol), 55.3%. Analysis Calc'd for C$_{46}$H$_{84}$O$_4$P$_2$Pd: C, 63.54; H, 9.74%.

EXAMPLE C4

Preparation of Pd(OAc)$_2$(P(Cp)$_3$)$_2$

In a N$_2$ filled flask, a reddish brown suspension of Pd(OAc)$_2$ (2.00 g, 8.91 mmol) in CH$_2$Cl$_2$ (~25 mL) was set to stir at −78° C. With a cannula, P(Cp)$_3$ (4.25, 17.83 mmol) in CH$_2$Cl$_2$ (~20 mL) was added drop wise to the stirring suspension over the course of 10 minutes resulting in a gradual change from orange brown to yellow. The suspension was allowed to warm to room temperature and stirred for an additional 1 hour. Concentration of the solvent (~5 mL) followed by addition of hexanes (~15 mL) afforded yellow solids which were filtered off in air, washed with hexanes (5×10 mL) and dried in vacuo. A second crop was isolated by cooling the filtrate to 0° C. and filtering, washing, and drying as set forth in Example 3. Yield 4.88 g (85%). NMR data: $^1$H NMR (δ, CD$_2$Cl$_2$): 1.52-1.56 (br m, 12H, Cp$_3$), 1.67-1.72 (br m, 12H, Cp$_3$), 1.74 (s, 6H, CH$_3$), 1.85-1.89 (br m, 12H, Cp$_3$), 1.96-1.99 (br d, 6H, Cp$_3$), 2.03-2.09 (br m, 12H, Cp$_3$). 31P NMR (δ, CD$_2$Cl$_2$): 22.4 (s).

Polymers

EXAMPLES P1-P6, P8 and P9

Examples P1-P6, P8 and P9 demonstrate the synthesis of norbornene-type polymers useful as matrix polymers in accordance with embodiments of the present invention.

Example P1

Synthesis of Hexyl Norbornene (HxNB)/Diphenylmethyl Norbornenemethoxy Silane (diPhNB) Copolymer (P1)

HxNB (8.94 g, 0.05 mol), diPhNB (16.1 g, 0.05 mol), 1-hexene (4.2 g, 0.05 mol) and toluene (142.0 g) were combined in a 250 mL serum bottle and heated to 120° C. in an oil bath to form a solution. To this solution were added [Pd (PCy$_3$)$_2$(O$_2$CCH$_3$)(NCCH$_3$)]tetrakis(pentafluorophenyl)borate (Pd1446) (5.8E-3 g, 4.0E-6 mol) and N,N-dimethylanilinium tetrakis(pentafluorophenyl)borate (DANFABA) (3.2E-3 g, 4.0E-6 mol), each in the form of a concentrated dichloromethane solution. After addition, the resulting mixture was maintained at 120° C. for 6 hours. The copolymer was precipitated by adding methanol drop wise into the vigorously stirred reaction mixture. The precipitated copolymer was collected by filtration and dried in an oven at 80° C. under vacuum. After drying, 12.0 g was obtained (48%). The molecular weight of the copolymer was determined by GPC in THF solvent (polystyrene standard) to be Mw=16,196 and Mn=8,448. The composition of the copolymer was determined by 1H-NMR to be 54/46 HxNB/diPhNB. The refractive indices of this polymer were measured by prism coupling method and determined to be 1.5569 in TE mode and 1.5555 in TM mode at a wavelength of 633 nm. The dried copolymer was dissolved in sufficient mesitylene to result in a 10 wt % copolymer solution.

Example P2

Synthesis of Hexyl Norbornene/Phenethyl Norbornene Copolymer (P2)

HxNB (2.78 g, 0.0156 mol), Phenyl ethyl norbornene (PENB, CAS 29415-09-6) (7.22 g, 0.036 mol), 1-hexene (2.18 g, 0.026 mol) and toluene (57.0 g) were combined in a 250 mL serum bottle and heated to 120° C. in an oil bath. To this solution were added Pd1446 (3.0E-3 g, 2.1E-6 mol) and DANFABA (6.7E-3 g, 8.4E-6 mol) in concentrated solutions of dichloromethane. After addition, the resulting mixture was maintained at 120° C. for 1 hour. After cooling to room temperature, the copolymer was precipitated by adding methanol drop wise into the reaction mixture. The solid copolymer was collected by filtration and dried at 80° C. in a vacuum oven. The solid polymer was dissolved in an appropriate amount of mesitylene to give 10 wt % solid copolymer solution. After drying, 8.0 g was obtained (80%). The molecular weight of the polymer was determined by GPC methods in THF (poly(styrene) standard) Mw=127,332; Mn=39,206. The composition of the polymer was determined by $^1$H-NMR: HxNB/PENB=22/78. The composition of the copolymer was determined by 1H-NMR to be 54/46 HxNB/diPhNB. The refractive indices of this polymer were measured by prism coupling method and determined to be 1.5601 in TE mode and 1.5585 in TM mode at a wavelength of 633 nm. The dried copolymer was dissolved in sufficient mesitylene to result in a 10 wt % copolymer solution.

Example P3

Synthesis of HxNB/diPhNB Copolymer (P3)

HxNB (8.94 g, 0.050 mol), diPhNB (16.1 g, 0.050 mol), 1-hexene (2.95 g, 0.035 mol) and toluene (142 g) were weighed out in a 250 mL serum bottle and heated at 80° C. in an oil bath. To this solution were added (5.8E-3 g, 4.0E-6 mol) of Pd1446 and (3.2E-3 g, 4.0E-6 mol) of DANFABA. The ratio of norbornene monomers/Pd1446/DANFABA was 25K/1/1. The mixture was maintained at 80° C. for 7 h after which the activity of the Pd catalyst was quenched by adding 20 mL of acetonitrile. Thereafter, the polymer was precipitated by adding methanol drop-wise to the reaction mixture. The precipitated copolymer was collected by filtration and dried at 65° C. in a vacuum oven. Then the copolymer was dissolved in mesitylene to give 10 wt % solid copolymer solution. After drying, 19.8 g was obtained (79%). The polymer's molecular weight was determined by GPC methods in THF using poly(styrene) as a standard: Mw=86,186; Mn=21, 602. The ratio of HxN2B/diPhNB in the polymer was determined by $^1$H-NMR: HxNB/diPhNB=46/54. The refractive indices of this polymer were measured by prism coupling method and determined to be 1.5569 in TE mode and 1.5556 in TM mode at a wavelength of 633 nm. The Tg (based on thermomechanical analysis (TMA) measurement) of this polymer was 203° C. The dried copolymer was dissolved in sufficient mesitylene to result in a 10 wt % copolymer solution.

Example P4

Synthesis of HxNB/diPhNB Copolymer (P4)

HxNB (8.94 g, 0.050 mol), diPhNB (16.1 g, 0.050 mol), 1-hexene (20.0 g, 0.239 mol) and toluene (142 g) were weighed out into a 250 mL serum bottle and heated at 80° C. in an oil bath to form a solution. To this solution were added Pd1446 (5.80E-3 g, 4.0E-6 mol) and DANFABA (3.21E-3 g, 4.01E-6 mol). The mixture was maintained at 80° C. for 6 h after which the activity of the Pd catalyst was quenched by adding 20 mL of acetonitrile. Thereafter, the polymer was precipitated by adding methanol drop-wise to the reaction mixture. The precipitated copolymer was collected by filtration and dried at 65° C. in a vacuum oven. Then the polymer was dissolved in mesitylene to give 10 wt % solid copolymer solution. The polymer's molecular weight was determined by GPC methods in THF using poly(styrene) as a standard: Mw=20,586; Mn=11,613. The ratio of HxNB/diPhNB in the polymer was determined by $^1$H-NMR: HxNB/diPhNB=60/40. The composition of the copolymer was determined by $^1$H-NMR to be 54/46 HxNB/diPhNB. The refractive indices of this polymer were measured by prism coupling method and determined to be 1.5547 in TE mode and 1.5540 in TM mode at a wavelength of 633 nm. The dried copolymer was dissolved in sufficient mesitylene to result in a 10 wt % copolymer solution.

Example P5

Synthesis of Hexylnorbornene/Diphenylmethyl Norbornenemethoxy Silane Copolymer (P5)

HxNB, (8.94 g, 0.050 mol), diPhNB, (16.06 g, 0.050 mol), 1-hexene (5.0 g, 0.060 mol) and toluene (142 g) were combined in a 500 mL serum bottle and heated to 80° C. in an oil bath to form a solution. To this solution were added Pd1446, (2.90E-3 g, 2.00E-6 mol), and DANFABA, (3.2E-3 g, 4.01E-6 mol) each in the form of a concentrated solution of dichloromethane. After the addition, the resulting mixture was maintained at 80° C. for 6 hours. The copolymer was precipitated by adding methanol drop wise into the vigorously stirred reaction mixture. The precipitated copolymer was collected by filtration and dried in an oven at 60° C. under vacuum. After drying, 19.3 g was obtained (77%). The molecular weight of the copolymer, determined by GPC in THF solvent (polystyrene standard) provided Mw=58,749 and Mn=18,177. The composition of the copolymer was determined by $^1$H-NMR to be 53/47 HxNB/diPhNB. The refractive indices of this polymer were measured by prism coupling method and determined to be 1.5572 in TE mode and 1.5558 in TM mode at a wavelength of 633 nm. The dried copolymer was dissolved in sufficient mesitylene to result in a 10 wt % copolymer solution.

Example P6

Synthesis of Butylnorbornene/Diphenylmethyl Norbornenemethoxy Silane Copolymer (P6)

Butyl Norbornene (BuNB, CAS 22094-81-1) (2.62 g, 0.038 mol), diPhNB, (22.38 g, 0.057 mol), 1-hexene (8.83 g, 0.011 mol) and toluene (141.4 g) were combined in a 500 mL serum bottle and heated to 80° C. in an oil bath to form a solution. To this solution were injected Pd1446, (5.05E-3 g, 3.49E-6 mol) and DANFABA (1.12E-2 g, 1.40E-5 mol) each in the form of a concentrated solution in dichloromethane. After addition, the resulting mixture was maintained at 80° C. for 2 hours. The copolymer was precipitated by adding methanol drop wise into the vigorously stirred reaction mixture. The precipitated copolymer was collected by filtration and dried in an oven at 60° C. under vacuum. After drying, 7.5 g was obtained (30%). The molecular weight of the copolymer, determined by GPC in TI-IF solvent (polystyrene standard) provided Mw=32,665 and Mn=19,705. The composition of the copolymer was determined by $^1$H-NMR to be 28/72 HxNB/diPhNB. The refractive indices of this polymer were measured by prism coupling method and determined to be 1.5785 in TE mode and 1.5771 in TM mode at a wavelength of 633 nm. The dried copolymer was dissolved in sufficient mesitylene to result in a 10 wt % copolymer solution.

Example P8

Synthesis of Hexyl Norbornene Homopolymer (P8)

HxNB, (10.0 g, 0.056 mol), 1-hexene (4.71 g, 0.056 mol) and toluene (56.7 g) were combined in a 250 mL serum bottle and heated to 80° C. in an oil bath to form a solution. To this solution were added Pd1446, (4.10E-4 g, 2.80E-7 mol) and DANFABA, (2.20E-4 g, 2.80E-7 mol), each in the form of a concentrated solution in dichloromethane. After addition, the resulting mixture was maintained at 80° C. for 40 minutes. The homopolymer was precipitated by adding methanol drop wise into the vigorously stirred reaction mixture. The precipitated copolymer was collected by filtration and dried in an oven at 60° C. under vacuum. After drying, 5.8 g was obtained (58%). The molecular weight of the copolymer, determined by GPC in THF solvent (polystyrene standard) provided Mw=121,541 and Mn=59,213. The refractive indices of this polymer were measured by prism coupling method and determined to be 1.5146 in TE mode and 1.5129 in TM mode at a wavelength of 633 nm. The Tg (based on thermomechanical analysis (TMA) measurement) of this polymer was 208° C. The dried homopolymer was dissolved in sufficient mesitylene to result in a 10 wt % homopolymer solution.

Example P9

Synthesis of HexylNorbornene/Diphenylmethyl Norbornenemethoxy Silane Copolymer (P9)

HxNB, (9.63 g, 0.054 mol), diPhNB, CAS 376634-34-3) (40.37 g, 0.126 mol), 1-hexene (4.54 g, 0.054 mol) and toluene (333 g) were combined in a 500 mL serum bottle and heated to 80° C. in an oil bath to form a solution. To this solution were added Pd1446, (1.04E-2 g, 7.20E-6 mol) and N,N-dimethylanilinium tetrakis(pentafluorophenyl)borate (DANFABA) (2.30E-2 g, 2.88E-5 mol) each in the form of a concentrated solution of dichloromethane. After addition, the resulting mixture was maintained at 80° C. for 2 hours. The copolymer was precipitated by adding methanol drop wise into the vigorously stirred reaction mixture. The precipitated copolymer was collected by filtration and dried in an oven at 60° C. under vacuum. After drying, 19.0 g was obtained (38%). The molecular weight of the copolymer, determined by GPC in TI-IF solvent (polystyrene standard) provided Mw=118,000 and Mn=60,000. The composition of the copolymer was determined by $^1$H-NMR to be 32/68 HxNB/diPhNB. The refractive indices of this polymer were measured by prism coupling method and determined to be 1.5695 in TE mode and 1.5681 in TM mode at a wavelength of 633 nm. The dried copolymer was dissolved in sufficient mesitylene to result in a 10 wt % copolymer solution.

Examples P11-P34

Examples P11 to P34 demonstrate the synthesis of norbornene-type polymers useful as matrix polymers for materials in accordance with embodiments of the present invention.

Example P11

Synthesis of Diphenylmethyl Norbornenemethoxy Silane Homopolymer (P11)

diPhNB (30 g, 0.094 mol), 1-hexene (1.57 g, 0.019 mol) and toluene (170.0 g) were combined in a 250 mL serum bottle and heated to 80° C. in an oil bath to form a solution. To this solution were added [Pd(PCy3)2(O2CCH3)(NCCH3)]tetrakis(pentafluorophenyl)borate (Pd1446) (1.4E-2 g, 9.4E-6 mol) and N,N-dimethylanilinium tetrakis(pentafluorophenyl)borate (DANFABA) (3.0E-2 g, 3.7E-5 mol), each in the form of a concentrated dichloromethane solution. After addition, the resulting mixture was maintained at 80° C. for 4 hours. The homopolymer was precipitated by adding the solution drop wise into the vigorously stirred methanol. The precipitated homopolymer was collected by filtration and dried in an oven at 60° C. under vacuum. After drying, 15.0 g was obtained (Yield 50%). The molecular weight of the copolymer was determined by GPC in THF solvent (polystyrene standard) to be Mw=91,000 and Mn=44,000.

Example P12

Synthesis of Hexyl Norbornene/Diphenylmethyl Norbornenemethoxy Silane Copolymer (P12)

HxNB (10.72 g, 0.06 mol), diPhNB (19.28 g, 0.06 mol), 1-hexene (3.5 g, 0.04 mol) and toluene (170.0 g) were combined in a 250 mL serum bottle and heated to 80° C. in an oil bath to form a solution. To this solution were added [Pd(PCy3)2(O2CCH3)(NCCH3)]tetrakis(pentafluorophenyl)borate (Pd1446) (7.0E-3 g, 4.8E-6 mol) and N,N-dimethylanilinium tetrakis(pentafluorophenyl)borate (DANFABA) (3.9E-3 g, 4.8E-6 mol), each in the form of a concentrated dichloromethane solution. After addition, the resulting mixture was maintained at 80° C. for 3.5 hours. The copolymer was precipitated by adding the solution drop wise into the vigorously stirred methanol. The precipitated copolymer was collected by filtration and dried in an oven at 60° C. under vacuum. After drying, 18.6 g was obtained (Yield 62%). The molecular weight of the copolymer was determined by GPC in THF solvent (polystyrene standard) to be Mw=102,000 and Mn=38,000. The composition of the copolymer was determined by 1H-NMR to be 54/46 HxNB/diPhNB. The dried copolymer was dissolved in sufficient mesitylene to result in a 30 wt % copolymer solution.

Example P13

Synthesis of Butylnorbornene/Diphenylmethyl Norbornenemethoxy Silane Copolymer (P13)

Butyl Norbornene (BuNB, CAS 22094-81-1) (2.62 g, 0.038 mol), diPhNB, (22.38 g, 0.057 mol), 1-hexene (8.83 g, 0.011 mol) and toluene (141.4 g) were combined in a 500 mL serum bottle and heated to 80° C. in an oil bath to form a solution. To this solution were injected Pd1446, (5.05E-3 g, 3.49E-6 mol) and DANFABA (1.12E-2 g, 1.40E-5 mol) each in the form of a concentrated solution in dichloromethane. After addition, the resulting mixture was maintained at 80° C. for 2 hours. The copolymer was precipitated by adding methanol drop wise into the vigorously stirred reaction mixture. The precipitated copolymer was collected by filtration and dried in an oven at 60° C. under vacuum. After drying, 7.5 g was obtained (30%). The molecular weight of the copolymer, determined by GPC in THF solvent (polystyrene standard) provided Mw=32,665 and Mn=19,705. The composition of the copolymer was determined by 1H-NMR to be 28/72 HxNB/diPhNB. The refractive indices of this polymer were measured by prism coupling method and determined to be 1.5785 in TE mode and 1.5771 in TM mode at a wavelength of 633 nm.

Example P14

Synthesis of HexylNorbornene/Diphenylmethyl Norbornenemethoxy Silane Copolymer (P14)

HxNB (9.63 g, 0.054 mol), diPhNB (1.92 g, 0.006 mol), 1-hexene (5.04 g, 0.060 mol) and toluene (56.7 g) were combined in a 250 mL serum bottle and heated to 80° C. in an oil bath to form a solution. To this solution were injected Pd1446 (4.30E-4 g, 3.00E-7 mol) and DANFABA (2.40E-4 g, 3.00E-7 mol), each in the form of a concentrated solution in dichloromethane. After addition, the resulting mixture was maintained at 80° C. for 2 hours. The copolymer was precipitated by adding methanol drop wise into the vigorously stirred reaction mixture. The precipitated copolymer was collected by filtration and dried in an oven at 60° C. under vacuum. After drying, 7.7 g was obtained (67%). The molecular weight of the copolymer was determined by GPC in THF solvent (polystyrene standard) to be Mw=82,000 and Mn=40,000. The composition of the copolymer was determined by 1H-NMR to be 89/11 HxNB/diPhNB. The refractive indices of this polymer were measured by prism coupling method and determined to be 1.5238 in TE mode and 1.5225 in TM mode at a wavelength of 633 nm. The dried copolymer was dissolved in sufficient mesitylene to result in a 30 wt % copolymer solution.

Example P15

Synthesis of Diphenylmethyl Norbornenemethoxy Silane Homopolymer (P15)

diPhNB (30.00 g, 0.094 mol), 1-hexene (2.36 g, 0.028 mol) and toluene (170.0 g) were combined in a 500 mL serum bottle and heated to 80° C. in an oil bath to form a solution. To this solution were injected Pd1446 (0.0135 g, 9.36E-6 mol)

and DANFABA (0.030 g, 3.74E-5 mol), each in the form of a concentrated solution in dichloromethane. After addition, the resulting mixture was maintained at 80° C. for 4 hours. The homopolymer was precipitated by adding methanol drop wise into the vigorously stirred reaction mixture. The precipitated homopolymer was collected by filtration and dried in an oven at 60° C. under vacuum. After drying, 25.18 g was obtained (21%). The molecular weight of the copolymer was determined by GPC in THF solvent (polystyrene standard) to be Mw=54,000 and Mn=29,000. The composition of the copolymer was determined by 1H-NMR to be diPhNB homopolymer. The refractive indices of this polymer were measured by prism coupling method and determined to be 1.5926 in TE mode and 1.5910 in TM mode at a wavelength of 633 nm. The dried homopolymer was dissolved in sufficient toluene to result in a 30 wt % homopolymer solution.

Example P16

Synthesis of Butyl Norbornene/Phenylethyl Norbornene Copolymer (P16)

BuNB (4.78 g, 0.032 mol), PENB (25.22 g, 0.127 mol), 1-hexene (13.36 g, 0.16 mol) and toluene (170.0 g) were combined in a 500 mL serum bottle and heated to 80° C. in an oil bath to form a solution. To this solution were injected Pd1446 (0.0092 g, 6.36E-06 mol) and DANFABA (0.020 g, 2.54E-5 mol), each in the form of a concentrated solution in dichloromethane. After addition, the resulting mixture was maintained at 80° C. for 50 minutes. The copolymer was precipitated by adding methanol drop wise into the vigorously stirred reaction mixture. The precipitated copolymer was collected by filtration and dried in an oven at 60° C. under vacuum. After drying, 23.60 g was obtained (79%). The molecular weight of the copolymer was determined by GPC in THF solvent (polystyrene standard) to be Mw=73,000 and Mn=28,000. The composition of the copolymer was determined by 1H-NMR to be (15/85) BuNB/PENB copolymer. The refractive indices of this polymer were measured by prism coupling method and determined to be 1.5684 in TE mode and 1.5657 in TM mode at a wavelength of 633 nm. The dried copolymer was dissolved in sufficient toluene to result in a 30 wt % copolymer solution.

Example P17

Synthesis of Hexyl Norbornene/Phenylethyl Norbornene Copolymer (P17)

HxNB (6.00 g, 0.034 mol), PENB (26.69 g, 0.135 mol), 1-hexene (11.31 g, 0.135 mol) and toluene (185.35 g) were combined in a 500 mL serum bottle and heated to 80° C. in an oil bath to form a solution. To this solution were injected Pd1446 (0.0097 g, 6.73E-06 mol) and DANFABA (0.022 g, 2.69E-5 mol), each in the form of a concentrated solution in dichloromethane. After addition, the resulting mixture was maintained at 80° C. for 50 minutes. The copolymer was precipitated by adding methanol drop wise into the vigorously stirred reaction mixture. The precipitated copolymer was collected by filtration and dried in an oven at 60° C. under vacuum. After drying, 22.21 g was obtained (68%). The molecular weight of the copolymer was determined by GPC in THF solvent (polystyrene standard) to be Mw=95,000 and Mn=26,000. The composition of the copolymer was determined by 1H-NMR to be (17/83) HxNB/PENB copolymer. The refractive indices of this polymer were measured by prism coupling method and determined to be 1.5477 in TE mode and 1.5454 in TM mode at a wavelength of 633 nm. The dried copolymer was dissolved in sufficient toluene to result in a 30 wt % copolymer solution.

Example P18

Synthesis of Decyl Norbornene/Phenylethyl Norbornene Copolymer (P18)

Decyl Norbornene (DeNB, CAS 22094-85-5) (6.84 g, 0.029 mol), PENB (23.16 g, 0.117 mol), 1-hexene (12.26 g, 0.146 mol) and toluene (170.0 g) were combined in a 500 mL serum bottle and heated to 80° C. in an oil bath to form a solution. To this solution were injected Pd1446 (0.0084 g, 5.84E-06 mol) and DANFABA (0.019 g, 2.33E-5 mol), each in the form of a concentrated solution in dichloromethane. After addition, the resulting mixture was maintained at 80° C. for 50 minutes. The copolymer was precipitated by adding methanol drop wise into the vigorously stirred reaction mixture. The precipitated copolymer was collected by filtration and dried in an oven at 60° C. under vacuum. After drying, 19.74 g was obtained (66%). The molecular weight of the copolymer was determined by GPC in THF solvent (polystyrene standard) to be Mw=78,000 and Mn=36,000. The composition of the copolymer was determined by 1H-NMR to be (19/81) DeNB/PENB copolymer. The refractive indices of this polymer were measured by prism coupling method and determined to be 1.5640 in TE mode and 1.5622 in TM mode at a wavelength of 633 nm. The dried copolymer was dissolved in sufficient toluene to result in a 30 wt % copolymer solution.

Example P19

Synthesis of Benzyl Norbornene Homopolymer (P19)

Benzyl Norbornene (BzNB, CAS 265989-73-9) (30.00 g, 0.163 mol), triethyl silane (0.227 g, 1.95E-03 mol), ethanol (0.360 g, 7.81E-03 mol) and toluene (170.0 g) were combined in a 500 mL serum bottle and heated to 80° C. in an oil bath to form a solution. To this solution were injected Pd1446 (0.0188 g, 1.30E-05 mol) and DANFABA (0.042 g, 5.21E-5 mol), each in the form of a concentrated solution in dichloromethane. After addition, the resulting mixture was maintained at 80° C. for 1.5 hours. The homopolymer was precipitated by adding methanol drop wise into the vigorously stirred reaction mixture. The precipitated homopolymer was collected by filtration and dried in an oven at 60° C. under vacuum. After drying, 15.07 g was obtained (50%). The molecular weight of the homopolymer was determined by GPC in THF solvent (polystyrene standard) to be Mw=46,000 and Mn=28,000. The composition of the homopolymer was determined by 1H-NMR to be BzNB homopolymer. The refractive indices of this polymer were measured by prism coupling method and determined to be 1.5778 in TE mode and 1.5757 in TM mode at a wavelength of 633 nm. The dried homopolymer was dissolved in sufficient toluene to result in a 30 wt % homopolymer solution Example P20

Synthesis of Hexyl Norbornene/Benzyl Norbornene Copolymer (P20)

HxNB (8.79 g, 0.049 mol), BzNB (21.21 g, 0.115 mol), triethyl silane (0.23 g, 1.97E-03 mol), ethanol (0.36 g, 7.89E-

03 mol) and toluene (170.0 g) were combined in a 500 mL serum bottle and heated to 80° C. in an oil bath to form a solution. To this solution were injected Pd1446 (0.019 g, 1.32E-05 mol) and DANFABA (0.042 g, 5.26E-5 mol), each in the form of a concentrated solution in dichloromethane. After addition, the resulting mixture was maintained at 80° C. for 1.5 hours. The copolymer was precipitated by adding methanol drop wise into the vigorously stirred reaction mixture. The precipitated copolymer was collected by filtration and dried in an oven at 60° C. under vacuum. After drying, 18.59 g was obtained (62%). The molecular weight of the copolymer was determined by GPC in THF solvent (polystyrene standard) to be Mw=52,000 and Mn=30,000. The composition of the copolymer was determined by 1H-NMR to be (35/65) HxNB/BzNB copolymer. The refractive indices of this polymer were measured by prism coupling method and determined to be 1.5597 in TE mode and 1.5579 in TM mode at a wavelength of 633 nm. The dried copolymer was dissolved in sufficient toluene to result in a 30 wt % copolymer solution.

Example P21

Synthesis of Decyl Norbornene/Benzyl Norbornene Copolymer (P21)

DeNB (6.84 g, 0.029 mol), BzNB (21.56 g, 0.117 mol), 1-hexene (12.26 g, 0.146 mol) and toluene (170.0 g) were combined in a 500 mL serum bottle and heated to 80° C. in an oil bath to form a solution. To this solution were injected Pd1446 (0.0084 g, 5.84E-06 mol) and DANFABA (0.019 g, 2.33E-5 mol), each in the form of a concentrated solution in dichloromethane. After addition, the resulting mixture was maintained at 80° C. for 1.5 hours. The copolymer was precipitated by adding methanol drop wise into the vigorously stirred reaction mixture. The precipitated copolymer was collected by filtration and dried in an oven at 60° C. under vacuum. After drying, 20.73 g was obtained (73%). The molecular weight of the copolymer was determined by GPC in THF solvent (polystyrene standard) to be Mw=64,000 and Mn=31,000. The composition of the copolymer was determined by 1H-NMR to be (27/73) DeNB/BzNB copolymer. The refractive indices of this polymer were measured by prism coupling method and determined to be 1.5680 in TE mode and 1.5662 in TM mode at a wavelength of 633 nm. The dried copolymer was dissolved in sufficient toluene to result in a 30 wt % copolymer solution.

Example P22

Synthesis of Butyl Norbornene/Methyl Glycidyl Ether Norbornene Copolymer (P22)

BuNB (10.52 g, 0.07 mol), Methyl Glycidyl Ether Norbornene (AGENB, CAS 3188-75-8) (5.41 g, 0.03 mol), toluene (58.0 g) were added to a serum bottle in the drybox. The solution was stirred at 80° C. in an oil bath. To this solution were added a toluene solution (5 g) of ($\eta^6$-toluene)Ni($C_6F_5$)$_2$ (0.69 g, 0.0014 mol). After the addition, the resulting mixture was maintained at room temperature for 4 hours. A toluene solution (87.0 g) was added to the reaction solution. The copolymer was precipitated by adding methanol drop wise into the vigorously stirred reaction mixture. The precipitated copolymer was collected by filtration and dried in an oven at 60° C. under vacuum. After drying, 12.74 g was obtained (80%). The molecular weight of the copolymer was determined by GPC in THF solvent (polystyrene standard) to be Mw=75,000 and Mn=30,000. The composition of the copolymer was determined by 1H-NMR to be (78/22) BuNB/AGENB copolymer. The refractive indices of this polymer were measured by prism coupling method and determined to be 1.5162 in TE mode and 1.5157 in TM mode at a wavelength of 633 nm. The dried copolymer was dissolved in sufficient toluene to result in a 30 wt % copolymer solution.

Example P23

Synthesis of Hexyl Norbornene/Methyl Glycidyl Ether Norbornene Copolymer (P23)

HxNB (12.48 g, 0.07 mol), AGENB (5.41 g, 0.03 mol), toluene (58.0 g) were added to a serum bottle in the drybox. The solution was stirred at 80° C. in an oil bath. To this solution were added a toluene solution (5 g) of ($\eta^6$-toluene)Ni($C_6F_5$)$_2$ (0.69 g, 0.0014 mol). After the addition, the resulting mixture was maintained at room temperature for 4 hours. A toluene solution (87.0 g) was added to the reaction solution. The copolymer was precipitated by adding methanol drop wise into the vigorously stirred reaction mixture. The precipitated copolymer was collected by filtration and dried in an oven at 60° C. under vacuum. After drying, 13.78 g was obtained (77%). The molecular weight of the copolymer was determined by GPC in THF solvent (polystyrene standard) to be Mw=78,000 and Mn=33,000. The composition of the copolymer was determined by 1H-NMR to be (79/21) HxNB/AGENB copolymer. The refractive indices of this polymer were measured by prism coupling method and determined to be 1.5159 in TE mode and 1.5153 in TM mode at a wavelength of 633 nm. The dried copolymer was dissolved in sufficient toluene to result in a 30 wt % copolymer solution.

Example P24

Synthesis of Decyl Norbornene/Methyl Glycidyl Ether Norbornene Copolymer (P24)

DeNB (16.4 g, 0.07 mol), AGENB (5.41 g, 0.03 mol), toluene (58.0 g) were added to a serum bottle in the drybox. The solution was stirred at 80° C. in an oil bath. To this solution were added a toluene solution (5 g) of ($\eta^6$-toluene)Ni($C_6F_5$)$_2$ (0.69 g, 0.0014 mol). After the addition, the resulting mixture was maintained at room temperature for 4 hours. A toluene solution (87.0 g) was added to the reaction solution. The copolymer was precipitated by adding methanol drop wise into the vigorously stirred reaction mixture. The precipitated copolymer was collected by filtration and dried in an oven at 60° C. under vacuum. After drying, 17.00 g was obtained (87%). The molecular weight of the copolymer was determined by GPC in THF solvent (polystyrene standard) to be Mw=75,000 and Mn=30,000. The composition of the copolymer was determined by 1H-NMR to be (77/23) DeNB/AGENB copolymer. The refractive indices of this polymer were measured by prism coupling method and determined to be 1.5153 in TE mode and 1.5151 in TM mode at a wavelength of 633 nm. The dried copolymer was dissolved in sufficient toluene to result in a 30 wt % copolymer solution.

Example P25

Synthesis of Butyl Norbornene/Norbornenylethyltrimethoxysilane Copolymer (P25)

BuNB (25.44 g, 0.169 mol), Norbornenylethyltrimethoxysilane (TMSENB, CAS 68245-19-2) (4.56 g, 0.019 mol), triethyl silane (0.11 g, 9.41E-04 mol), ethanol (0.10 g, 2.26E-03 mol) and toluene (170.0 g) were combined in a 300 mL serum bottle and heated to 80° C. in an oil bath to form a solution. To this solution were injected Pd1446 (0.022 g, 1.50E-05 mol) and DANFABA (0.036 g, 4.51E-5 mol), each in the form of a concentrated solution in dichloromethane. After addition, the resulting mixture was maintained at 80° C. for 4 hours. The copolymer was precipitated by adding methanol drop wise into the vigorously stored reaction mixture. The precipitated copolymer was collected by filtration and dried in an oven at 60° C. under vacuum. After drying, 22.60 g was obtained (69%). The molecular weight of the copolymer was determined by GPC in THF solvent (polystyrene standard) to be Mw=20,000 and Mn=13,000. The composition of the copolymer was determined by 1H-NMR to be (91/9) BuNB/TMSENB copolymer. The refractive indices of this polymer were measured by prism coupling method and determined to be 1.5106 in TE mode and 1.5105 in TM mode at a wavelength of 633 nm. The dried copolymer was dissolved in sufficient toluene to result in a 30 wt % copolymer solution.

Example P26

Synthesis of Hexyl Norbornene/Norbornenylethyltrimethoxysilane Copolymer (P26)

HxNB (13.03 g, 0.073 mol), TMSENB (1.97 g, 0.0081 mol), triethyl silane (0.019 g, 1.62E-04 mol), ethanol (0.030 g, 6.50E-04 mol) and toluene (85.0 g) were combined in a 300 mL serum bottle and heated to 80° C. in an oil bath to form a solution. To this solution were injected [Pd(P(iPr)$_3$)$_2$(OCOCH$_3$)(NCCH$_3$)]tetrakis(pentafluorophenyl)borate (Pd1206) (0.0078 g, 6.50E-06 mol) in the form of a concentrated solution in dichloromethane. After addition, the resulting mixture was maintained at 80° C. for 4 hours. The copolymer was precipitated by adding methanol drop wise into the vigorously stirred reaction mixture. The precipitated copolymer was collected by filtration and dried in an oven at 60° C. under vacuum. After drying, 3.30 g was obtained (22%). The molecular weight of the copolymer was determined by GPC in THF solvent (polystyrene standard) to be Mw=53,000 and Mn=33,000. The composition of the copolymer was determined by 1H-NMR to be (93/7) HxNB/TMSENB copolymer. The refractive indices of this polymer were measured by prism coupling method and determined to be 1.5126 in TE mode and 1.5114 in TM mode at a wavelength of 633 nm. The dried copolymer was dissolved in sufficient toluene to result in a 30 wt % copolymer solution.

Example P27

Synthesis of Decyl Norbornene/Norbornenylethyltrimethoxysilane Copolymer (P27)

DeNB (22.31 g, 0.095 mol), TMSENB (7.69 g, 0.032 mol), triethyl silane (0.44 g, 3.81E-04 mol), ethanol (0.70 g, 1.52E-03 mol) and toluene (170.0 g) were combined in a 500 mL serum bottle and heated to 80° C. in an oil bath to form a solution. To this solution were injected Pd1446 (0.015 g, 1.02E-05 mol) and DANFABA (0.024 g, 3.05E-5 mol), each in the form of a concentrated solution in dichloromethane. After addition, the resulting mixture was maintained at 80° C. for 4 hours. The copolymer was precipitated by adding methanol drop wise into the vigorously stored reaction mixture. The precipitated copolymer was collected by filtration and dried in an oven at 60° C. under vacuum. After drying, 12.2 g was obtained (40.7%). The molecular weight of the copolymer was determined by GPC in THF solvent (polystyrene standard) to be Mw=34,000 and Mn=24,000. The composition of the copolymer was determined by 1H-NMR to be (77/23) DeNB/TMSENB copolymer. The refractive indices of this polymer were measured by prism coupling method and determined to be 1.5063 in TE mode and 1.5062 in TM mode at a wavelength of 633 nm. The dried copolymer was dissolved in sufficient toluene to result in a 30 wt % copolymer solution.

Example P28

Synthesis of Butyl Norbornene/Triethoxysilyl Norbornene Copolymer (P28)

BuNB (25.22 g, 0.168 mol), Triethoxysilyl Norbornene (TESNB, CAS 18401-43-9) (4.78 g, 0.019 mol), triethyl silane (0.011 g, 9.32E-05 mol), ethanol (0.10 g, 2.24E-03 mol) and toluene (170.0 g) were combined in a 500 mL serum bottle and heated to 80° C. in an oil bath to form a solution. To this solution were injected Pd1206 (0.018 g, 1.49E-05 mol) in the form of a concentrated solution in dichloromethane. After addition, the resulting mixture was maintained at 80° C. for 9 hours. The copolymer was precipitated by adding methanol drop wise into the vigorously stirred reaction mixture. The precipitated copolymer was collected by filtration and dried in an oven at 60° C. under vacuum. After drying, 20.58 g was obtained (69%). The molecular weight of the copolymer was determined by GPC in THF solvent (polystyrene standard) to be Mw=238,000 and Mn=96,000. The composition of the copolymer was determined by 1H-NMR to be (85/15) BuNB/TESNB copolymer. The refractive indices of this polymer were measured by prism coupling method and determined to be 1.5061 in TE mode and 1.5041 in TM mode at a wavelength of 633 nm. The Tg (based on thermomechanical analysis (TMA) measurement) of this polymer was 276° C. The dried copolymer was dissolved in sufficient toluene to result in a 30 wt % copolymer solution.

Example P29

Synthesis of Hexyl Norbornene/Triethoxysilyl Norbornene Copolymer (P29)

HxNB (20.33 g, 0.114 mol), TESNB (3.26 g, 0.013 mol), triethyl silane (0.030 g, 2.54E-03 mol), ethanol (0.07 g, 1.52E-03 mol) and toluene (170.0 g) were combined in a 500 mL serum bottle and heated to 80° C. in an oil bath to form a solution. To this solution were injected Pd1446 (0.015 g, 1.01E-05 mol) in the form of a concentrated solution in dichloromethane. After addition, the resulting mixture was maintained at 80° C. for 9 hours. The copolymer was precipitated by adding methanol drop wise into the vigorously stirred reaction mixture. The precipitated copolymer was collected by filtration and dried in an oven at 60° C. under vacuum. After drying, 7.31 g was obtained (31%). The molecular weight of the copolymer was determined by GPC in THF solvent (polystyrene standard) to be Mw=234,000 and Mn=110,000. The composition of the copolymer was determined by 1H-NMR to be (83/17) HxNB/TESNB copolymer. The refractive indices of this polymer were measured by prism coupling method and determined to be 1.5053 in TE mode and 1.5042 in TM mode at a wavelength of 633 nm. The dried copolymer was dissolved in sufficient toluene to result in a 30 wt % copolymer solution.

Example P30

Synthesis of Decyl Norbornene/Triethoxysilyl Norbornene Copolymer (P30)

DeNB (26.77 g, 0.114 mol), TESNB (3.26 g, 0.013 mol), triethyl silane (0.030 g, 2.54E-03 mol), ethanol (0.07 g, 1.52E-03 mol) and toluene (170.0 g) were combined in a 500 mL serum bottle and heated to 80° C. in an oil bath to form a solution. To this solution were injected Pd1446 (0.015 g, 1.01E-05 mol) in the form of a concentrated solution in dichloromethane. After addition, the resulting mixture was maintained at 80° C. for 9 hours. The copolymer was precipitated by adding methanol drop wise into the vigorously stirred reaction mixture. The precipitated copolymer was collected by filtration and dried in an oven at 60° C. under vacuum. After drying, 18.01 g was obtained (60%). The molecular weight of the copolymer was determined by GPC in THF solvent (polystyrene standard) to be Mw=283,000 and Mn=118,000. The composition of the copolymer was determined by 1H-NMR to be (84/16) DeNB/TESNB copolymer. The refractive indices of this polymer were measured by prism coupling method and determined to be 1.5034 in TE mode and 1.5018 in TM mode at a wavelength of 633 nm. The dried copolymer was dissolved in sufficient toluene to result in a 30 wt % copolymer solution.

Example P31

Synthesis of Butyl Norbornene/Trimethoxysilyl Norbornene Copolymer (P31)

BuNB (10.97 g, 0.073 mol), Trimethoxysilyl Norbornene (TMSNB, CAS 7538-46-7) (12.95 g, 0.073 mol), triethyl silane (0.34 g, 2.91E-04 mol), ethanol (0.80 g, 1.75E-03 mol) and toluene (170.0 g) were combined in a 500 mL serum bottle and heated to 80° C. in an oil bath to form a solution. To this solution were injected Pd1446 (0.017 g, 1.16E-05 mol) and DANFABA (0.028 g, 3.49E-5 mol), each in the form of a concentrated solution in dichloromethane. After addition, the resulting mixture was maintained at 80° C. for 4 hours. The copolymer was precipitated by adding methanol drop wise into the vigorously stirred reaction mixture. The precipitated copolymer was collected by filtration and dried in an oven at 60° C. under vacuum. After drying, 15.5 g was obtained (65%). The molecular weight of the copolymer was determined by GPC in THF solvent (polystyrene standard) to be Mw=48,000 and Mn=27,000. The composition of the copolymer was determined by 1H-NMR to be (47/53) BuNB/TMSNB copolymer. The refractive indices of this polymer were measured by prism coupling method and determined to be 1.5093 in TE mode and 1.5089 in TM mode at a wavelength of 633 nm. The dried copolymer was dissolved in sufficient toluene to result in a 30 wt % copolymer solution.

Example P32

Synthesis of Hexyl Norbornene/Trimethoxysilyl Norbornene Copolymer (P32)

HxNB (13.02 g, 0.073 mol), TMSNB (12.95 g, 0.073 mol), triethyl silane (0.34 g, 2.91E-04 mol), ethanol (0.80 g, 1.75E-03 mol) and toluene (170.0 g) were combined in a 500 mL serum bottle and heated to 80° C. in an oil bath to form a solution. To this solution were injected Pd1446 (0.017 g, 1.16E-05 mol) and DANFABA (0.028 g, 3.49E-5 mol), each in the form of a concentrated solution in dichloromethane. After addition, the resulting mixture was maintained at 80° C. for 4 hours. The copolymer was precipitated by adding methanol drop wise into the vigorously stirred reaction mixture. The precipitated copolymer was collected by filtration and dried in an oven at 60° C. under vacuum. After drying, 17.7 g was obtained (68%). The molecular weight of the copolymer was determined by GPC in THF solvent (polystyrene standard) to be Mw=55,000 and Mn=27,000. The composition of the copolymer was determined by 1H-NMR to be (46/54) HxNB/TMSNB copolymer. The refractive indices of this polymer were measured by prism coupling method and determined to be 1.5081 in TE mode and 1.5078 in TM mode at a wavelength of 633 nm. The dried copolymer was dissolved in sufficient toluene to result in a 30 wt % copolymer solution.

Example P33

Synthesis of Decyl Norbornene/Trimethoxysilyl Norbornene Copolymer (P33)

DeNB (17.05 g, 0.073 mol), TMSNB (12.95 g, 0.073 mol), triethyl silane (0.34 g, 2.91E-04 mol), ethanol (0.80 g, 1.75E-03 mol) and toluene (170.0 g) were combined in a 500 mL serum bottle and heated to 80° C. in an oil bath to form a solution. To this solution were injected Pd1446 (0.017 g, 1.16E-05 mol) and DANFABA (0.028 g, 3.49E-5 mol), each in the form of a concentrated solution in dichloromethane. After addition, the resulting mixture was maintained at 80° C. for 4 hours. The copolymer was precipitated by adding methanol drop wise into the vigorously stirred reaction mixture. The precipitated copolymer was collected by filtration and dried in an oven at 60° C. under vacuum. After drying, 21.1 g was obtained (70%). The molecular weight of the copolymer was determined by GPC in THF solvent (polystyrene standard) to be Mw=82,000 and Mn=31,000. The composition of the copolymer was determined by 1H-NMR to be (46/54) DeNB/TMSNB copolymer. The refractive indices of this polymer were measured by prism coupling method and determined to be 1.5029 in TE mode and 1.5016 in TM mode at a wavelength of 633 nm. The dried copolymer was dissolved in sufficient toluene to result in a 30 wt % copolymer solution.

Example P34

Synthesis of Hexyl Norbornene/Diphenylmethyl Norbornenemethoxy Silane/Norbornenylethyltrimethoxysilane Terpolymer (P34)

HxNB (5.94 g, 0.033 mol), diPhNB (21.36 g, 0.067 mol), TMSENB (2.69 g, 0.011 mol), 1-Hexene (3.73 g, 0.044 mol) and toluene (170.0 g) were combined in a 500 mL serum bottle and heated to 80° C. in an oil bath to form a solution. To this solution were injected Pd1446 (0.0064 g, 4.44E-06 mol) and DANFABA (0.0036 g, 4.44E-6 mol), each in the form of a concentrated solution in dichloromethane. After addition, the resulting mixture was maintained at 80° C. for 3.5 hours. The copolymer was precipitated by adding methanol drop wise into the vigorously stirred reaction mixture. The precipitated copolymer was collected by filtration and dried in an oven at 60° C. under vacuum. After drying, 10.26 g was obtained (34%). The molecular weight of the copolymer was determined by GPC in THF solvent (polystyrene standard) to be Mw=105,000 and Mn=54,000. The composition of the copolymer was determined by 1H-NMR to be (38/54/8) HxNB//diPhNB/TMSENB copolymer. The refractive indices of this polymer were measured by prism coupling method and determined to be 1.5586 in TE mode and 1.5572 in TM mode at a wavelength of 633 nm. The dried terpolymer was dissolved in sufficient toluene to result in a 30 wt % terpolymer solution.

Table 1 provides a summary of each exemplary polymer discussed above.

TABLE 1

| | |
|---|---|
| P1 | Hx/diPh(50/50) |
| | Mw = 16,196 |
| P2 | Hx/PE(30/70) |
| | Mw = 127,332 |
| P3 | Hx/diPh(50/50) |
| | Mw = 86,186 |
| P4 | Hx/diPh(50/50) |
| | Mw = 20,586 |
| P5 | Hx/diPh(50/50) |
| | Mw = 58,749 |
| P6 | Bu/diPh(30/70) |
| | Mw = 32,665 |
| P8 | Hx |
| | Mw = 121,541 |
| P9 | Hx/diPh(30/70) |
| | Mw = 82,000 |
| P11 | diPh |
| | Mw = 91,000 |
| P12 | Hx/diPh(50/50) |
| | Mw = 102,000 |
| P13 | Bu/diPh(40/60) |
| | Mw = 32,665 |
| P14 | Hx/diPh(90/10) |
| | Mw = 82,000 |
| P15 | diPh homo |
| | Mw = 54,000 |
| P16 | Bu/PE(20/80) |
| | Mw = 73,000 |
| P17 | Hx/PE(20/80) |
| | Mw = 95,000 |
| P18 | De/PE(20/80) |
| | Mw = 78,000 |
| P19 | Bz homo |
| | Mw = 46,000 |
| P20 | Hx/Bz(30/70) |
| | Mw = 52,000 |
| P21 | De/Bz(20/80) |
| | Mw = 64,000 |
| P22 | Bu/AGE(70/30) |
| | Mw = 75,000 |
| P23 | Hx/AGE(70/30) |
| | Mw = 78,000 |
| P24 | De/AGE(70/30) |
| | Mw = 75,000 |
| P25 | Bu/TMSE(90/10) |
| | Mw = 20,000 |
| P26 | Hx/TMSE(90/10) |
| | Mw = 53,000 |
| P27 | De/TMSE(75/25) |
| | Mw = 34,000 |
| P28 | Bu/TES(90/10) |
| | Mw = 238,000 |
| P29 | Hx/TES(90/10) |
| | Mw = 234,000 |
| P30 | De/TES(90/10) |
| | Mw = 283,000 |
| P31 | Bu/TMS(50/50) |
| | Mw = 48,000 |
| P32 | Hx/TMS(50/50) |
| | Mw = 55,000 |
| P33 | De/TMS(50/50) |
| | Mw = 82,000 |
| P34 | Terpolymer(Hx 30/diPh 60/TMSE 10) |
| | Mw = 105,000 |

Varnishes

EXAMPLES V1-V13, V38-V48 and V63-V66

Examples V1 to V13, V38 to V48 and V63 to V66 demonstrate the formulation of varnish solutions encompassing matrix polymers, norbornene-type monomers, a procatalyst, an acid generator, optional antioxidants and solvents in accordance with embodiments of the present invention. It will be noted that as each of the varnish solutions exemplified below incorporates a photo sensitive material, such solutions were formulated under yellow light.

Example V1

HxNB (42.03 g, 0.24 mol) and bis-Norbornenemethoxy dimethylsilane (SiX, CAS 376609-87-9) (7.97 g, 0.026 mol) were weighed out into a glass vial. To this solution of monomers were added two antioxidants, Ciba® IRGANOX® 1076 (0.5 g) and Ciba® IRGAFOS® 168 (0.125 g) (both available from Ciba Specialty Chemicals Corporation, Tarrytown, N.Y.) to form a monomer-antioxidant solution. To 30.0 g of the above prepared P1 copolymer solution, were added 3.0 g of the monomer-antioxidant solution, $Pd(PCy_3)_2(OAc)_2$ (Pd785) (4.94E-4 g, 6.29E-7 mol in 0.1 mL of methylene chloride), RHODORSIL® PHOTOINITIATOR 2074 (CAS 178233-72-2, available from Rhodia Inc, Cranbury, N.J.) (2.55E-3 g, 2.51E-6 mol in 0.1 mL of methylene chloride) to form the varnish solution. The varnish solution was filtered through a 0.2-micron pore filter prior to use.

Example V2

SiX (5 g, 0.0164 mol) was weighed out in a glass vial. To the SiX were added Irganox 1076 (0.05 g) and Irgafos 168 (0.013 g) to form an SiX solution. Varnish solution V2 was prepared by mixing SiX solution (3 g), Pd-785 stock solution (3.10E-4 g, 3.94E-7 mol in 0.1 mL of methylene chloride), Rhodorsil 2074 stock solution (1.60E-3 g, 1.58E-6 mol in 0.1 mL of methylene chloride) and P2 copolymer solution (30 g, solid 3 g). The ratio of copolymer/monomers was 1/1 by weight and the ratio of monomers/Pd catalyst/Photo acid generator (PAG) was 25K/1/4 by mol. The varnish solution was filtered through a 0.2-micron pore filter.

Example V3

HxNB (42.03 g, 0.24 mol) and SiX (7.97 g, 0.026 mol) were weighed out into a glass vial. To this solution of monomers were added two antioxidants, Ciba® IRGANOX 1076 (0.5 g) and Ciba® IRGAFOS 168 (0.125 g) to form a monomer-antioxidant solution. To 30.0 g of copolymer solution (10 g of P3+20 g of P4), were added 3.0 g of the monomer-antioxidant solution, Pd785 (4.93E-4 g, 6.28E-7 mol in 0.1 mL of methylene chloride), RHODORSIL® PHOTOINITIATOR 2074 (2.55E-3 g, 2.51E-6 mol in 0.1 mL of methylene chloride) to form the varnish solution V3. This solution was filtered through a 0.2-micron pore filter prior to use.

Example V4

Varnish Solution V4 was prepared as above for V3, except that the 30.0 g of copolymer solution was 15 g of P3 and 15 g of P4 to form the varnish solution V4. This solution was filtered with 0.2-micron pore filter prior to use.

Example V5

Varnish Solution V5 was prepared as above for V3, except that the 30.0 g of copolymer solution was 20 g of P3 and 10 g of P4 to form the varnish solution V5. This solution was filtered through a 0.2-micron pore filter prior to use.

Example V6

Varnish Solution V6 was prepared as above for V3, except that the 30.0 g of copolymer solution was 30 g of P3 to form the varnish solution V6. This solution was filtered through a 0.2-micron pore filter prior to use.

Example V7

HxNB (40.33 g, 0.23 mol) and Norbornenylethyltriemethoxysilane (TMSENB, CAS 68245-19-2) (9.67 g, 0.039 mol) were weighed out into a glass vial. To this solution of monomers were added two antioxidants, Ciba® IRGANOX 1076 (0.5 g) and Ciba® IRGAFOS 168 (0.125 g) to form a monomer-antioxidant solution. To 30.0 g of the above copolymer solution (15 g of P3+15 g of P4) depicted in Table 1, were added 3.0 g of the monomer-antioxidant solution, Pd785 (5.02E-4 g, 6.39E-7 mol in 0.1 mL of methylene chloride), RHODORSIL® PHOTOINITIATOR 2074 (2.59E-3 g, 2.55E-6 mol in 0.1 mL of methylene chloride) to form the varnish solution V7. This solution was filtered through a 0.2-micron pore filter prior to use.

Example V8

HxNB (42.03 g, 0.24 mol) and SiX, (7.97 g, 0.026 mol) were weighed out into a glass vial. To this solution of monomers were added two antioxidants, Ciba® IRGANOX 1076 (0.5 g) and Ciba® IRGAFOS 168 (0.125 g) to form a monomer-antioxidant solution. To 18.3 g of the above prepared copolymer P5 solution, were added 3.06 g of the monomer-antioxidant solution, Pd785 (3.85E-4 g, 4.91E-7 mol in 0.1 mL of methylene chloride), RHODORSIL® PHOTOINITIATOR 2074 (1.99E-3 g, 1.96E-6 mol in 0.1 mL of methylene chloride) and 1.30 g of mesitylene and to form the varnish solution.

Example V9

HxNB (42.03 g, 0.24 mol) and SiX, (7.97 g, 0.026 mol) were weighed out into a glass vial. To this solution of monomers were added two antioxidants, Ciba® IRGANOX 1076 (0.5 g) and Ciba® IRGAFOS 168 (0.125 g) to form a monomer-antioxidant solution. To 9.15 g of the above prepared copolymer P6 solution, were added 1.53 g of the monomer-antioxidant solution, Pd785 (2.52E-4 g, 3.21E-7 mol in 0.1 mL of methylene chloride), RHODORSIL® PHOTOINITIATOR 2074 (1.30E-3 g, 1.28E-6 mol in 0.1 mL of methylene chloride) and 0.645 g of mesitylene to form the varnish solution.

Example V10

HxNB (42.03 g, 0.24 mol) and SiX, (7.97 g, 0.026 mol) were weighed out into a glass vial. To this solution of monomers were added two antioxidants, Ciba® IRGANOX 1076 (0.5 g) and Ciba® IRGAFOS 168 (0.125 g) to form a monomer-antioxidant solution. To 20 g of the above prepared copolymer P3 solution, were added 2.4 g of the monomer-antioxidant solution, Pd785 (3.95E-4 g, 5.03E-7 mol in 0.1 mL of methylene chloride), RHODORSIL® PHOTOINITIATOR 2074 (2.55E-3 g, 2.51E-6 mol in 0.1 mL of methylene chloride) and 2.5 g of toluene and to form the varnish solution. The varnish solution was filtered through a 0.2-micron pore filter prior to use.

Example V11

HxNB (42.03 g, 0.24 mol) and SiX, (7.97 g, 0.026 mol) were weighed out into a glass vial. To this solution of monomers were added two antioxidants, Ciba® IRGANOX 1076 (0.5 g) and Ciba® IRGAFOS 168 (0.125 g) to form a monomer-antioxidant solution. To 20 g of the above prepared homopolymer P8 solution, were added 2.4 g of the monomer-antioxidant solution, Pd785 (3.95E-4 g, 5.03E-7 mol in 0.1 mL of methylene chloride), RHODORSIL® PHOTOINITIATOR 2074 (2.55E-3 g, 2.51E-6 mol in 0.1 mL of methylene chloride) and 6.12 g of toluene to form the varnish solution. The varnish solution was filtered through a 5-micron pore filter prior to use.

Example V12

HxNB (42.03 g, 0.24 mol) and (SiX) (7.97 g, 0.026 mol) were weighed out into a glass vial. To this solution of monomers were added two antioxidants, Ciba® IRGANOX® 1076 (0.5 g) and Ciba® IRGAFOS® 168 (0.125 g) to form a monomer-antioxidant solution. To 30 g of the above prepared copolymer P9 solution, were added 1.0 g of the monomer-antioxidant solution, Pd(PCy3)2(OAc)2 (Pd785) (1.65E-4 g, 2.10E-7 mol in 0.1 mL of methylene chloride), RHODORSIL® PHOTOINITIATOR 2074 (8.51E-4 g, 8.38E-7 mol in 0.1 mL of methylene chloride) and 5.0 g of toluene and to form the varnish solution.

Example V13

HxNB (42.03 g, 0.24 mol) and (SiX) (7.97 g, 0.026 mol) were weighed out into a glass vial.

To this solution of monomers were added two antioxidants, Ciba® IRGANOX® 1076 (0.5 g) and Ciba® IRGAFOS® 168 (0.125 g) to form a monomer-antioxidant solution. To 30 g of the above prepared copolymer P14 solution, were added 2.0 g of the monomer-antioxidant solution, Pd(PCy$_3$)$_2$(OAc)$_2$ (Pd785) (3.29E-4 g, 4.19E-7 mol in 0.1 mL of methylene chloride), TAG-372R photo acid generator (CAS 193957-54-9, available from Toyo Ink Mfg. Co., Ltd., Tokyo, Japan) (7.63E-4 g, 8.38E-6 mol in 0.1 mL of methylene chloride) and 10.0 g of toluene to form the varnish solution. The varnish solution V13 was poured onto a 4" SiO$_2$ coated wafer and cured to form dry film. The Tg (based on thermomechanical analysis (TMA) measurement) of this polymer was 251° C.

Example V38

HxNB (16.64 g, 0.093 mol) and bis-Norbornenemethoxy dimethylsilane (SiX, CAS 376609-87-9) (33.36 g, 0.110 mol) were weighed out into a glass vial. To this solution of monomers were added two antioxidants, Ciba® IRGANOX® 1076 (0.5 g) and Ciba® IRGAFOS® 168 (0.125 g) (both available from Ciba Specialty Chemicals Corporation, Tarrytown, N.Y.) to form a monomer-antioxidant solution. To 30.0 g of the above prepared P3 copolymer solution, were added 2.16 g of the monomer-antioxidant solution, Pd(PCy$_3$)$_2$(OAc)$_2$ (Pd785) (1.47E-3 g, 1.88E-6 mol in 0.1 mL of methylene chloride) and RHODORSIL® PHOTOINITIATOR 2074 (CAS 178233-72-2, available from Rhodia Inc, Cranbury, N.J.) (7.67E-3 g, 7.54E-6 mol in 0.1 mL of methylene chloride) to form a varnish solution. The varnish solution was filtered through a 0.2-micron pore filter prior to use.

Example V39

HxNB (16.64 g, 0.093 mol) and bis-Norbornenemethoxy dimethylsilane (SiX, CAS 376609-87-9) (33.36 g, 0.110 mol) were weighed out into a glass vial. To this solution of monomers were added two antioxidants, Ciba® IRGANOX® 1076 (0.5 g) and Ciba® IRGAFOS® 168 (0.125 g) (both available from Ciba Specialty Chemicals Corporation, Tarrytown, N.Y.) to form a monomer-antioxidant solution. To 30.0 g of the above prepared P34 copolymer solution, were added 2.16 g of the monomer-antioxidant solution, $Pd(PCy_3)_2(OAc)_2$ (Pd785) (1.47E-3 g, 1.88E-6 mol in 0.1 mL of methylene chloride) and RHODORSIL® PHOTOINITIATOR 2074 (CAS 178233-72-2, available from Rhodia Inc, Cranbury, N.J.) (7.67E-3 g, 7.54E-6 mol in 0.1 mL of methylene chloride) to form a varnish solution. The varnish solution was filtered through a 0.2-micron pore filter prior to use.

Example V40

HxNB (16.64 g, 0.093 mol) and bis-Norbornenemethoxy dimethylsilane (SiX, CAS 376609-87-9) (33.36 g, 0.110 mol) were weighed out into a glass vial. To this solution of monomers were added two antioxidants, Ciba® IRGANOX® 1076 (0.5 g) and Ciba® IRGAFOS® 168 (0.125 g) (both available from Ciba Specialty Chemicals Corporation, Tarrytown, N.Y.) to form a monomer-antioxidant solution. To 30.0 g of the above prepared P12 copolymer solution, were added 2.16 g of the monomer-antioxidant solution, $Pd(PCy_3)_2(OAc)_2$ (Pd785) (1.47E-3 g, 1.88E-6 mol in 0.1 mL of methylene chloride), DBA (CAS 76275-14-4, available from Kawasaki-kasei Co., Ltd., Kanagawa, Japan) (4.86E-2 g, 1.51E-4 mol in 0.1 mL of methyllene chloride) and RHODORSIL® PHOTOINITIATOR 2074 (CAS 178233-72-2, available from Rhodia Inc, Cranbury, N.J.) (7.67E-3 g, 7.54E-6 mol in 0.1 mL of methylene chloride) to form a varnish solution. The varnish solution was filtered through a 0.2-micron pore filter prior to use.

Example V41

HxNB (16.64 g, 0.093 mol) and bis-Norbornenemethoxy dimethylsilane (SiX, CAS 376609-87-9) (33.36 g, 0.110 mol) were weighed out into a glass vial. To this solution of monomers were added two antioxidants, Ciba® IRGANOX® 1076 (0.5 g) and Ciba® IRGAFOS® 168 (0.125 g) (both available from Ciba Specialty Chemicals Corporation, Tarrytown, N.Y.) to form a monomer-antioxidant solution. To 30.0 g of the above prepared P16 copolymer solution, were added 2.16 g of the monomer-antioxidant solution, $Pd(PCy_3)_2(OAc)_2$ (Pd785) (1.47E-3 g, 1.88E-6 mol in 0.1 mL of methylene chloride) and RHODORSIL® PHOTOINITIATOR 2074 (CAS 178233-72-2, available from Rhodia Inc, Cranbury, N.J.) (7.67E-3 g, 7.54E-6 mol in 0.1 mL of methylene chloride) to form a varnish solution. The varnish solution was filtered through a 0.2-micron pore filter prior to use.

Example V42

HxNB (16.64 g, 0.093 mol) and bis-Norbornenemethoxy dimethylsilane (SiX, CAS 376609-87-9) (33.36 g, 0.110 mol) were weighed out into a glass vial. To this solution of monomers were added two antioxidants, Ciba® IRGANOX® 1076 (0.5 g) and Ciba® IRGAFOS® 168 (0.125 g) (both available from Ciba Specialty Chemicals Corporation, Tarrytown, N.Y.) to form a monomer-antioxidant solution. To 30.0 g of the above prepared P17 copolymer solution, were added 2.16 g of the monomer-antioxidant solution, $Pd(PCy_3)_2(OAc)_2$ (Pd785) (1.47E-3 g, 1.88E-6 mol in 0.1 mL of methylene chloride) and RHODORSIL® PHOTOINITIATOR 2074 (CAS 178233-72-2, available from Rhodia Inc, Cranbury, N.J.) (7.67E-3 g, 7.54E-6 mol in 0.1 mL of methylene chloride) to form a varnish solution. The varnish solution was filtered through a 0.2-micron pore filter prior to use.

Example V43

HxNB (16.64 g, 0.093 mol) and bis-Norbornenemethoxy dimethylsilane (SiX, CAS 376609-87-9) (33.36 g, 0.110 mol) were weighed out into a glass vial. To this solution of monomers were added two antioxidants, Ciba® IRGANOX® 1076 (0.5 g) and Ciba® IRGAFOS® 168 (0.125 g) (both available from Ciba Specialty Chemicals Corporation, Tarrytown, N.Y.) to form a monomer-antioxidant solution. To 30.0 g of the above prepared P18 copolymer solution, were added 2.16 g of the monomer-antioxidant solution, $Pd(PCy_3)_2(OAc)_2$ (Pd785) (1.47E-3 g, 1.88E-6 mol in 0.1 mL of methylene chloride) and RHODORSIL® PHOTOINITIATOR 2074 (CAS 178233-72-2, available from Rhodia Inc, Cranbury, N.J.) (7.67E-3 g, 7.54E-6 mol in 0.1 mL of methylene chloride) to form a varnish solution. The varnish solution was filtered through a 0.2-micron pore filter prior to use.

Example V44

Bis-Norbornenemethoxy dimethylsilane (SiX, CAS 376609-87-9) (50.0 g, 0.164 mol) were weighed out into a glass vial. To this solution of monomers were added two antioxidants, Ciba® IRGANOX® 1076 (0.5 g) and Ciba® IRGAFOS® 168 (0.125 g) (both available from Ciba Specialty Chemicals Corporation, Tarrytown, N.Y.) to form a monomer-antioxidant solution. To 30.0 g of the above prepared P19 copolymer solution, were added 1.44 g of the monomer-antioxidant solution, $Pd(P(i-Pr)_3)_2(OAc)_2$ (Pd545) (1.02E-3 g, 1.88E-6 mol in 0.1 mL of methylene chloride) and RHODORSIL® PHOTOINITIATOR 2074 (CAS 178233-72-2, available from Rhodia Inc, Cranbury, N.J.) (7.67E-3 g, 7.54E-6 mol in 0.1 mL of methylene chloride) to form a varnish solution. The varnish solution was filtered through a 0.2-micron pore filter prior to use.

Example V45

Bis-Norbornenemethoxy dimethylsilane (SiX, CAS 376609-87-9) (50.0 g, 0.164 mol) were weighed out into a glass vial. To this solution of monomers were added two antioxidants, Ciba® IRGANOX® 1076 (0.5 g) and Ciba® IRGAFOS® 168 (0.125 g) (both available from Ciba Specialty Chemicals Corporation, Tarrytown, N.Y.) to form a monomer-antioxidant solution. To 30.0 g of the above prepared P20 copolymer solution, were added 1.44 g of the monomer-antioxidant solution, $Pd(P(i-Pr)_3)_2(OAc)_2$ (Pd545) (1.02E-3 g, 1.88E-6 mol in 0.1 mL of methylene chloride) and RHODORSIL® PHOTOINITIATOR 2074 (CAS 178233-72-2, available from Rhodia Inc, Cranbury, N.J.) (7.67E-3 g, 7.54E-6 mol in 0.1 mL of methylene chloride) to form a varnish solution. The varnish solution was filtered through a 0.2-micron pore filter prior to use.

Example V46

Bis-Norbornenemethoxy dimethylsilane (SiX, CAS 376609-87-9) (50.0 g, 0.164 mol) were weighed out into a glass vial. To this solution of monomers were added two antioxidants, Ciba® IRGANOX® 1076 (0.5 g) and Ciba® IRGAFOS® 168 (0.125 g) (both available from Ciba Specialty Chemicals Corporation, Tarrytown, N.Y.) to form a monomer-antioxidant solution. To 30.0 g of the above prepared P21 copolymer solution, were added 1.44 g of the monomer-antioxidant solution, Pd(P(i-Pr)$_3$)$_2$(OAc)$_2$ (Pd545) (1.02E-3 g, 1.88E-6 mol in 0.1 mL of methylene chloride) and RHODORSIL® PHOTOINITIATOR 2074 (CAS 178233-72-2, available from Rhodia Inc, Cranbury, N.J.) (7.67E-3 g, 7.54E-6 mol in 0.1 mL of methylene chloride) to form a varnish solution. The varnish solution was filtered through a 0.2-micron pore filter prior to use.

Example V47

HxNB (16.64 g, 0.093 mol) and bis-Norbornenemethoxy dimethylsilane (SiX, CAS 376609-87-9) (33.36 g, 0.110 mol) were weighed out into a glass vial. To this solution of monomers were added two antioxidants, Ciba® IRGANOX® 1076 (0.5 g) and Ciba® IRGAFOS® 168 (0.125 g) (both available from Ciba Specialty Chemicals Corporation, Tarrytown, N.Y.) to form a monomer-antioxidant solution. To 30.0 g of the above prepared P17 copolymer solution, were added 2.16 g of the monomer-antioxidant solution, Pd(PCy$_3$)$_2$(OAc)$_2$ (Pd785) (1.47E-3 g, 1.88E-6 mol in 0.1 mL of methylene chloride) and TAG-372R photo acid generator (CAS 193957-54-9, available from Toyo Ink Mfg. Co., Ltd., Tokyo, Japan) (6.86E-3 g, 7.54E-6 mol in 0.1 mL of methylene chloride) to form a varnish solution. The varnish solution was filtered through a 0.2-micron pore filter prior to use.

Example V48

Bis-Norbornenemethoxy dimethylsilane (SiX, CAS 376609-87-9) (50.0 g, 0.164 mol) were weighed out into a glass vial. To this solution of monomers were added two antioxidants, Ciba® IRGANOX® 1076 (0.5 g) and Ciba® IRGAFOS® 168 (0.125 g) (both available from Ciba Specialty Chemicals Corporation, Tarrytown, N.Y.) to form a monomer-antioxidant solution. To 30.0 g of the above prepared P20 copolymer solution, were added 1.44 g of the monomer-antioxidant solution, Pd(P(i-Pr)$_3$)$_2$(OAc)$_2$ (Pd545) (1.02E-3 g, 1.88E-6 mol in 0.1 mL of methylene chloride) and TAG-372R photo acid generator (CAS 193957-54-9, available from Toyo Ink Mfg. Co., Ltd., Tokyo, Japan) (6.86E-3 g, 7.54E-6 mol in 0.1 mL of methylene chloride) to form a varnish solution. The varnish solution was filtered through a 0.2-micron pore filter prior to use.

Example V63

Bis-Norbornenemethoxy dimethylsilane (SiX, CAS 376609-87-9) (50.0 g, 0.164 mol) were weighed out into a glass vial. To this solution of monomers were added two antioxidants, Ciba® IRGANOX® 1076 (0.5 g) and Ciba® IRGAFOS® 168 (0.125 g) (both available from Ciba Specialty Chemicals Corporation, Tarrytown, N.Y.) to form a monomer-antioxidant solution. To 30.0 g of the above prepared P24 copolymer solution, were added 1.44 g of the monomer-antioxidant solution, Pd(PCy$_3$)$_2$(OAc)$_2$ (Pd785) (1.47E-3 g, 1.88E-6 mol in 0.1 mL of methylene chloride) and RHODORSIL® PHOTOINITIATOR 2074 (CAS 178233-72-2, available from Rhodia Inc, Cranbury, N.J.) (7.67E-3 g, 7.54E-6 mol in 0.1 mL of methylene chloride) to form a varnish solution. The varnish solution was filtered through a 0.2-micron pore filter prior to use.

Example V64

Trimethoxysilyl ethyl norbornene (TMSENB, CAS 68245-19-2) (20.2 g, 0.0834 mol) and bis-Norbornenemethoxy dimethylsilane (SiX, CAS 376609-87-9) (29.80 g, 0.0979 mol) were weighed out into a glass vial. To this solution of monomers were added two antioxidants, Ciba®IRGANOX® 1076 (0.5 g) and Ciba® IRGAFOS® 168 (0.125 g) (both available from Ciba Specialty Chemicals Corporation, Tarrytown, N.Y.) to form a monomer-antioxidant solution. To 30.0 g of the above prepared P26 copolymer solution, were added 2.16 g of the monomer-antioxidant solution, Pd(PCy$_3$)$_2$(OAc)$_2$ (Pd785) (1.47E-3 g, 1.88E-6 mol in 0.1 mL of methylene chloride) and RHODORSIL® PHOTOINITIATOR 2074 (CAS 178233-72-2, available from Rhodia Inc, Cranbury, N.J.) (7.67E-3 g, 7.54E-6 mol in 0.1 mL of methylene chloride) to form a varnish solution. The varnish solution was filtered through a 0.2-micron pore filter prior to use.

Example V65

Trimethoxysilyl ethyl norbornene (TMSENB, CAS 68245-19-2) (20.2 g, 0.0834 mol) and bis-Norbornenemethoxy dimethylsilane (SiX, CAS 376609-87-9) (29.80 g, 0.0979 mol) were weighed out into a glass vial. To this solution of monomers were added two antioxidants, Ciba® IRGANOX® 1076 (0.5 g) and Ciba® IRGAFOS® 168 (0.125 g) (both available from Ciba Specialty Chemicals Corporation, Tarrytown, N.Y.) to form a monomer-antioxidant solution. To 30.0 g of the above prepared P14 copolymer solution, were added 2.16 g of the monomer-antioxidant solution, Pd(PCy$_3$)$_2$(OAc)$_2$ (Pd785) (1.47E-3 g, 1.88E-6 mol in 0.1 mL of methylene chloride) and RHODORSIL® PHOTOINITIATOR 2074 (CAS 178233-72-2, available from Rhodia Inc, Cranbury, N.J.) (7.67E-3 g, 7.54E-6 mol in 0.1 mL of methylene chloride) to form a varnish solution. The varnish solution was filtered through a 0.2-micron pore filter prior to use.

Example V66

To 5 g of P14 copolymer were added 20 g of Mesitylene, IRGANOX® 1076 (0.05 g), Ciba® IRGAFOS® 168 (1.25E-2 g) (both available from Ciba Specialty Chemicals Corporation, Tarrytown, N.Y.) and RHODORSIL® PHOTOINITIATOR 2074 (CAS 178233-72-2, available from Rhodia Inc., Cranbury, N.J.) (4.0E-3 g in 0.1 mL of methylene chloride) to form a varnish solution. The varnish solution was filtered through a 0.2-micron pore filter prior to use.

Tables 2, 3 and 4 provide a summary of the composition of each varnish solution discussed above:

TABLE 2

|  | Polymer matrix/ weight | Norbornene monomers | | Wt. | Pd-785 | PAG Wt./mol | R or T† |
|---|---|---|---|---|---|---|---|
|  |  | Mon 1 (mol %) | Mon 2 (mol %) |  |  |  |  |
| V1 | P1 (3 g) | HxNB (90) | SiX (10) | 3 g | 4.94E−4 g (6.29E−7 mol) | 2.55E−3 g (2.51E−6 mol) | R |
| V2 | P2 (3 g) | N/A | SiX (100) | 3 g | 3.10E−4 g (3.94E−7 mol) | 1.60E−3 g (1.58E−6 mol) | R |
| V3 | P3 (1 g) P4 (2 g) | HxNB (90) | SiX (10) | 3 g | 4.93E−4 g (6.28E−7 mol) | 2.55E−3 g (2.51E−6 mol) | R |
| V4 | P3 (1.5 g) P4 (1.5 g) | HxNB (90) | SiX (10) | 3 g | 4.93E−4 g (6.28E−7 mol) | 2.55E−3 g (2.51E−6 mol) | R |
| V5 | P3 (2 g) P4 (1.0 g) | HxNB (90) | SiX (10) | 3 g | 4.93E−4 g (6.28E−7 mol) | 2.55E−3 g (2.51E−6 mol) | R |
| V6 | P3 (3 g) | HxNB (90) | SiX (10) | 3 g | 4.93E−4 g (6.28E−7 mol) | 2.55E−3 g (2.51E−6 mol) | R |
| V7 | P3 (1.5 g) P4 (1.5 g) | HxNB (90) | TMSENB (10) | 3 g | 5.02E−4 g (6.39E−7 mol) | 2.59E−3 g (2.55E−6 mol) | R |
| V8 | P5 (1.8 g) | HxNB (90) | SiX (10) | 3.1 g | 3.85E−4 g (4.91E−7 mol) | 1.99E−3 g (1.96E−6 mol) | R |
| V9 | P6 (.92 g) | HxNB (90) | SiX (10) | 1.5 g | 2.52E−4 g (3.21E−7 mol) | 1.30E−3 g (1.28E−6 mol) | R |
| V10 | P3 (2 g) | HxNB (90) | SiX (10) | 2.4 g | 3.95E−4 g (5.03E−7 mol) | 2.55E−3 g (2.51E−6 mol) | R |
| V11 | P8 (2 g) | HxNB (90) | SiX (10) | 2.4 g | 3.95E−4 g (5.03E−7 mol) | 2.55E−3 g (2.51E−6 mol) | R |
| V12 | P9 (3 g) | HxNB (90) | SiX (10) | 1 g | 1.65E−4 g (2.10E−7 mol) | 8.51E−4 g (8.38E−7 mol) | R |
| V13 | P14 (3 g) | HxNB (90) | SiX (10) | 2 g | 3.29E−4 g (4.19E−7 mol) | 7.63E−4 g (8.38E−6 mol) | T |

TABLE 3

|  | Polymer matrix/ weight | Norbornene monomers | | Wt. | Pd-785 or Pd-545 | PAG Wt./mol | R or T† |
|---|---|---|---|---|---|---|---|
|  |  | Mon 1 (mol %) | Mon 2 (mol %) |  |  |  |  |
| V38 | P3(3 g) (Hx/diPh) | HxNB (46) | SiX (54) | 2.16 g | Pd-785 1.47E−3 g (1.88E−6 mol) | 7.67E−3 g (7.54E−6 mol) | R |
| V39 | P34(9 g) (Hx/diPh/ TMSE) | HxNB (46) | SiX (54) | 2.16 g | Pd-785 1.47E−3 g (1.88E−6 mol) | 7.67E−3 g (7.54E−6 mol) | R |
| V40 | P12(9 g) (Hx/diPh) | HxNB (46) | SiX (54) | 2.16 g | Pd-785 1.47E−3 g (1.88E−6 mol) | 7.67E−3 g (7.54E−6 mol) | R |
| V41 | P16(9 g) (Bu/PE) | HxNB (46) | SiX (54) | 2.16 g | Pd-785 1.47E−3 g (1.88E−6 mol) | 7.67E−3 g (7.54E−6 mol) | R |
| V42 | P17(9 g) (Hx/PE) | HxNB (46) | SiX (54) | 2.16 g | Pd-785 1.47E−3 g (1.88E−6 mol) | 7.67E−3 g (7.54E−6 mol) | R |
| V43 | P18(9 g) (De/PE) | HxNB (46) | SiX (54) | 2.16 g | Pd-785 1.47E−3 g (1.88E−6 mol) | 7.67E−3 g (7.54E−6 mol) | R |
| V44 | P19(9 g) (Bz) | N/A | SiX (100) | 1.44 g | Pd-545 1.02E−3 g (1.88E−6 mol) | 7.67E−3 g (7.54E−6 mol) | R |
| V45 | P20(9 g) (Hx/Bz) | N/A | SiX (100) | 1.44 g | Pd-545 1.02E−3 g (1.88E−6 mol) | 7.67E−3 g (7.54E−6 mol) | R |
| V46 | P21(9 g) (De/Bz) | N/A | SiX (100) | 1.44 g | Pd-545 1.02E−3 g (1.88E−6 mol) | 7.67E−3 g (7.54E−6 mol) | R |
| V47 | P17(9 g) (Hx/PE) | HxNB (46) | SiX (54) | 2.16 g | Pd-785 1.47E−3 g (1.88E−6 mol) | 6.86E−3 g (7.54E−6 mol) | T |
| V48 | P20(9 g) (Hx/Bz) | N/A | SiX (100) | 1.44 g | Pd-545 1.02E−3 g (1.88E−6 mol) | 6.86E−3 g (7.54E−6 mol) | T |

TABLE 4

| Polymer matrix/weight | Norbornene monomers | | | | | |
|---|---|---|---|---|---|---|
| | Mon 1 (mol %) | Mon 2 (mol %) | Wt. | Pd-785 | PAG Wt./mol | R or T† |
| V63 P24(9 g) De/AGE | N/A | SiX(100) | 1.44 g | 1.47E-3 g (1.88E-6 mol) | 7.67E-3 g (7.54E-6 mol) | R |
| V64 P26(9 g) Hx/TMSE | TMSE (46) | SiX (54) | 2.16 g | 1.47E-3 g (1.88E-6 mol) | 7.67E-3 g (7.54E-6 mol) | R |
| V65 P14(9 g) Hx/diPh | TMSE (46) | SiX (54) | 2.16 g | 1.47E-3 g (1.88E-6 mol) | 7.67E-3 g (7.54E-6 mol) | R |
| V66 P14(5 g) | — | — | — | — | 4.00E-3 g (3.94E-6 mol) | R |

†R indicates Rhodorsil 2074 was used and T indicates TAG-372R

Examples V21-V31, V51-V55, V61 and V62

Examples V21-V31, V51-V55, V61 and V62 demonstrate the formulation of varnish solutions encompassing matrix polymers, an acid generator, optional antioxidants and solvents in accordance with embodiments of the present invention. It will be noted that as each of the varnish solutions exemplified below incorporates a photo sensitive material, such solutions were formulated under yellow light.

Example V21

To 5 g of P12 copolymer were added 20 g of Mesitylene, 0.05 g of Irganox 1076, 0.0125 g of Irgafos 168 and RHODORSIL® PHOTOINITIATOR 2074 (CAS 178233-72-2, available from Rhodia Inc, Cranbury, N.J.) (4.0E-3 g in 0.1 mL of methylene chloride) to form a varnish solution. The varnish solution was filtered through a 0.2-micron pore filter prior to use.

Example V22

To 5 g of P13 copolymer were added 20 g of Mesitylene, 0.05 g of Irganox 1076, 0.0125 g of Irgafos 168 and RHODORSIL® PHOTOINITIATOR 2074 (CAS 178233-72-2, available from Rhodia Inc, Cranbury, N.J.) (4.0E-3 g in 0.1 mL of methylene chloride) to form a varnish solution. The varnish solution was filtered through a 0.2-micron pore filter prior to use.

Example V23

To 5 g of P14 copolymer were added 20 g of Mesitylene, 0.05 g of Irganox 1076, and 0.0125 g of Irgafos 168 to form a varnish solution. The varnish solution was filtered through a 0.2-micron pore filter prior to use.

Example V24

To 0.9 g of P11 homopolymer were added 3.6 g of Mesitylene, 9.0E-3 g of Irganox 1076, 2.3E-3 g of Irgafos 168 and RHODORSIL® PHOTOINITIATOR 2074 (CAS 178233-72-2, available from Rhodia Inc, Cranbury, N.J.) (1.1E-3 g in 0.1 mL of methylene chloride) to form a varnish solution. The varnish solution was filtered through a 0.2-micron pore filter prior to use.

Example V25

To 0.9 g of P11 homopolymer were added 3.6 g of Mesitylene, 9.0E-3 g of Irganox 1076, 2.3E-3 g of Irgafos 168 and RHODORSIL® PHOTOINITIATOR 2074 (CAS 178233-72-2, available from Rhodia Inc, Cranbury, N.J.) (7.5E-4 g in 0.1 mL of methylene chloride) to form a varnish solution. The varnish solution was filtered through a 0.2-micron pore filter prior to use.

Example V26

To 0.9 g of P11 homopolymer were added 3.6 g of Mesitylene, 9.0E-3 g of Irganox 1076, 2.3E-3 g of Irgafos 168 and TAG-372R photo acid generator (dimethyl (2-(2-naphthly)-2-oxoethyl) sulfonium tetrakis (pentafluorophenyl) borate, CAS 193957-54-9) available from Toyo Ink Mfg. Co., Ltd., Tokyo, Japan) (7.5E-4 g in 0.1 mL of methylene chloride) to form a varnish solution. The varnish solution was filtered through a 0.2-micron pore filter prior to use.

Example V27

To 0.9 g of P11 homopolymer were added 3.6 g of Mesitylene, 9.0E-3 g of Irganox 1076, 2.3E-3 g of Irgafos 168 and RHODORSIL® PHOTOINITIATOR 2074 (CAS 178233-72-2, available from Rhodia Inc, Cranbury, N.J.) (1.1E-3 g in 0.1 mL of methylene chloride) to form a varnish solution. The varnish solution was filtered through a 0.2-micron pore filter prior to use.

Example V28

To 0.9 g of P11 homopolymer were added 3.6 g of Mesitylene, 9.0E-3 g of Irganox 1076, 2.3E-3 g of Irgafos 168 and TAG-372R photo acid generator (dimethyl (2-(2-naphthly)-2-oxoethyl) sulfonium tetrakis (pentafluorophenyl) borate, CAS 193957-54-9) available from Toyo Ink Mfg. Co., Ltd., Tokyo, Japan) (7.5E-4 g in 0.1 mL of methylene chloride) to form a varnish solution. The varnish solution was filtered through a 0.2-micron pore filter prior to use.

Example V29

To 0.9 g of P11 homopolymer were added 3.6 g of Mesitylene, 9.0E-3 g of Irganox 1076, 2.3E-3 g of Irgafos 168 and TAG-372R photo acid generator (dimethyl (2-(2-naphthly)-2-oxoethyl) sulfonium tetrakis (pentafluorophenyl) borate, CAS 193957-54-9) available from Toyo Ink Mfg. Co., Ltd., Tokyo, Japan) (1.1E-3 g in 0.1 mL of methylene chloride) to form a varnish solution. The varnish solution was filtered through a 0.2-micron pore filter prior to use.

Example V30

To 0.9 g of P11 homopolymer were added 3.6 g of Mesitylene, 9.0E-3 g of Irganox 1076, 2.3E-3 g of Irgafos 168 and RHODORSIL® PHOTOINITIATOR 2074 (CAS 178233-72-2, available from Rhodia Inc, Cranbury, N.J.) (7.5E-4 g in 0.1 mL of methylene chloride) to form a varnish solution. The varnish solution was filtered through a 0.2-micron pore filter prior to use.

Example V31

To 0.9 g of P11 homopolymer were added 3.6 g of Mesitylene, 9.0E-3 g of Irganox 1076, 2.3E-3 g of Irgafos 168 and TAG-372R photo acid generator (dimethyl (2-(2-naphthly)-2-oxoethyl) sulfonium tetrakis (pentafluorophenyl) borate, CAS 193957-54-9) available from Toyo Ink Mfg. Co., Ltd., Tokyo, Japan) (1.1E-3 g in 0.1 mL of methylene chloride) to form a varnish solution. The varnish solution was filtered through a 0.2-micron Example V51

To 4.0 g of the above prepared P15 homopolymer solution, were added RHODORSIL® PHOTOINITIATOR 2074 (CAS 178233-72-2, available from Rhodia Inc, Cranbury, N.J.) (1.56E-3 g, 1.54E-6 mol in 0.1 mL of methylene chloride) to form a varnish solution. The varnish solution was filtered through a 0.2-micron pore filter prior to use.

Example V52

To 4.0 g of the above prepared P15 homopolymer solution, were added TAG-372R photo acid generator (CAS 193957-54-9, available from Toyo Ink Mfg. Co., Ltd., Tokyo, Japan) (1.56E-3 g, 1.54E-6 mol in 0.1 mL of methylene chloride) to form a varnish solution. The varnish solution was filtered through a 0.2-micron pore filter prior to use.

Example V53

To 4.0 g of the above prepared P15 homopolymer solution, were added TAG-371 photo acid generator (CAS 193957-53-8, available from Toyo Ink Mfg. Co., Ltd., Tokyo, Japan) (1.56E-3 g, 1.54E-6 mol in 0.1 mL of methylene chloride) to form a varnish solution. The varnish solution was filtered through a 0.2-micron pore filter prior to use.

Example V54

To 4.0 g of the above prepared P15 homopolymer solution, were added tris(4-tertbutylphenyl)sulphonium tetrakis(pentafluorophenyl)borate photo acid generator (also referred to as "TTBPS-TPFPB," available from Toyo Gosei Co., Ltd., Tokyo, Japan) (1.56E-3 g, 1.54E-6 mol in 0.1 mL of methylene chloride) to form a varnish solution. The varnish solution was filtered through a 0.2-micron pore filter prior to use.

Example V55

To 4.0 g of the above prepared P15 homopolymer solution, were added NAI-105 photo acid generator (CAS 85342-62-7, available from Midori kagaku. Co., Ltd., Tokyo, Japan) (1.56E-3 g, 1.54E-6 mol in 0.1 mL of methylene chloride) to form a varnish solution. The varnish solution was filtered through a 0.2-micron pore filter prior to use.

Example V61

To 16.7 g of the above prepared P24 copolymer solution, were added two antioxidants, Ciba® IRGANOX® 1076 (0.05 g), Ciba® IRGAFOS® 168 (1.25E-2 g) (both available from Ciba Specialty Chemicals Corporation, Tarrytown, N.Y.) and RHODORSIL® PHOTOINITIATOR 2074 (CAS 178233-72-2, available from Rhodia Inc, Cranbury, N.J.) (0.1 g in 0.5 mL of methylene chloride). The varnish solution was filtered through a 0.2-micron pore filter prior to use.

Example V62

To 16.7 g of the above prepared P24 copolymer solution, were added two antioxidants, Ciba® IRGANOX® 1076 (0.05 g), Ciba® IRGAFOS® 168 (1.25E-2 g) (both available from Ciba Specialty Chemicals Corporation, Tarrytown, N.Y.) and TAG-372R photo acid generator (dimethyl (2-(2-naphthly)-2-oxoethyl) sulfonium tetrakis (pentafluorophenyl) borate, CAS No. 193957-54-9) available from Toyo Ink Mfg. Co., Ltd., Tokyo, Japan) (0.1 g in 0.5 mL of methylene chloride). The varnish solution was filtered through a 0.2-micron pore filter prior to use.

Table 5 provides a summary of the composition of each varnish solution discussed above.

TABLE 5

|  | Polymer matrix/ weight | PAG Species | (wt) | (%) (w.r.t polymer) |
|---|---|---|---|---|
| V21 | P12 (5 g) | Rhodorsil 2074 | 4.0E-3 g | 0.08 |
| V22 | P13 (5 g) | Rhodorsil 2074 | 4.0E-3 g | 0.08 |
| V23 | P14 (5 g) | — | — | 0 |
| V24 | P11 (0.9 g) | Rhodorsil 2074 | 1.1E-3 g | 0.13 |
| V25 | P11 (0.9 g) | Rhodorsil 2074 | 7.5E-4 g | 0.08 |
| V26 | P11 (0.9 g) | TAG-372R | 7.5E-4 g | 0.08 |
| V27 | P11 (0.9 g) | Rhodorsil 2074 | 1.1E-3 g | 0.13 |
| V28 | P11 (0.9 g) | TAG-372R | 7.5E-4 g | 0.08 |
| V29 | P11 (0.9 g) | TAG-372R | 1.1E-3 g | 0.13 |
| V30 | P11 (0.9 g) | Rhodorsil 2074 | 7.5E-4 g | 0.08 |
| V31 | P11 (0.9 g) | TAG-372R | 1.1E-3 g | 0.13 |
| V51 | P15 (4 g) (diPh-homo) | Rhodorsil | 1.56E-3 g | 0.13 |
| V52 | P15 (4 g) (diPh-homo) | TAG-372R | 1.56E-3 g | 0.13 |
| V53 | P15 (4 g) (diPh-homo) | TAG-371 | 1.56E-3 g | 0.13 |
| V54 | P15 (4 g) (diPh-homo) | TTBPS-TPFPB | 1.56E-3 g | 0.13 |
| V55 | P15 (4 g) (diPh-homo) | NAI-105 | 1.56E-3 g | 0.13 |
| V61 | P24 (5 g) | Rhodorsil | 0.1 g | 2.0 |
| V62 | P24 (5 g) | TAG-372R | 0.1 g | 2.0 |

Waveguide

EXAMPLES WG1-WG5

Examples WG1 to WG5 demonstrate the fabrication of single-layer and three-layer waveguide structures in accordance with embodiments of the present invention. It will be noted that as each of the varnish solutions used in the exemplified methods, below, of forming waveguide structures incorporates a photo sensitive material, such structures were formed under yellow light.

Example WG1

Formation of a Single-layer Waveguide Structure

The appropriate filtered varnish solution was poured onto a 4" glass wafer and spread to an essentially uniform thickness using a doctor blade. Then the coated glass wafer was placed on a vented leveling table overnight to allow the solvents to evaporate and form an essentially dry, solid film. The film was exposed to UV light (365 nm) through a photomask (dose=3000 mJ) and then heated in an oven for 30 minutes at 85° C. followed by heating for an additional 60 minutes at 150° C. A waveguide pattern was visible after the first heating step.

Example WG2

Formation of a Three-layer Waveguide Structure

Varnish solution V8 was poured onto 250-micron thick PET film and spread to an essentially uniform thickness using a doctor blade (wet thickness=70-micron). Then Varnish solution V9 was poured onto the first layer and spread to an essentially uniform thickness using a doctor blade (wet thickness=80-micron). Finally the Varnish solution V8 was poured onto the second layer and spread to an essentially uniform thickness using a doctor blade (wet thickness=80 micron). Then the coated PET film was placed on a hot plate and was heated at 50° C. for 30 minutes to allow the toluene to evaporate and form a solid accumulated film. The film was exposed to UV light (365 nm) through a positive tone photomask (exposure dose=3000 mJ/cm$^2$) and then placed on a hot plate for 30 minutes at 45° C. followed by a cure for 30 minutes at 85° C. and for 60 minutes at 150° C., respectively. A waveguide pattern was visible after the film was placed on a hot plate at 45° C. for 10 minutes. Propagation loss for this waveguide was measured using a "cut back method" and was determined to be 6.0 dB/cm.

Example WG3

Formation of a Three-layer Waveguide Structure

The filtered Varnish solution V11 was poured onto 250-micron thick PET film and spread to an essentially uniform thickness using a doctor blade (wet thickness=70-micron). Then filtered Varnish solution V10 was poured onto the first layer and spread to an essentially uniform thickness using a doctor blade (wet thickness=80-micron). Finally the filtered Varnish solution V11 was poured onto the second layer and spread to an essentially uniform thickness using a doctor blade (wet thickness=80-micron). Then the coated PET film was placed on a hot plate and was heated at 50° C. for 45 minutes to allow the toluene to evaporate and form a solid accumulated film. The film was exposed to UV light (365 nm) through a positive tone photomask (exposure dose=3000 mJ/cm$^2$) and then put in an oven for 30 minutes at 50° C. followed by a cure for 30 minutes at 85° C. and for 60 minutes at 150° C., respectively. A waveguide pattern was visible after the film was placed in an oven at 50° C. for 10 minutes. Propagation loss for this waveguide was measured using a "cut back method" and was determined to be 3.0 dB/cm.

Example WG4

Formation of a Three-layer Waveguide Structure

The Varnish solution V13 was poured onto 250-micron thick PET film and spread to an essentially uniform thickness using a doctor blade (wet thickness=70-micron). Then filtered Varnish solution V12 was poured onto the first layer and spread to an essentially uniform thickness using a doctor blade (wet thickness=80-micron). Finally the Varnish solution V13 was poured onto the second layer and spread to an essentially uniform thickness using a doctor blade (wet thickness=80-micron). Then the coated PET film was placed on a hot plate and was heated at 50° C. for 45 minutes to allow the toluene to evaporate and form a solid accumulated film. The film was exposed to UV light (365 nm) through a positive tone photomask (exposure dose=3000 mJ/cm$^2$) and then put in an oven for 30 minutes at 50° C. followed by a cure for 30 minutes at 85° C. and for 60 minutes at 150° C., respectively. A waveguide pattern was visible after the film was placed in an oven at 50° C. for 10 minutes.

Example WG5

Formation of a Three-layer Waveguide Structure

Avatrel® 2000P solution (available from Promerus LLC, Brecksville, Ohio) was poured onto a 4" glass wafer and spread to an essentially uniform thickness using a spin coater (wet thickness=1-micron). Then it was placed on a hot plate and heated at 100° C. for 10 minutes and exposed to UV light without a photomask (exposure dose 400 mJ/cm2) followed by curing at 110° C. for 15 minutes and 160° C. for 1 hour, respectively.

Then the varnish solution V12 was poured onto the surface of the cured Avatrel 2000P layer and spread to an essentially uniform thickness using a doctor blade (wet thickness=70-micron). Then the coated glass wafer was placed on a vented leveling table overnight to allow the solvents to evaporate and form an essentially dry solid film. The following day the solid film formed of solution V12 was exposed to UV light (365 nm) through a photomask (exposure dose 3000 mJ/cm$^2$) followed by aging at room temperature for 30 minutes, curing first at 85° C. for 30 minutes and then at 150° C. for 60 minutes. A waveguide pattern was visible after the film was cured at 85° C. for 30 minutes.

Then a second portion of Avatrel 2000P solution was poured onto the surface of the cured layer of varnish solution V12 and spread to an essentially uniform thickness using a spin coater (wet thickness=1 micron). The coated glass wafer was placed on a hot plate and heated at 100° C. for 10 minutes and exposed to UV light without a photomask (exposure dose 400 mJ/cm$_2$) followed by curing at 110° C. for 15 minutes and 160° C. for 1 hour, respectively. A waveguide pattern was still visible but the film looked brownish through the top cladding layer.

Propagation Loss Measurements

Propagation loss for each of the waveguides formed by five varnish solutions, V3-V7, was measured using a "cut back method." Each waveguide was a single-layer waveguide fabricated using the method of Example WG1. Light (830 nm) generated from a LASER diode was input into a first end of the core of waveguide formed from each varnish solution through an optical fiber, where the waveguide had a first length. The power of the light output at an opposing, second end was measured. The waveguide was the "cut back" to at least two shorter lengths and the light output measured at the second output end for each length.

Figure 11:
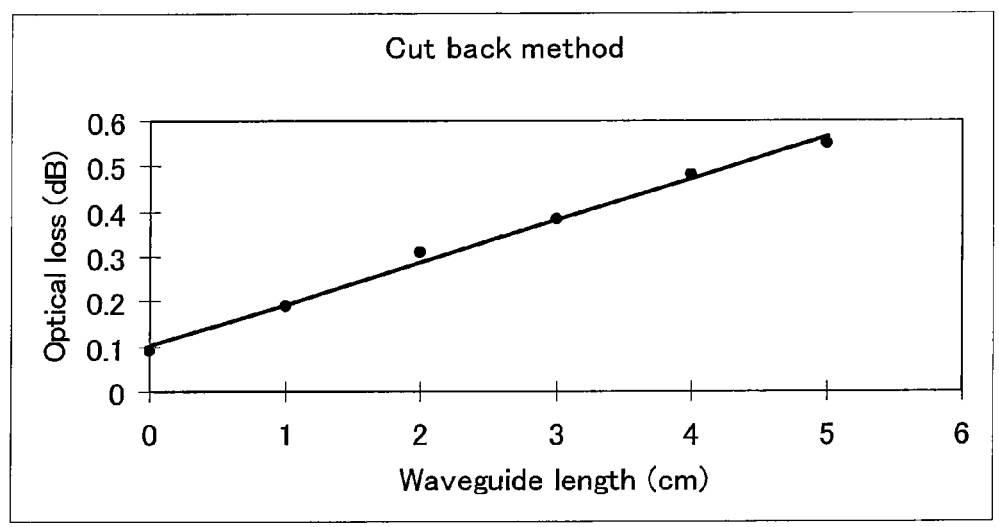
FIG. 11 is a chart showing the total optical loss for propagation loss measurements.

Total optical loss for each of the measurements is:

$$\text{Total Optical Loss(dB)} = -10 \log(P_n/P_o),$$

where $P_n$ is the measured output at the second end of the waveguide for each of the lengths $P_1, P_2, \ldots P_n$, and $P_o$ is the measured output of the of the light source at the end of the optical fiber before such fiber is coupled to the first end of the waveguide core. The total optical loss is then plotted as exemplified in FIG. 11. The resulting best straight line of this data is represented by the equation:

$$y = mx + b,$$

where m is the propagation loss and b is the coupling loss.

Results of Propagation Loss using the "cut back" method for each of varnish solutions V3-V7 is presented in Table 6, below.

TABLE 6

| Varnish solution # | V3 | V4 | V5 | V6 | V7 |
|---|---|---|---|---|---|
| Propagation loss [dB/cm] | 0.183 | 0.157 | 0.112 | 0.087 | 0.474 |

Examples WG11-WG20

Examples WG11-WG20 demonstrate the fabrication of single-layer and three-layer waveguide structures in accordance with embodiments of the present invention. Each of the varnish solutions used in the exemplified methods of forming waveguide structures below incorporates a photo sensitive material. Such structures were formed under yellow light.

Example WG11

Formation of a Single-layer Waveguide Structure

The filtered varnish solution V24 was poured onto a glass substrate and spread to an essentially uniform thickness using a doctor blade. Then the glass substrate was placed on a vented leveling table overnight to allow the solvents to evaporate and form an essentially dry, solid film. The film was exposed to UV light (365 nm) through a photomask (UV dose; 6 J/cm2) and then heated in an oven for 30 minutes at 85° C. followed by heating for an additional 60 minutes at 150° C. A waveguide pattern was visible after the first heating step.

Example WG12

Formation of a Single-layer Waveguide Structure

The filtered varnish solution V25 was poured onto a 4" SiO$_2$ coated wafer and spread to an essentially uniform thickness using a doctor blade. Then the coated wafer was placed on a vented leveling table overnight to allow the solvents to evaporate and form an essentially dry, solid film. The film was exposed to UV light (365 nm) through a photomask (UV dose; 3 J/cm2) and then heated in an oven for 30 minutes at 85° C. followed by heating for an additional 60 minutes at 150° C. A waveguide pattern was visible after the first heating step.

Example WG13

Formation of a Single-layer Waveguide Structure

The filtered varnish solution V26 was poured onto a 4" SiO$_2$ coated wafer and spread to an essentially uniform thickness using a doctor blade. Then the coated wafer was placed on a vented leveling table overnight to allow the solvents to evaporate and form an essentially dry, solid film. The film was exposed to UV light (365 nm) through a photomask (UV dose; 6 J/cm2) and then heated in an oven for 30 minutes at 85° C. followed by heating for an additional 60 minutes at 150° C. A waveguide pattern was visible after the first heating step.

Example WG14

Formation of a Single-layer Waveguide Structure

The filtered varnish solution V27 was poured onto a 4" SiO$_2$ coated wafer and spread to an essentially uniform thickness using a doctor blade. Then the coated wafer was placed on a vented leveling table overnight to allow the solvents to evaporate and form an essentially dry, solid film. The film was exposed to UV light (365 nm) through a photomask (UV dose; 3 J/cm2) and then heated in an oven for 30 minutes at 85° C. followed by heating for an additional 60 minutes at 150° C. A waveguide pattern was visible after the first heating step.

Example WG15

Formation of a Single-layer Waveguide Structure

The filtered varnish solution V28 was poured onto a 4" SiO$_2$ coated wafer and spread to an essentially uniform thickness using a doctor blade. Then the coated wafer was placed on a vented leveling table overnight to allow the solvents to evaporate and form an essentially dry, solid film. The film was exposed to UV light (365 nm) through a photomask (UV dose; 3 J/cm2) and then heated in an oven for 30 minutes at 85° C. followed by heating for an additional 60 minutes at 150° C. A waveguide pattern was visible after the first heating step.

Example WG16

Formation of a Single-layer Waveguide Structure

The filtered varnish solution V29 was poured onto a 4" SiO$_2$ coated wafer and spread to an essentially uniform thickness using a doctor blade. Then the coated wafer was placed on a vented leveling table overnight to allow the solvents to evaporate and form an essentially dry, solid film. The film was exposed to UV light (365 nm) through a photomask (UV dose; 3 J/cm2) and then heated in an oven for 30 minutes at 85° C. followed by heating for an additional 60 minutes at 150° C. A waveguide pattern was visible after the first heating step.

Example WG17

Formation of a Single-layer Waveguide Structure

The filtered varnish solution V30 was poured onto a 4" SiO$_2$ coated wafer and spread to an essentially uniform thickness using a doctor blade. Then the coated wafer was placed on a vented leveling table overnight to allow the solvents to evaporate and form an essentially dry, solid film. The film was exposed to UV light (365 nm) through a photomask (UV dose; 6 J/cm2) and then heated in an oven for 30 minutes at 85° C. followed by heating for an additional 60 minutes at 150° C. A waveguide pattern was visible after the first heating step.

Example WG18

Formation of a Single-layer Waveguide Structure

The filtered varnish solution V31 was poured onto a 4" SiO$_2$ coated wafer and spread to an essentially uniform thickness using a doctor blade. Then the coated wafer was placed on a vented leveling table overnight to allow the solvents to evaporate and form an essentially dry, solid film. The film was exposed to UV light (365 nm) through a photomask (UV dose; 6 J/cm2) and then heated in an oven for 30 minutes at 85° C. followed by heating for an additional 60 minutes at 150° C. A waveguide pattern was visible after the first heating step.

Example WG19

Formation of a Three-layer Waveguide

Varnish solution V23 was poured onto 1 mm thick glass plate and spread to an essentially uniform thickness using a doctor blade (wet thickness=70-micron). Then Varnish solution V21 was poured onto the first layer and spread to an essentially uniform thickness using a doctor blade (wet thickness=80-micron). Finally the Varnish solution V23 was poured onto the second layer and spread to an essentially uniform thickness using a doctor blade (wet thickness=80 micron). Then the coated glass plate was placed on a hot plate and was heated at 50° C. for 30 minutes to allow the mesitylene to evaporate and form a solid accumulated film. The film was exposed to UV light (365 nm) through a positive tone photomask (exposure dose=3000 mJ/cm2) and heated for 30 minutes at 85° C. and for 60 minutes at 150° C., respectively. A waveguide pattern was visible after the glass plate was heated at 85° C. for 30 minutes. Propagation loss for this waveguide was measured using a "cut back method" and was determined to be 3.0 dB/cm.

Example WG20

Formation of a Three-layer Waveguide

Varnish solution V23 was poured onto 1 mm thick glass plate and spread to an essentially uniform thickness using a doctor blade (wet thickness=70-micron). Then Varnish solution V22 was poured onto the first layer and spread to an essentially uniform thickness using a doctor blade (wet thickness=80-micron). Finally the Varnish solution V23 was poured onto the second layer and spread to an essentially uniform thickness using a doctor blade (wet thickness=80 micron). Then the coated glass plate was placed on a hot plate and was heated at 50° C. for 30 minutes to allow the mesitylene to evaporate and form a solid accumulated film. The film was exposed to UV light (365 nm) through a positive tone photomask (exposure dose=3000 mJ/cm2) and heated for 30 minutes at 85° C. and for 60 minutes at 150° C., respectively. A waveguide pattern was visible after the glass plate was heated at 85° C. for 30 minutes. Propagation loss for this waveguide was measured using a "cut back method" and was determined to be 2.0 dB/cm.

Propagation Loss Measurements

Propagation losses for each of the single-layer waveguides formed by eight varnish solutions V24-V31 and the three-layer waveguides formed by two varnish solutions V21-V22 for the core layer and one varnish solution V23 for the cladding layer were measured in the same manner as explained above.

Results of propagation loss of the single-layer waveguides are shown in Table 7, and results of propagation loss of the three-layer waveguides are shown in Table 8 below.

TABLE 7

| | Varnish solution | | | | | | | |
|---|---|---|---|---|---|---|---|---|
| | V24 | V25 | V26 | V27 | V28 | V29 | V30 | V31 |
| Energy of UV Exposure (J/cm$^2$) | 6 | 3 | 6 | 3 | 3 | 3 | 6 | 6 |
| Waveguide | WG11 | WG12 | WG13 | WG14 | WG15 | WG16 | WG17 | WG18 |
| Propagation loss [dB/cm] | 0.6 | 0.3 | 0.4 | 0.4 | 0.4 | 0.2 | 0.5 | 0.2 |

TABLE 8

| | | |
|---|---|---|
| Varnish solution for cladding layer | V23 | V23 |
| Varnish solution for core layer | V21 | V22 |
| Energy of UV Exposure (J/cm$^2$) | 3 | 3 |
| Waveguide | WG19 | WG20 |
| Propagation loss [dB/cm] | 3.0 | 2.0 |

Example WG21

Formation of a single-layer waveguide structure

The filtered varnish solution V38 was poured onto a quartz glass wafer and spread to an essentially uniform thickness using a doctor blade. Then the quartz glass wafer was placed on a vented leveling table overnight to allow the solvents to evaporate and form an essentially dry, solid film. The film was exposed to UV light (365 nm) through a photomask (UV dose; 3000 mJ) and then heated in an oven for 30 minutes at 45° C., 30 minutes at 85° C. followed by heating for an additional 60 minutes at 150° C. A waveguide pattern was visible after the first heating step.

Examples WG22-WG36

Examples WG22 to WG36 demonstrate the fabrication of single-layer waveguide structure in accordance with embodiments of the present invention. WG22 to WG36 were prepared as WG21 above, except for changing the varnish solution and amount of irradiation.

Table 9 provides a summary of the propagation loss for each of the single-layer waveguide WG21-WG36.

TABLE 9

| | Varnish solution | | | | | | | |
|---|---|---|---|---|---|---|---|---|
| | V38 | V39 | V40 | V41 | V42 | V43 | V44 | V45 |
| Energy of UV Exposure (J/cm$^2$) | 3 | 3 | 1.5 | 3 | 3 | 3 | 3 | 3 |
| Waveguide | WG21 | WG22 | WG23 | WG24 | WG25 | WG26 | WG27 | WG28 |
| Propagation loss [dB/cm] | 0.10 | 0.12 | 0.08 | 0.32 | 0.13 | 0.26 | 0.62 | 0.40 |
| | Varnish solution | | | | | | | |
| | V46 | V47 | V48 | V51 | V52 | V53 | V54 | V55 |
| Energy of UV Exposure (J/cm$^2$) | 3 | 6 | 6 | 3 | 3 | 3 | 6 | 6 |
| Waveguide | WG29 | WG30 | WG31 | WG32 | WG33 | WG34 | WG35 | WG36 |
| Propagation loss [dB/cm] | 0.28 | 0.18 | 0.53 | 0.11 | 0.15 | 0.19 | 0.26 | 0.48 |

Example WG51

Formation of a Three-layer Waveguide Structure

V61 was poured onto a 4" glass wafer and spread to an essentially uniform thickness using a spin coater (wet thickness=1-micron). Then it was placed on a hot plate and heated at 100° C. for 10 minutes and exposed to UV light without a photomask (exposure dose 400 mJ/cm2) followed by curing at 110° C. for 15 minutes and 160° C. for 1 hour, respectively.

Then the varnish solution V38 was poured onto the surface of the cured V1 layer and spread to an essentially uniform thickness using a doctor blade (wet thickness=70-micron). Then the coated glass wafer was placed on a vented leveling table overnight to allow the solvents to evaporate and form an essentially dry solid film. The following day the solid film formed of solution V38 was exposed to UV light (365 nm) through a photomask (exposure dose 3000 mJ/cm$^2$) followed by aging at 45° C. for 30 minutes, curing first at 85° C. for 30 minutes and then at 150° C. for 60 minutes. A waveguide pattern was visible after the film was cured at 85° C. for 30 minutes.

Then a second portion of V61 was poured onto the surface of the cured layer of varnish solution V38 and spread to an essentially uniform thickness using a spin coater (wet thickness=1 micron). The coated glass wafer was placed on a hot plate and heated at 100° C. for 10 minutes and exposed to UV light without a photomask (exposure dose 400 mJ/cm$_2$) followed by curing at 110° C. for 15 minutes and 160° C. for 1 hour, respectively. A waveguide pattern was still visible but the film looked brownish through the top cladding layer.

Example WG52

A single-layer waveguide film (WG21) was peeled off from a glass substrate, rinsed with a plenty of water and then dried in an oven at 45° C. for 1 hour.

The varnish solution V61 was poured onto a PET film and spread to an essentially uniform thickness using a doctor blade (wet thickness=50-micron) Then it was placed on a hot plate and heated at 45° C. for 10 minutes and exposed to UV light without a mask (exposure dose 3000 mJ/cm2). Finally this cladding film was divided into two pieces using a knife and they were peeled off from the PET film.

WG21 film was inserted between the above two cladding films and heated in an oven at 150° C. for 1 hour under the pressure of 10 MPa. Propagation loss for this three-layer waveguide was measured using a "cut back method" and was determined to be 0.08 dB/cm. Adhesive strength between core and cladding was determined by 90 degree peel test to be 50 gf/cm.

Example WG53

A single-layer waveguide film (WG21) was peeled off from a glass substrate, rinsed with a plenty of water and then dried in an oven at 45° C. for 1 hour.

The varnish solution V63 was poured onto a PET film and spread to an essentially uniform thickness using a doctor blade (wet thickness=50-micron). Then it was placed on a hot plate and heated at 45° C. for 10 minutes and exposed to UV light without a mask (exposure dose 3000 mJ/cm2). Finally this cladding film was divided into two pieces using a knife and they were peeled off from the PET film.

WG21 film was inserted between the above two cladding films and heated in an oven at 150° C. for 1 hour under the pressure of 10 MPa. Propagation loss for this three-layer waveguide was measured using a "cut back method" and was determined to be 0.08 dB/cm. Adhesive strength between core and cladding was determined by 90 degree peel test to be 60 gf/cm.

Example WG54

A single-layer waveguide film (WG21) was peeled off from a glass substrate, rinsed with a plenty of water and then dried in an oven at 45° C. for 1 hour.

The varnish solution V64 was poured onto a PET film and spread to an essentially uniform thickness using a doctor blade (wet thickness=50-micron). Then it was placed on a hot plate and heated at 45° C. for 10 minutes and exposed to UV light without a mask (exposure dose 3000 mJ/cm2). Finally this cladding film was divided into two pieces using a knife and they were peeled off from the PET film.

WG21 film was inserted between the above two cladding films and heated in an oven at 150° C. for 1 hour under the pressure of 10 MPa. Propagation loss for this three-layer waveguide was measured using a "cut back method" and was determined to be 0.08 dB/cm. Adhesive strength between core and cladding was determined by 90 degree peel test to be 300 gf/cm.

Example WG55

A single-layer waveguide film (WG21) was peeled off from a glass substrate, rinsed with a plenty of water and then dried in an oven at 45° C. for 1 hour.

The varnish solution V65 was poured onto a PET film and spread to an essentially uniform thickness using a doctor blade (wet thickness=50-micron). Then it was placed on a hot plate and heated at 45° C. for 10 minutes and exposed to UV light without a mask (exposure dose 3000 mJ/cm2). Finally this cladding film was divided into two pieces using a knife and they were peeled off from the PET film.

WG21 film was inserted between the above two cladding films and heated in an oven at 150° C. for 1 hour under the pressure of 10 MPa. Propagation loss for this three-layer waveguide was measured using a "cut back method" and was determined to be 0.08 dB/cm. Adhesive strength between core and cladding was determined by 90 degree peel test to be 200 gF/cm.

Example WG56

A single-layer waveguide film (WG32) was peeled off from a glass substrate, rinsed with a plenty of water and then dried in an oven at 45° C. for 1 hour.

The varnish solution V66 was poured onto a PET film and spread to an essentially uniform thickness using a doctor blade (wet thickness=50-micron) Then it was placed on a hot plate and heated at 45° C. for 10 minutes and exposed to UV light without a mask (exposure dose 3000 mJ/cm2). Finally this cladding film was divided into two pieces using a knife and they were peeled off from the PET film.

WG32 film was inserted between the above two cladding films and heated in an oven at 150° C. for 1 hour under the pressure of 10 MPa. Propagation loss for this three-layer waveguide was measured using a "cut back method" and was determined to be 0.12 dB/cm. Adhesive strength between core and cladding was determined by 90 degree peel test to be 50 gf/cm.

It will be realized that the norbornene-type polymers and/or norbornene-type monomers described in the embodiments of the present invention provide optical waveguides having excellent transparency and propagation loss.

Tables 10 and 11 provide a summary of the polymers and materials used for WG2-WG5, WG19-20 and WG51-56.

TABLE 10

| | | | Cladding Layer | | | | |
|---|---|---|---|---|---|---|---|
| | | Polymer | Norbornene monomers | | | | |
| | Varnishes | matrix/ Weight | Mon 1 (mol %) | Mon 2 (mol %) | Wt. | Pd-785 | PAG Wt./mol | R or T[†] |
| WG2 | V8 | P5 (1.8 g) | HxNB (90) | SiX (10) | 3.1 g | 3.85E−4 g (4.91E−7 mol) | 1.99E−3 g (1.96E−6 mol) | R |
| WG3 | V11 | P7 (2 g) | HxNB (90) | SiX (10) | 2.4 g | 3.95E−4 g (5.03E−7 mol) | 2.55E−3 g (2.51E−6 mol) | R |
| WG4 | V13 | P10 (3 g) | HxNB (90) | SiX (10) | 2 g | 3.29E−4 g (4.19E−7 mol) | 7.63E−4 g (8.38E−6 mol) | T |
| WG5 | | | | Avatrel 2000P | | | | |
| WG19 | V23 | P14 (5 g) | — | — | — | — | — | — |
| WG20 | V23 | P14 (5 g) | — | — | — | — | — | — |
| WG51 | V61 | P24 (5 g) | — | — | — | — | 0.1 g | R |
| WG52 | V61 | P24 (5 g) | — | — | — | — | 0.1 g | R |
| WG53 | V63 | P24(9 g) De/AGE | N/A | SiX(100) | 1.44 g | 1.47E−3 g(Pd-785) (1.88E−6 mol) | 7.67E−3 g (7.54E−6 mol) | R |
| WG54 | V64 | P26(9 g) Hx/TMSE | TMSE(46) | SiX(54) | 2.16 g | 1.47E−3 g(Pd-785) (1.88E−6 mol) | 7.67E−3 g (7.54E−6 mol) | R |
| WG55 | V65 | P14(9 g) Hx/diPh | TMSE(46) | SiX(54) | 2.16 g | 1.47E−3 g(Pd-785) (1.88E−6 mol) | 7.67E−3 g (7.54E−6 mol) | R |
| WG56 | V66 | P14(5 g) | — | — | — | — | 4.00E−3 g (3.94E−6 mol) | R |

[†]R indicates Rhodorsil 2074 was used and T indicates TAG-372R

TABLE 11

| | | | Waveguide Layer | | | | |
|---|---|---|---|---|---|---|---|
| | | Polymer | Norbornene monomers | | | | |
| | Varnishes | matrix/ weight | Mon 1 (mol %) | Mon 2 (mol %) | Wt. | Pd-785 | PAG Wt./mol | R or T[†] |
| WG2 | V9 | P6 (.92 g) | HxNB (90) | SiX (10) | 1.5 g | 2.52E−4 g (3.21E−7 mol) | 1.30E−3 g (1.28E−6 mol) | R |
| WG3 | V10 | P8 (2 g) | HxNB (90) | SiX (10) | 2.4 g | 3.95E−4 g (5.03E−7 mol) | 2.55E−3 g (2.51E−6 mol) | R |
| WG4 | V12 | P9 (3 g) | HxNB (90) | SiX (10) | 1 g | 1.65E−4 g (2.10E−7 mol) | 8.51E−4 g (8.38E−7 mol) | R |
| WG5 | V12 | P9 (3 g) | HxNB (90) | SiX (10) | 1 g | 1.65E−4 g (2.10E−7 mol) | 8.51E−4 g (8.38E−7 mol) | R |
| WG19 | V21 | P12(5 g) | — | — | — | — | 4.00E−3 g | R |
| WG20 | V22 | P13 (5 g) | — | — | — | — | 4.00E−3 g | R |

TABLE 11-continued

| | | Polymer matrix/ weight | Norbornene monomers | | | | PAG | |
|---|---|---|---|---|---|---|---|---|
| | Varnishes | | Mon 1 (mol %) | Mon 2 (mol %) | Wt. | Pd-785 | Wt./mol | R or T[†] |
| WG51 | V38 | P3(3 g) (Hx/diPh) | HxNB (46) | SiX (54) | 2.16 g | 1.47E−3 g (1.88E−6 mol) | 7.67E−3 g (7.54E−6 mol) | R |
| WG52 | V38 | P3(3 g) (Hx/diPh) | HxNB (46) | SiX (54) | 2.16 g | 1.47E−3 g (1.88E−6 mol) | 7.67E−3 g (7.54E−6 mol) | R |
| WG53 | V38 | P3(3 g) (Hx/diPh) | HxNB (46) | SiX (54) | 2.16 g | 1.47E−3 g (1.88E−6 mol) | 7.67E−3 g (7.54E−6 mol) | R |
| WG54 | V38 | P3(3 g) (Hx/diPh) | HxNB (46) | SiX (54) | 2.16 g | 1.47E−3 g (1.88E−6 mol) | 7.67E−3 g (7.54E−6 mol) | R |
| WG55 | V38 | P3(3 g) (Hx/diPh) | HxNB (46) | SiX (54) | 2.16 g | 1.47E−3 g (1.88E−6 mol) | 7.67E−3 g (7.54E−6 mol) | R |
| WG56 | V51 | P15(4 g) | — | — | — | — | 1.56E−3 g (1.54E−6 mol) | R |

[†]R indicates Rhodorsil 2074 was used and T indicates TAG-372R

What is claimed is:

1. A photo-induced thermally developable film comprising:
    a polymer matrix having a form of a layer in a solid phase and having a first refractive index; and
    a photoinitiator which produces a cation and a weakly coordinating anion upon exposure to actinic radiation, where upon the exposure to actinic radiation, the first refractive index of the polymer matrix is altered in a portion of the polymer matrix exposed to the actinic radiation, and the photoinitiator is dispersed in the layer of the polymer matrix.

2. The photo-induced thermally developable film of claim 1, further comprising at least one antioxidant.

3. The photo-induced thermally developable film of claim 1, where the polymer matrix comprises one of a homopolymer, a copolymer and a terpolymer.

4. The photo-induced thermally developable film of claim 1, where the polymer matrix comprises first repeat units and second repeat units.

5. The photo-induced thermally developable film of claim 4, where the first repeat units comprise alkyl norbornene-type repeat units and the second repeat units comprise norbornene-type repeat units.

6. The photo-induced thermally developable film of claim 5, where the alkyl norbornene-type repeat units comprise hexyl norbornene repeat units and the norbornene-type repeat units comprise diphenylmethyl norbornenemethoxy silane repeat units.

7. The photo-induced thermally developable film of claim 1, further comprising at least one monomer compatible with the polymer matrix.

8. The photo-induced thermally developable film of claim 1, where the polymer matrix comprises hexyl norbornene repeat units and diphenylmethyl norbornenemethoxy silane repeat units.

9. The photo-induced thermally developable film of claim 1, further comprising a sensitizer.

* * * * *